United States Patent
Okamoto et al.

(10) Patent No.: US 12,449,898 B2
(45) Date of Patent: Oct. 21, 2025

(54) ELECTRONIC DEVICE

(71) Applicant: Semiconductor Energy Laboratory Co., Ltd., Atsugi (JP)

(72) Inventors: Yuki Okamoto, Ebina (JP); Minato Ito, Atsugi (JP); Munehiro Kozuma, Atsugi (JP); Tatsuya Onuki, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/711,988

(22) PCT Filed: Nov. 25, 2022

(86) PCT No.: PCT/IB2022/061406
§ 371 (c)(1),
(2) Date: May 21, 2024

(87) PCT Pub. No.: WO2023/105338
PCT Pub. Date: Jun. 15, 2023

(65) Prior Publication Data
US 2025/0004546 A1    Jan. 2, 2025

(30) Foreign Application Priority Data
Dec. 8, 2021    (JP) .................. 2021-198968

(51) Int. Cl.
*G06F 3/01* (2006.01)
*G02B 27/01* (2006.01)

(52) U.S. Cl.
CPC ........... *G06F 3/013* (2013.01); *G02B 27/017* (2013.01)

(58) Field of Classification Search
CPC ... G09G 2300/0426; G09G 2340/0435; G09G 2340/14; G09G 3/002; G09G 3/003;
(Continued)

(56) References Cited

U.S. PATENT DOCUMENTS

| 5,953,985 A | 9/1999 | Kobayashi |
| 6,120,338 A | 9/2000 | Hirano et al. |

(Continued)

FOREIGN PATENT DOCUMENTS

| CN | 106782268 A | 5/2017 |
| CN | 107870425 A | 4/2018 |

(Continued)

OTHER PUBLICATIONS

International Search Report (Application No. PCT/IB2022/061406) Dated Jan. 31, 2023.

(Continued)

*Primary Examiner* — Robin J Mishler
(74) *Attorney, Agent, or Firm* — Eric J. Robinson; Robinson Intellectual Property Law Office, P.C.

(57) ABSTRACT

An electronic device with a novel structure is provided. The electronic device includes a display apparatus, a gaze detection portion, and an arithmetic portion. The display apparatus includes a display portion divided into a plurality of sub-display portions and a functional circuit including a luminance conversion circuit. The gaze detection portion has a function of detecting the user's gaze. The arithmetic portion has a function of allocating the plurality of sub-display portions to a first section or a second section with the use of the detection result of the gaze detection portion. The functional circuit has a function of performing display on the sub-display portion included in the first section with a first driving frequency and performing display on the sub-display portion included in the second section with a second driving frequency lower than the first driving frequency. The luminance conversion circuit has a function of converting image data displayed on the second section to image data with reduced luminance to be displayed in the sub-display portion.

5 Claims, 39 Drawing Sheets

(58) Field of Classification Search
CPC ...... G09G 3/20; G09G 3/3225; G09G 3/3233; G09G 3/36; G09G 5/14; G09F 9/00; G09F 9/30; G06F 3/013; G06F 3/147; G02B 2027/014; G02B 2027/0147; G02B 2027/0178; G02B 27/017

See application file for complete search history.

(56) References Cited

U.S. PATENT DOCUMENTS

| | | |
|---|---|---|
| 2002/0072139 A1 | 6/2002 | Kashiwabara |
| 2007/0097021 A1 | 5/2007 | Yamazaki et al. |
| 2008/0030514 A1 | 2/2008 | Ooishi et al. |
| 2011/0148290 A1 | 6/2011 | Oota |
| 2011/0206126 A1* | 8/2011 | Kim .......... G09G 3/20 375/E7.125 |
| 2012/0256204 A1 | 10/2012 | Yoshizumi et al. |
| 2012/0273804 A1 | 11/2012 | Hatano |
| 2012/0276484 A1 | 11/2012 | Izumi et al. |
| 2013/0084531 A1 | 4/2013 | Hamaguchi et al. |
| 2013/0084664 A1 | 4/2013 | Yoshitoku et al. |
| 2013/0084666 A1 | 4/2013 | Oshige |
| 2013/0280839 A1 | 10/2013 | Sonoda et al. |
| 2013/0295705 A1 | 11/2013 | Sonoda et al. |
| 2014/0004640 A1 | 1/2014 | Hamaguchi et al. |
| 2014/0004642 A1 | 1/2014 | Otsuka et al. |
| 2015/0060826 A1 | 3/2015 | Matsumoto. et al. |
| 2015/0069360 A1 | 3/2015 | Sato |
| 2015/0076476 A1 | 3/2015 | Odaka et al. |
| 2015/0316976 A1 | 11/2015 | Toyotaka et al. |
| 2016/0087085 A1 | 3/2016 | Yamazaki et al. |
| 2016/0172595 A1 | 6/2016 | Malinowski et al. |
| 2016/0315133 A1 | 10/2016 | Sato |
| 2017/0141167 A1 | 5/2017 | Naganuma |
| 2017/0256754 A1 | 9/2017 | Defranco et al. |
| 2018/0040640 A1 | 2/2018 | Takahashi et al. |
| 2018/0090078 A1 | 3/2018 | Chang |
| 2018/0190908 A1 | 7/2018 | Ke et al. |
| 2018/0366068 A1 | 12/2018 | Liu et al. |
| 2019/0317374 A1 | 10/2019 | Yamazaki et al. |
| 2019/0371243 A1* | 12/2019 | Yang .......... G09G 3/3233 |
| 2020/0203662 A1 | 6/2020 | Mollard et al. |
| 2020/0241824 A1* | 7/2020 | Lee .......... G06F 3/013 |
| 2021/0074834 A1 | 3/2021 | Okamoto et al. |
| 2021/0167194 A1 | 6/2021 | Yamazaki et al. |
| 2022/0181572 A1 | 6/2022 | Ohsawa et al. |
| 2022/0246694 A1 | 8/2022 | Watanabe et al. |
| 2022/0278187 A1* | 9/2022 | Kobayashi .......... H10K 59/131 |
| 2022/0320064 A1 | 10/2022 | Takahashi et al. |
| 2022/0384526 A1 | 12/2022 | Yamazaki et al. |
| 2023/0050036 A1 | 2/2023 | Yamazaki et al. |
| 2023/0079244 A1 | 3/2023 | Yamazaki et al. |
| 2023/0387318 A1 | 11/2023 | Yamazaki et al. |
| 2024/0136358 A1 | 4/2024 | Yamazaki |

FOREIGN PATENT DOCUMENTS

| | | |
|---|---|---|
| CN | 108986749 A | 12/2018 |
| JP | 2000-002856 A | 1/2000 |
| JP | 2000-036385 A | 2/2000 |
| JP | 2003-059663 A | 2/2003 |
| JP | 2007-271842 A | 10/2007 |
| JP | 2008-098106 A | 4/2008 |
| JP | 2008-147072 A | 6/2008 |
| JP | 2008-251270 A | 10/2008 |
| JP | 2010-283895 A | 12/2010 |
| JP | 2014-120218 A | 6/2014 |
| JP | 2014-135251 A | 7/2014 |
| JP | 2014-232568 A | 12/2014 |
| JP | 2015-115178 A | 6/2015 |
| JP | 2016-170385 A | 9/2016 |
| JP | 2016-197494 A | 11/2016 |
| JP | 2019-179696 A | 10/2019 |
| JP | 2020-160305 A | 10/2020 |
| WO | WO-2018/126654 | 7/2018 |
| WO | WO-2018/223656 | 12/2018 |

OTHER PUBLICATIONS

Written Opinion (Application No. PCT/IB2022/061406) Dated Jan. 31, 2023.

Zakhidov.A et al., "Orthogonal processing: A new strategy for organic electronics", Chem. Sci. (Chemical Science), Apr. 7, 2011, vol. 2, No. 6, pp. 1178-1182.

Malinowski.P et al., "High resolution photolithography for direct view active matrix organic light-emitting diode augmented reality displays", J. Soc. Inf. Display (Journal of the Society for Information Display), Apr. 2, 2018, vol. 26, No. 3, pp. 128-136.

Malinowski.P et al., "Photolithographic patterning of organic photodetectors with a non-fluorinated photoresist system", Organic Electronics, Jul. 12, 2014, vol. 15, No. 10, pp. 2355-2359.

Malinowski.P et al., "Multicolor 1250 ppi OLED Arrays Patterned by Photolithography", SID Digest '16 : SID International Symposium Digest of Technical Papers, May 22, 2016, vol. 47, No. 1, pp. 1009-1012.

Papadopoulos.N et al., "AMOLED Displays with In-Pixel Photodetector", Liquid Crystals and Display Technology, Jul. 9, 2020, pp. 1-19.

Ke.T et al., "Technology Developments in High-Resolution FMM-free OLED and BEOL IGZO TFTs for Power-Efficient Microdisplays", SID Digest '21 : SID International Symposium Digest of Technical Papers, May 1, 2021, vol. 52, No. 1, pp. 127-130.

Malinowski.P et al., "Integration of additional functionalities into the frontplane of AMOLED displays", SID Digest '20 : SID International Symposium Digest of Technical Papers, Aug. 1, 2020, vol. 51, No. 1, pp. 646-649.

Malinowski.P et al., "Organic photolithography for displays with integrated fingerprint scanner", SID Digest '19 : SID International Symposium Digest of Technical Papers, May 29, 2019, vol. 50, No. 1, pp. 1007-1010.

Ke.T et al., "Island and Hole Fabrication on OLED Stack for High-Resolution Sensor in Display Application", IDW '20 : Proceedings of the 27th International Display Workshops, Dec. 9, 2020, vol. 27, pp. 902-905.

Gather.M et al., "Solution-Processed Full-Color Polymer-OLED Displays Fabricated by Direct Photolithography", SID Digest '06 : SID International Symposium Digest of Technical Papers, Jun. 1, 2006, vol. 37, No. 1, pp. 909-911.

Malinowski.P et al., "Photolithography as Enabler of AMOLED Displays Beyond 1000 ppi", SID Digest '17 : SID International Symposium Digest of Technical Papers, May 1, 2017, vol. 48, No. 1, pp. 623-626.

* cited by examiner

ELECTRONIC DEVICE

TECHNICAL FIELD

One embodiment of the present invention relates to an electronic device. One embodiment of the present invention relates to a wearable electronic device including a display apparatus.

Note that one embodiment of the present invention is not limited to the above technical field. Examples of the technical field of one embodiment of the present invention disclosed in this specification and the like include a semiconductor device, a display apparatus, a light-emitting apparatus, a power storage device, a memory device, an electronic device, a lighting device, an input device, an input/output device, a driving method thereof, and a manufacturing method thereof.

BACKGROUND ART

Display apparatuses have been applied to a variety of devices such as HMD (Head Mounted Display)-type electronic appliances suitable for applications of virtual reality (VR), augmented reality (AR), and the like in addition to portable information terminals such as smartphones, television devices, and the like.

The display apparatus used for application of VR, AR, or the like requires display performance such as display with a high driving frequency (also referred to as a frame frequency, a frame rate, a refresh rate, or the like), that is, for example, 120 Hz or higher, in addition to a narrow bezel and a reduction in power consumption of the display apparatus. For example, Patent Document 1 discloses an HMD provided with a display apparatus that includes minute pixels by using transistors capable of high-speed driving.

REFERENCE

Patent Document

[Patent Document 1] Japanese Published Patent Application No. 2000-2856

SUMMARY OF THE INVENTION

Problems to be Solved by the Invention

The display apparatus used for application of VR, AR, or the like needs to have high drawing processing capacity for responding to the user's gaze or operation. The power consumption might increase in the case where an arithmetic circuit with high drawing processing capacity drives a display apparatus having an increased resolution and a reduced size.

When display is performed at a high driving frequency, a clear moving image can be displayed by employing a driving where display is performed based on black image data at a certain proportion in one frame period in addition to performing display based on image data. The driving where a black image is inserted between images is also referred to as a motion blur reduction driving, a duty driving, or a black insertion driving. In the driving where a black image is inserted between images, in the case where the driving frequency is reduced in order to decrease power consumption, a black image inserted in one frame period might be recognized. Thus, when both the driving where a black image is inserted between images and the driving that reduces a driving frequency are performed in the case of displaying one image, it is difficult to achieve display with little unnaturalness.

An object of one embodiment of the present invention is to provide an electronic device including a display apparatus that can perform display with reduced power consumption. Another object of one embodiment of the present invention is to provide an electronic device including a display apparatus that can perform favorable display based on a driving where a black image is inserted between images and a driving that reduces a driving frequency. Another object of one embodiment of the present invention is to provide a novel electronic device.

The description of a plurality of objects does not preclude the existence of each object. One embodiment of the present invention does not need to achieve all the objects described as examples. Furthermore, objects other than those listed are apparent from description of this specification, and such objects can be objects of one embodiment of the present invention.

Means for Solving the Problems

One embodiment of the present invention is an electronic device including a display apparatus, a gaze detection portion, and an arithmetic portion; the display apparatus includes a display portion divided into a plurality of sub-display portions and a functional circuit including a luminance conversion circuit; the gaze detection portion has a function of detecting the user's gaze; the arithmetic portion has a function of allocating the plurality of sub-display portions to a first section or a second section with the use of the detection result of the gaze detection portion; the functional circuit has a function of performing display on the sub-display portion included in the first section with a first driving frequency and performing display on the sub-display portion included in the second section with a second driving frequency lower than the first driving frequency; the sub-display portion included in the first section performs display based on first image data and black image data in one frame period; the sub-display portion included in the second section performs display based on second image data in one frame period; the luminance conversion circuit has a function of converting input image data into image data with reduced luminance to be displayed in the sub-display portion; and the second image data is the image data converted by the luminance conversion circuit.

In the electronic device of one embodiment of the present invention, the first section preferably includes a region overlapping with the user's gaze point.

In the electronic device of one embodiment of the present invention, the plurality of sub-display portions each preferably include a plurality of pixel circuits and a plurality of light-emitting elements.

In the electronic device of one embodiment of the present invention, it is preferable that the display apparatus include a plurality of gate driver circuits and a plurality of source driver circuits, and one of the gate driver circuits and one of the source driver circuits be electrically connected to one of the sub-display portions.

In the electronic device of one embodiment of the present invention, it is preferable that the plurality of gate driver circuits and the plurality of source driver circuits be each provided in a first layer, the plurality of pixel circuits be provided in a second layer over the first layer, and the plurality of light-emitting elements be provided in a third layer over the second layer.

In the electronic device of one embodiment of the present invention, it is preferable that the plurality of gate driver circuits and the plurality of source driver circuits which are provided in the first layer each include a transistor including a first semiconductor, the plurality of pixel circuits provided in the second layer each include a transistor including a second semiconductor, the first semiconductor contain silicon, and the second semiconductor contain an oxide semiconductor.

In the electronic device of one embodiment of the present invention, it is preferable that the functional circuit include a frame memory, and the frame memory have a function of storing image data in each of the plurality of sub-display portions and a function of outputting the image data to the luminance conversion circuit.

In the electronic device of one embodiment of the present invention, the functional circuit includes a frame memory, and the frame memory has a function of storing image data processed by the luminance conversion circuit.

Note that other embodiments of the present invention will be shown in the description of the following embodiments and the drawings.

Effect of the Invention

One embodiment of the present invention can provide an electronic device including a display apparatus that can perform display with reduced power consumption. Another embodiment of the present invention can provide an electronic device including a display apparatus that can perform favorable display based on a driving where a black image is inserted between images and a driving that reduces a driving frequency. Another embodiment of the present invention can provide a novel electronic device.

The description of a plurality of effects does not preclude the existence of other effects. In addition, one embodiment of the present invention does not necessarily achieve all the effects described as examples. In one embodiment of the present invention, other objects, effects, and novel features are apparent from the description of this specification and the drawings.

BRIEF DESCRIPTION OF THE DRAWINGS line 0021

FIG. 19B1 to FIG. 19B7 are diagrams illustrating structure examples of a pixel.

MODE FOR CARRYING OUT THE INVENTION

Figure 1A:
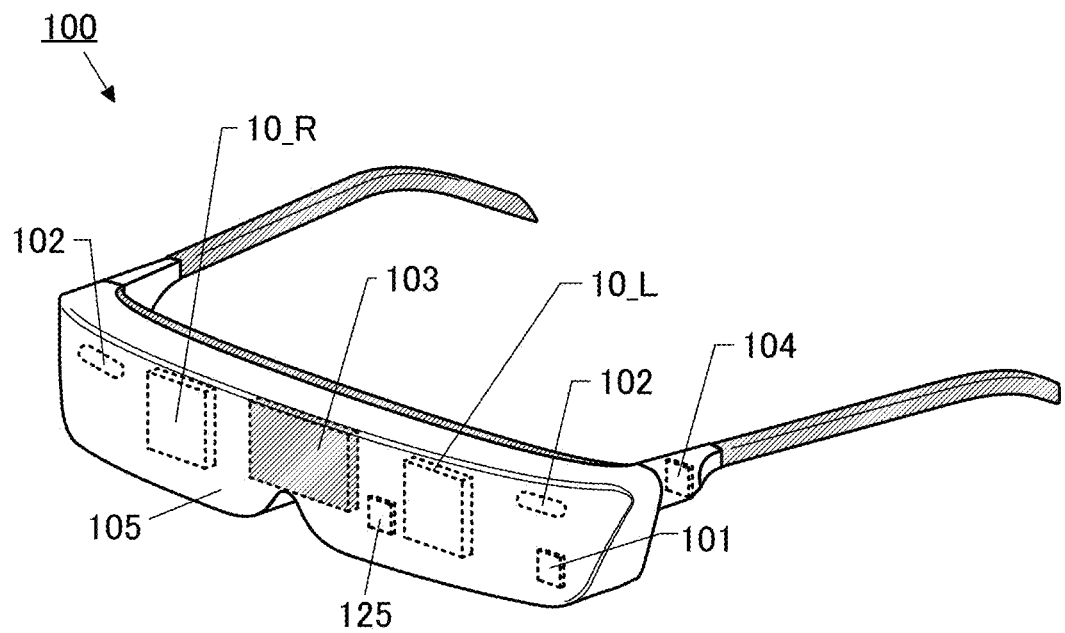
FIG. 1A and FIG. 1B are diagrams illustrating a structure example of an electronic device.

Embodiments of the present invention will be described below. Note that one embodiment of the present invention is not limited to the following description, and it will be readily understood by those skilled in the art that modes and details of the present invention can be modified in various ways without departing from the spirit and scope of the present invention. One embodiment of the present invention therefore should not be construed as being limited to the following description of the embodiments.

Note that ordinal numbers such as "first", "second", and "third" in this specification and the like are used in order to avoid confusion among components. Thus, the ordinal numbers do not limit the number of components. In addition, the ordinal numbers do not limit the order of components. Furthermore, in this specification and the like, for example, a "first" component in one embodiment can be referred to as a "second" component in other embodiments or the scope of claims. Moreover, in this specification and the like, for example, a "first" component in one embodiment can be omitted in other embodiments or the scope of claims.

In some cases, the same components, components having similar functions, components made of the same material, components formed at the same time, and the like are denoted by the same reference numerals in the drawings and repeated description thereof is omitted.

In this specification, for example, a power supply potential VDD may be abbreviated to a potential VDD, VDD, or the like. The same applies to other components (e.g., a signal, a voltage, a circuit, an element, an electrode, and a wiring).

In the case where a plurality of components are denoted by the same reference numerals, and, particularly when they need to be distinguished from each other, an identification sign such as "_1", "_2", "[n]", or "[m,n]" is sometimes added to the reference numerals. For example, a second wiring GL is referred to as a wiring GL[2].

Embodiment 1

In one embodiment of the present invention, an electronic device of one embodiment of the present invention will be described. The electronic device of one embodiment of the present invention can be suitably used also as a wearable electronic device for VR or AR applications.

<Structure Example of Electronic Device>

FIG. 1A illustrates a perspective view of a glasses-type (goggle-type) electronic device 100 as an example of a wearable electronic device. FIG. 1A illustrates the electronic device 100 that includes, in a housing 105, a pair of display apparatuses 10 (a display apparatus 10_L and a display apparatus 10_R), a motion detection portion 101, gaze detection portions 102, an arithmetic portion 103, and a communication portion 104.

Figure 1B:
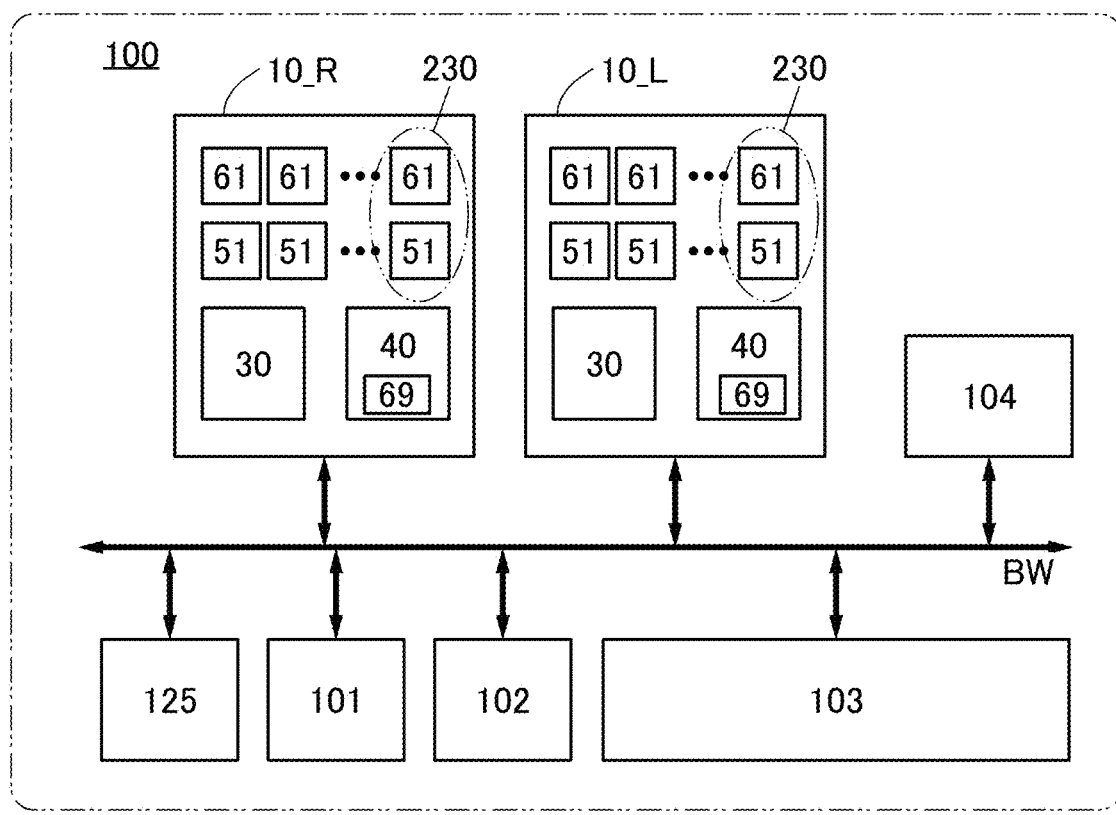

FIG. 1B is a block diagram of the electronic device 100 in FIG. 1A. As in FIG. 1A, the electronic device 100 includes the display apparatus 10_L, the display apparatus 10_R, the motion detection portion 101, the gaze detection portions 102, the arithmetic portion 103, and the communication portion 104, and a variety of signals are transmitted and received between these components through a bus wiring BW. Each of the display apparatus 10_L and the display apparatus 10_R includes a plurality of pixels 230, a driver circuit 30, and a functional circuit 40. The functional circuit 40 includes a luminance conversion circuit 69. One pixel 230 includes one light-emitting element 61 and one pixel circuit 51. Thus, each of the display apparatus 10_L and the display apparatus 10_R includes a plurality of light-emitting elements 61 and a plurality of pixel circuits 51.

The motion detection portion 101 has a function of detecting the motion of the housing 105, i.e., the motion of the head of the user who wears the electronic device 100. The motion detection portion 101 can include a motion sensor using a MEMS technology, for example. As the motion sensor, a three-axis motion sensor, a six-axis motion sensor, or the like can be used. Information on the motion of the housing 105 detected by the motion detection portion 101 may be referred to as first information, first data, motion data, or the like.

The gaze detection portion 102 has a function of obtaining information regarding the user's gaze. Specifically, the gaze detection portion 102 has a function of detecting the user's gaze. The user's gaze, for example, is obtained by a gaze measurement (eye tracking) method such as a pupil center corneal reflection method or a bright/dark pupil effect method. Alternatively, the user's gaze may be obtained by a gaze measurement method using a laser, an ultrasonic wave, or the like.

The arithmetic portion 103 has a function of calculating the user's gaze point by using a gaze detection result in the gaze detection portion 102. That is, an object the user is gazing in the image being displayed on the display apparatus 10_L and the display apparatus 10_R can be found. In addition, whether or not the user is gazing at a part other than the screen can be found. Note that information regarding the user's gaze obtained by the gaze detection portion 102 (the gaze detection result) is referred to as second information, gaze information, or the like in some cases.

The arithmetic portion 103 has a function of performing drawing processing in accordance with the motion of the housing 105. The arithmetic portion 103 performs the drawing processing in accordance with the motion of the housing 105 with the use of the first information and image data that is input from the outside through the communication portion 104. As the image data, for example, a 360-degree omnidirectional image data can be used. The 360-degree omnidirectional image data is data generated by a celestial sphere camera (an omnidirectional camera or a 360° camera), computer graphics, or the like. Specifically, the arithmetic portion 103 has a function of converting the 360-degree omnidirectional image data on the basis of the first information into image data that can be displayed on the display apparatus 10_L and the display apparatus 10_R.

The arithmetic portion 103 has a function of determining the size and shape of a plurality of sections that are set for each of the display portions of the display apparatus 10_L and the display apparatus 10_R with use of the second information. Specifically, the arithmetic portion 103 calculates a gaze point on the display portion on the basis of the second information and sets a first region S1 to a third region S3 and the like described later on the display portion with use of the gaze point as a reference.

A microprocessor such as a central processing unit (CPU), a DSP (Digital Signal Processor), or a GPU (Graphics Processing Unit) can be used alone or in combination as the arithmetic portion 103. A structure may be employed in which such a microprocessor is obtained with a PLD (Programmable Logic Device) such as an FPGA (Field Programmable Gate Array) or an FPAA (Field Programmable Analog Array).

The arithmetic portion 103 interprets and executes instructions from various programs with the use of a processor to perform various kinds of data processing and program control. The programs that might be executed by the processor may be stored in a memory region included in the processor or a memory portion which is additionally provided. As the memory portion, a memory device using a nonvolatile memory element, such as a flash memory, an MRAM (Magnetoresistive Random Access Memory), a PRAM (Phase change RAM), an ReRAM (Resistive RAM), or an FeRAM (Ferroelectric RAM); a memory device using a volatile memory element, such as a DRAM (Dynamic RAM) and an SRAM (Static RAM); or the like may be used, for example.

The communication portion 104 has a function of communicating with an external device by wire or wirelessly to obtain a variety of data, including image data. The communication portion 104 is provided with a high frequency circuit (RF circuit), for example, to transmit and receive an RF signal. The high frequency circuit is a circuit for performing mutual conversion between an electromagnetic signal and an electrical signal in a frequency band that is set by national laws to perform wireless communication with another communication apparatus using the electromagnetic signal. In the case of performing wireless communication, it is possible to use, as a communication protocol or a communication technology, a communication standard such as LTE (Long Term Evolution), GSM (Global System for Mobile Communication: registered trademark), EDGE (Enhanced Data Rates for GSM Evolution), CDMA 2000 (Code Division Multiple Access 2000), or WCDMA (Wideband Code Division Multiple Access: registered trademark), or a communication standard developed by IEEE such as Wi-Fi (registered trademark), Bluetooth (registered trademark), or ZigBee (registered trademark). The third-generation mobile communication system (3G), the fourth-generation mobile communication system (4G), the fifth-generation mobile communication system (5G), or the sixth-generation mobile communication system (6G) defined by the International Telecommunication Union (ITU) can be used.

The communication portion 104 may include an external port such as a LAN (Local Area Network) connection terminal, a digital broadcast-receiving terminal, or an AC adaptor connection terminal.

Each of the display apparatus 10_L and the display apparatus 10_R includes the plurality of light-emitting elements 61, the plurality of pixel circuits 51, the driver circuit 30, and the functional circuit 40 including the luminance conversion circuit 69. The pixel circuit 51 has a function of controlling light emission of the light-emitting element 61. The driver circuit 30 has a function of controlling the pixel circuit 51.

The information of a plurality of sections in the display portion of the display apparatus determined by the arithmetic portion 103 is used for a driving frequency (e.g., a frame frequency, a frame rate, or a refresh rate) for displaying an image for sections, presence or absence of a driving (a black insertion driving) where a black image is inserted between images, and a driving with different luminance based on the image data, for example. Note that the presence or absence of a black insertion driving can be regarded as presence or absence of a period during which black display based on black image data is performed.

The driving frequency for each section can be controlled by a signal supplied to the driver circuit 30 provided for each section. The presence or absence of a black insertion driving for each section can be controlled by switching a conduction state or a non-conduction state of a transistor that controls lighting or non-lighting of a light-emitting element or supplying image data of black display to a pixel circuit. The luminance for each section can be controlled by conversion of image data by the luminance conversion circuit 69.

The functional circuit 40 has a function of controlling the driver circuit 30 such that display with a high driving frequency is performed in a section close to the gaze point and controlling the driver circuit 30 such that display with a low driving frequency is performed in a section distant from the gaze point. The functional circuit 40 has a function of controlling the driver circuit such that display with a driving where a black image is inserted between images is performed in the section close to the gaze point and controlling the driver circuit 30 such that display with a driving where a black image is not inserted between images is performed in the section distant from the gaze point.

With this structure, in the section close to the gaze point, a black insertion driving in one frame period can be performed in addition to performing display with a high driving frequency. It is preferable to use a display method for inserting a black image in one frame period, in which case an image blur or an afterimage can be inhibited. Such a display method is also referred to as a motion blur reduction.

In the section distant from the gaze point, a driving where a black image is not inserted between images in one frame period is performed in addition to performing display with a low driving frequency. In the case where display where a black image is inserted between images is performed with a low driving frequency, a black image might be recognized. The driving where a black image is not inserted between images in one frame period causes a different cumulative lighting period from a driving where a black image is inserted between images in one frame period; thus, a difference in luminance is significantly recognized as compared to an original image.

In one embodiment of the present invention, display with a high driving frequency where a black image is inserted between images and display with a low driving frequency where a black image is not inserted between images are changed for sections corresponding to a positional relationship with respect to the gaze point, whereby display where a difference in luminance is hardly recognized as compared to an original image is obtained. Specifically, in the case where display with a high driving frequency where a black image is inserted between images and display with a low driving frequency where a black image is not inserted between images are performed, for display with a low driving frequency where a black image is not inserted between images performed in the section distant from the gaze point, image data is converted to image data with reduced luminance by the luminance conversion circuit 69 and supplied to the section.

With such a structure, a difference in luminance corresponding to a difference in the cumulative lighting period between display with a high driving frequency where a black image is inserted between images and display with a low driving frequency where a black image is not inserted between images can be reduced. Thus, display with a high driving frequency in the section close to the gaze point and with an excellent display quality by a motion blur reduction can be performed, and display where a difference in luminance is not easily recognized can be performed even when the driving frequency in the section distant from the gaze point is reduced and a black image is not inserted between images for the display. Furthermore, when the driving frequency in the section distant from the gaze point is reduced and a black image is inserted between images is performed in the section close to the gaze point for the display, high image quality and low power consumption can be achieved. Note that information of a plurality of sections on the display portion of the display apparatus, which is determined by the arithmetic portion 103, may be combined with a driving for changing update frequency, definition, or the like of image data for sections.

As in one embodiment of the present invention, the arithmetic portion 103 may be provided in addition to the functional circuit 40. Providing the arithmetic portion 103 makes it possible for the arithmetic portion 103 to perform heavy-load arithmetic processing such as drawing processing in accordance with the motion of the housing 105 and determining a plurality of regions described later (the first region S1 to the third region S3) in accordance with a gaze point. Meanwhile, the functional circuit 40 performs the processing of controlling the driver circuit 30, so that reductions in circuit size and power consumption can be achieved. A wearable electronic device in particular is required to detect the motion of the user's head, gaze, or the like in a short period, and thus high speed arithmetic processing is required, leading to high power consumption for an arithmetic operation. By contrast, in one embodiment of the present invention, the function of outputting a control signal for the driver circuit 30 is separated from the arithmetic portion 103 and can be performed by the functional circuit 40. This prevents concentration of load on one arithmetic portion and can reduce the load on the arithmetic portion. Thus, low power consumption as a whole can be achieved.

The electronic device 100 may be provided with a sensor 125. The sensor 125 has a function of obtaining information on one or more of the senses of sight, hearing, touch, taste, and smell of the user. Specifically, the sensor 125 has a function of sensing or measuring one or more of the following information: force, displacement, position, speed, acceleration, angular velocity, rotational frequency, distance, light, magnetism, temperature, sound, time, electric field, current, voltage, electric power, radiation, humidity, gradient, oscillation, smell, and infrared rays. The electronic device 100 may be provided with one or more sensors 125.

With use of the sensor 125, ambient temperature, humidity, illumination, odor, and the like may be measured. Furthermore, with use of the sensor 125, information for personal authentication using a fingerprint, a palm print, an iris, a retina, a shape of a blood vessel (including a shape of a vein and a shape of an artery), a face, or the like may be obtained, for example. Moreover, with use of the sensor 125, the number of blinks, eyelid behavior, pupil size, body temperature, pulse, oxygen saturation in blood, or the like of the user may be measured, so that the user's fatigue level, health condition, and the like can be detected. The electronic device 100 may sense the user's fatigue level, health condition, and the like and display an alert or the like on the display apparatus 10.

The operation of the electronic device 100 may be controlled by detecting the user's gaze and eyelid movement. Since the user does not need to use both hands to operate the electronic device 100, an input operation or the like can be achieved with holding nothing in both hands (in a state where both hands are free).

Figure 2A:
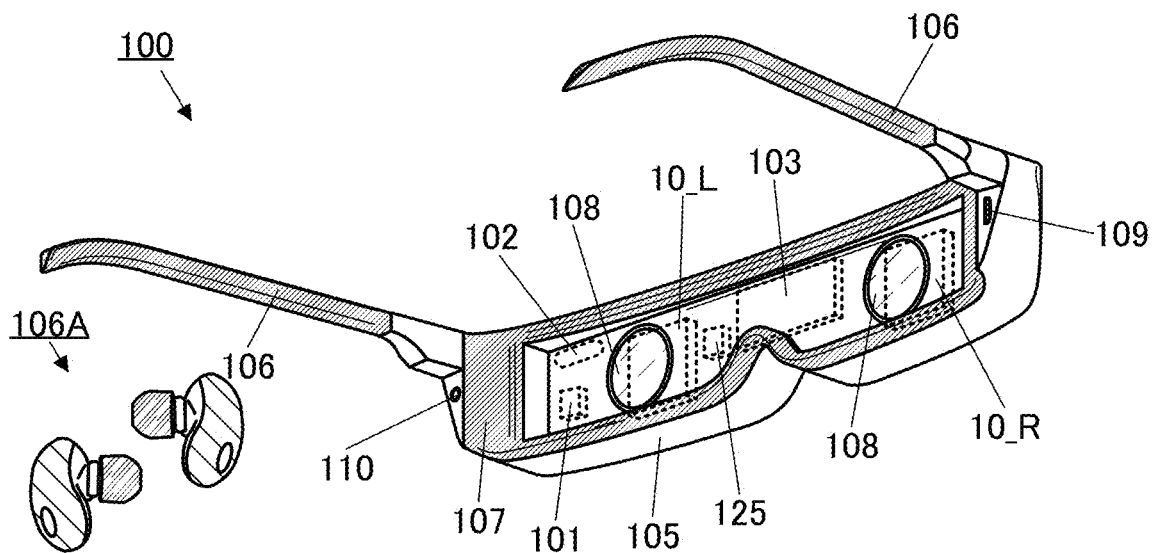
FIG. 2A and FIG. 2B are diagrams illustrating structure examples of an electronic device.

FIG. 2A is a perspective view illustrating the electronic device 100. In FIG. 2A, the housing 105 of the electronic device 100 includes, for example, a wearing portion 106, a cushion 107, a pair of lenses 108, and the like, in addition to the pair of the display apparatus 10_L and the display apparatus 10_R and the arithmetic portion 103. The pair of the display apparatus 10_L and the display apparatus 10_R are positioned inside the housing 105 so as to be seen through the lenses 108.

In addition, an input terminal 109 and an output terminal 110 are provided in the housing 105 illustrated in FIG. 2A. To the input terminal 109, a cable for supplying an image signal (image data) from a video output device or the like, power for charging a battery provided in the housing 105, or the like can be connected. The output terminal 110 can function as, for example, an audio output terminal to which earphones, headphones, or the like can be connected.

In addition, the housing 105 preferably includes a mechanism by which the left and right positions of the lenses 108 and the display apparatus 10_L and the display apparatus 10_R can be adjusted to the optimal positions in accordance with the positions of the user's eyes. Moreover, the housing 105 preferably includes a mechanism for adjusting focus by changing the distance between the lenses 108 and the display apparatus 10_L and the display apparatus 10_R.

The cushion 107 is a portion to be in contact with the user's face (forehead, cheek, or the like). When the cushion 107 is in close contact with the user's face, light leakage can be prevented, which increases the sense of immersion. A soft material is preferably used for the cushion 107 so that the cushion 107 is in close contact with the user's face when the user wears the electronic device 100. Using such a material is preferable because it provides a soft texture and the user does not feel cold when wearing the electronic device in a cold season, for example. The member to be in contact with the user's skin, such as the cushion 107 or the wearing portion 106, is preferably detachable, in which case cleaning or replacement can be easily performed.

The electronic device of one embodiment of the present invention may further include earphones 106A. The earphones 106A include a communication portion (not illustrated) and have a wireless communication function. The earphones 106A can output audio data with the wireless communication function. The earphones 106A may include a vibration mechanism to function as bone-conduction earphones.

Figure 2B:
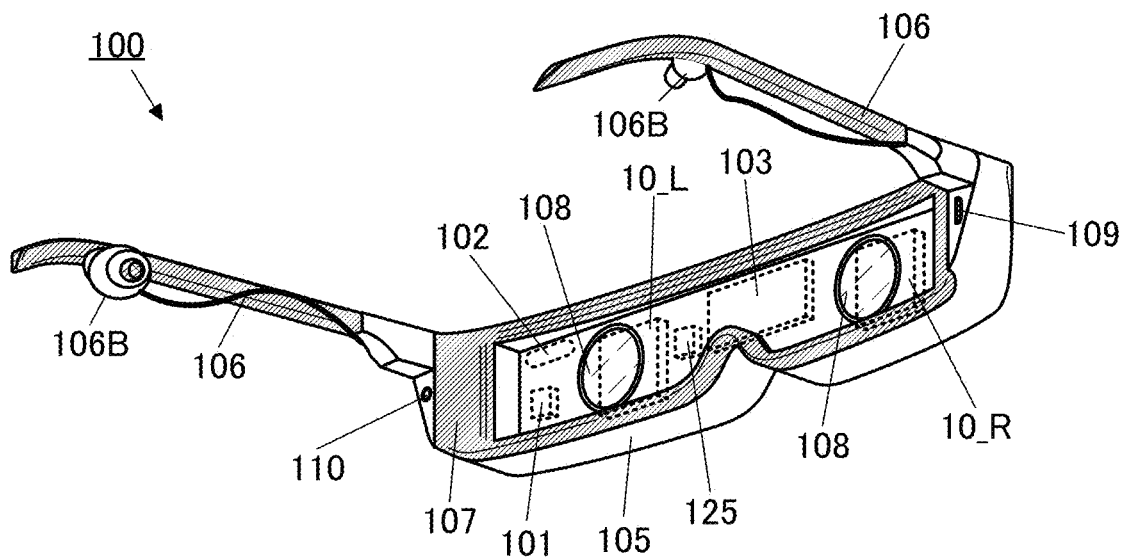

The earphones 106A can be connected to the wearing portion 106 directly or by wire like earphones 106B illustrated in FIG. 2B. The earphones 106B and the wearing portion 106 may each have a magnet. This is preferable because the earphones 106B can be fixed to the wearing portion 106 with magnetic force and thus can be easily housed.

<Structure Example of Display Apparatus>

A structure of a display apparatus 10A that can be used as the display apparatus 10_L and the display apparatus 10_R illustrated in FIG. 1A and FIG. 1B will be described with reference to FIG. 3A, FIG. 3B, FIG. 4, and FIG. 5.

Figure 3A:
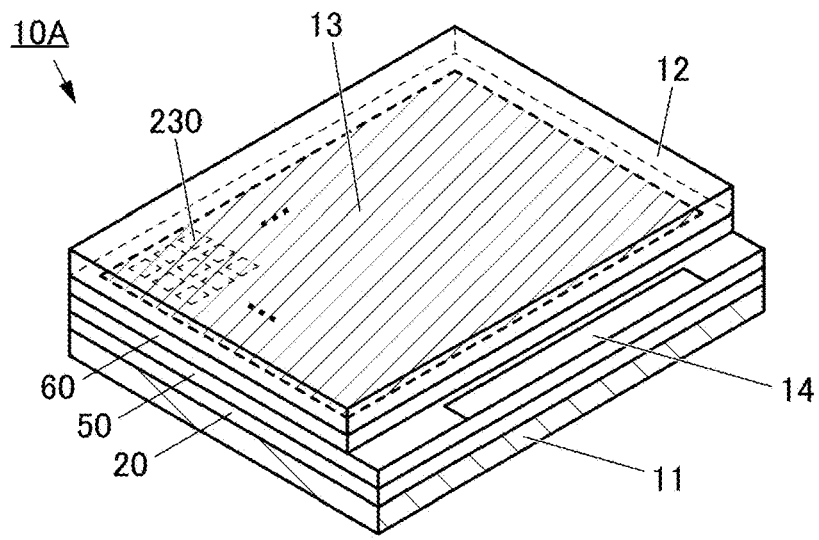
FIG. 3A and FIG. 3B are diagrams illustrating a structure example of a display apparatus.

FIG. 3A is a perspective view of the display apparatus 10A that can be used as the display apparatus 10_L and the display apparatus 10_R illustrated in FIG. 1A and FIG. 1B.

The display apparatus 10A includes a substrate 11 and a substrate 12. The display apparatus 10A includes a display portion 13 composed of elements provided between the substrate 11 and the substrate 12. The display portion 13 is a region where an image is displayed in the display apparatus 10A. The display portion 13 includes the plurality of pixels 230. The pixels 230 each include the pixel circuit 51 and the light-emitting element 61.

By using the pixels 230 arranged in a matrix of 1920× 1080 pixels, the display portion 13 can achieve display with a definition of a so-called full hi-vision (also referred to as "2K definition", "2K1K", "2K", or the like). For example, by using the pixels 230 arranged in a matrix of 3840×2160 pixels, the display portion 13 can achieve display with a definition of a so-called ultra hi-vision (also referred to as "4K definition", "4K2K", "4K", or the like). For example, by using the pixels 230 arranged in a matrix of 7680×4320 pixels, the display portion 13 can achieve display with a definition of a so-called super hi-vision (also referred to as "8K definition", "8K4K", "8K", or the like). By increasing the number of pixels 230, the display portion 13 that can perform display with 16K or 32K definition can also be obtained.

Furthermore, the pixel density (resolution) of the display portion 13 is preferably higher than or equal to 1000 ppi and lower than or equal to 10000 ppi. For example, the resolution may be higher than or equal to 2000 ppi and lower than or equal to 6000 ppi, or higher than or equal to 3000 ppi and lower than or equal to 5000 ppi.

Note that there is no particular limitation on the screen ratio (aspect ratio) of the display portion 13. For example, the display portion 13 is compatible with a variety of screen ratios such as 1:1 (a square), 4:3, 16:9, and 16:10.

In this specification and the like, the term "element" can be replaced with the term "device" in some cases. For example, a display element, a light-emitting element, and a liquid crystal element can be rephrased as a display device, a light-emitting device, and a liquid crystal device, respectively, for example.

Various kinds of signals and power supply potentials are input to the display apparatus 10A from the outside via a terminal portion 14, so that image display can be performed using a display element provided in the display portion 13. Any of a variety of elements can be used as the display element. Typically, a light-emitting element having a function of emitting light, such as an organic EL element or an LED element, a liquid crystal element, a MEMS (Micro Electro Mechanical Systems) element, or the like can be used.

A plurality of layers are provided between the substrate 11 and the substrate 12, and each of the layers is provided with a transistor for a circuit operation, or a display element which emits light. A pixel circuit having a function of controlling an operation of the display element, a driver circuit having a function of controlling the pixel circuit, a functional circuit having a function of controlling the driver circuit, and the like are provided in the plurality of layers.

Figure 3B:
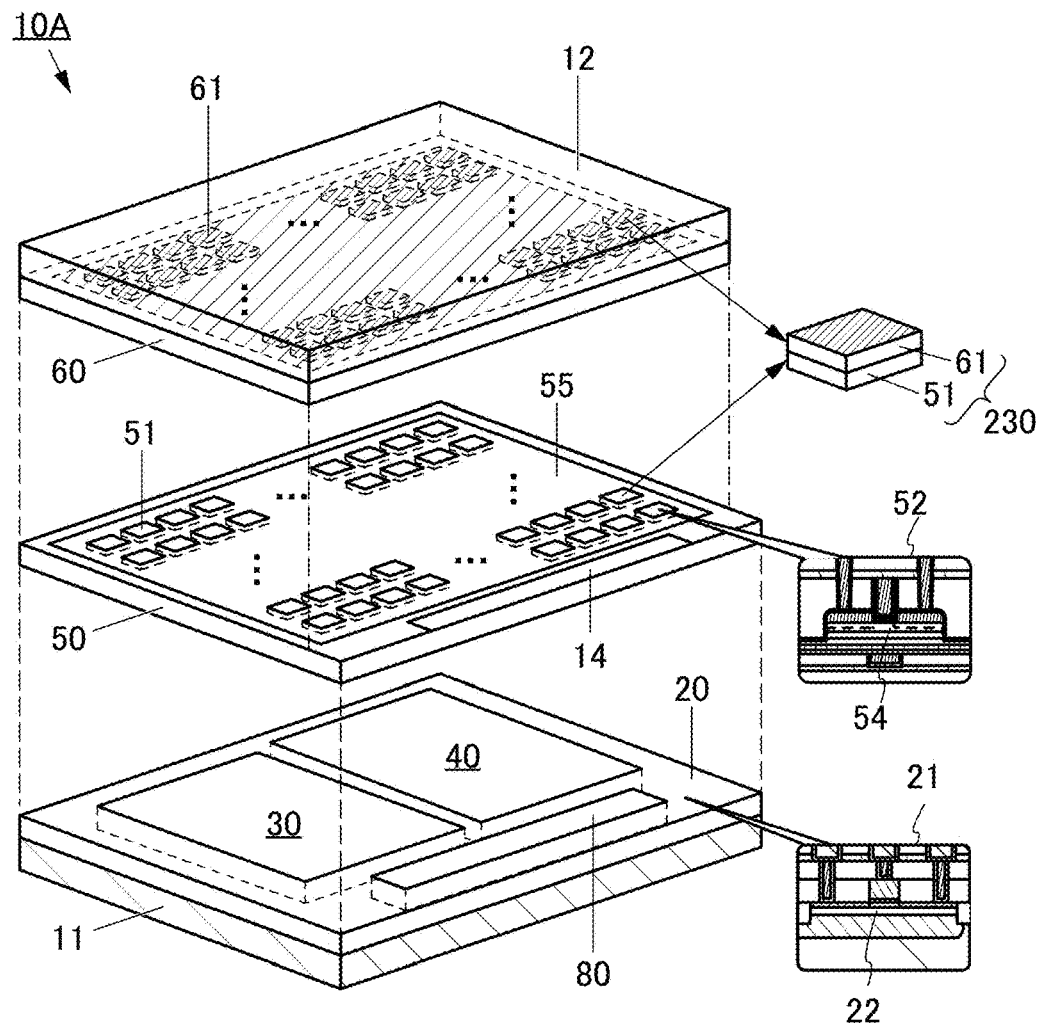

FIG. 3B is a perspective view schematically illustrating the structures of the layers provided between the substrate 11 and the substrate 12.

A layer 20 is provided over the substrate 11. The layer 20 includes the driver circuit 30, the functional circuit 40, and an input/output circuit 80. The layer 20 includes a transistor 21 containing silicon in a channel formation region 22 (such a transistor is also referred to as a Si transistor). The substrate 11 is, for example, a silicon substrate. A silicon substrate is preferable because it has higher thermal conductivity than a glass substrate. By providing the driver circuit 30, the functional circuit 40, and the input/output circuit 80 in the same layer, wirings electrically connecting the driver circuit 30, the functional circuit 40, and the input/output circuit 80 can be short. As a result, charge and discharge time of a control signal used when the functional circuit 40 controls the driver circuit 30 becomes short, leading to a reduction in power consumption. In addition, charge and discharge time during which a signal is supplied from the input/output circuit 80 to the functional circuit 40 and the driver circuit 30 becomes short, leading to a reduction in power consumption.

The transistor 21 can be a transistor containing single crystal silicon in its channel formation region (also referred to as a "c-Si transistor"), for example. In particular, the use of a transistor containing single crystal silicon in a channel formation region as the transistor provided in the layer 20 can increase the on-state current of the transistor. This enables high-speed driving of circuits included in the layer 20 and is thus preferable. The Si transistor can be formed by microfabrication to have a channel length greater than or equal to 3 nm and less than or equal to 10 nm, for example; thus, a CPU, an accelerator such as a GPU, an application processor, or the like can be integral with the display portion in the display apparatus 10A.

A transistor containing polycrystalline silicon in its channel formation region (also referred to as a "Poly-Si transistor") may be provided in the layer 20. As the polycrystalline silicon, low-temperature polysilicon (LTPS) may be used. Note that a transistor containing LTPS in its channel formation region is also referred to as an "LTPS transistor". An OS transistor may be provided in the layer 20.

Any of a variety of circuits such as a shift register, a level shifter, an inverter, a latch, an analog switch, and a logic circuit can be used as the driver circuit 30. The driver circuit 30 includes a gate driver circuit, a source driver circuit, or the like, for example. In addition, an arithmetic circuit, a memory circuit, a power supply circuit, and the like may be included. Since the gate driver circuit, the source driver circuit, and other circuits can be placed to overlap with the display portion 13, the width of a non-display region (also referred to as a bezel) provided along the outer periphery of the display portion 13 of the display apparatus 10A can be extremely narrow compared with the case where these circuits and the display portion 13 are arranged side by side, whereby the display apparatus 10A can be reduced in size.

The functional circuit 40 has a function of an application processor for controlling the circuits in the display apparatus 10A and generating signals used for controlling the circuits, for example. The functional circuit 40 may include a circuit used for correcting image data like an accelerator such as a CPU or a GPU. The functional circuit 40 may include an LVDS (Low Voltage Differential Signaling) circuit, an MIPI (Mobile Industry Processor Interface) circuit, and/or a D/A (Digital to Analog) converter circuit, for example, having a function of an interface for receiving image data or the like from the outside of the display apparatus 10A. The functional circuit 40 may include a circuit for compressing and decompressing image data and/or a power supply circuit, for example.

A layer 50 is provided over the layer 20. The layer 50 includes a pixel circuit group 55 including the plurality of pixel circuits 51. An OS transistor may be provided in the layer 50. Each of the pixel circuits 51 may include an OS transistor. Note that the layer 50 can be stacked over the layer 20.

A Si transistor may be provided in the layer 50. For example, the pixel circuits 51 may each include a transistor containing single crystal silicon or polycrystalline silicon in its channel formation region. As the polycrystalline silicon, LTPS may be used. For example, the layer 50 can be formed over another substrate and bonded to the layer 20.

As another example, the pixel circuits 51 may each include a plurality of kinds of transistors using different semiconductor materials. In the case where the pixel circuits 51 each include a plurality of kinds of transistors using different semiconductor materials, the transistors may be provided in different layers for each kind of transistor. For example, in the case where the pixel circuits 51 each include a Si transistor and an OS transistor, the Si transistor and the OS transistor may be provided to overlap with each other. Providing the transistors to overlap with each other reduces the area occupied by the pixel circuits 51. Thus, the resolution of the display apparatus 10A can be improved. Note that a structure in which an LTPS transistor and an OS transistor are combined is referred to as LTPO in some cases.

It is preferable to use, as a transistor 52 that is an OS transistor, a transistor including an oxide containing at least one of indium, an element M (the element M is aluminum, gallium, yttrium, or tin), and zinc in a channel formation region. Such an OS transistor has a characteristic of an extremely low off-state current. Thus, it is particularly preferable to use the OS transistor as a transistor provided in the pixel circuit, in which case analog data written to the pixel circuit can be retained for a long period.

A layer 60 is provided over the layer 50. Over the layer 60, the substrate 12 is provided. The substrate 12 is preferably a light-transmitting substrate or a layer formed of a light-transmitting material. The layer 60 includes the plurality of light-emitting elements 61. The layer 60 can be stacked over the layer 50. As the light-emitting element 61, an organic electroluminescent element (also referred to as an organic EL element) or the like can be used, for example. However, the light-emitting element 61 is not limited thereto, and an inorganic EL element formed of an inorganic material may be used, for example. Note that an "organic EL element" and an "inorganic EL element" are collectively referred to as "EL element" in some cases. The light-emitting element 61 may contain an inorganic compound such as quantum dots. For example, when used for a light-emitting layer, the quantum dots can function as a light-emitting material.

Although the transistor containing single crystal silicon in the channel formation region of the transistor 21 is described above as an example, one embodiment of the present invention is not limited thereto. For example, the transistor 21 may be a high electron mobility transistor (HEMT), a transistor using gallium nitride (also referred to as GaN), or a transistor using gallium (Ga). Thus, a stacked-layer structure of the transistor 21 and the transistor 52 can be Si\OS (silicon and an oxide semiconductor over the silicon), HEMT\OS (a high electron mobility transistor and an oxide semiconductor over the high electron mobility transistor), GaN\OS (gallium nitride and an oxide semiconductor over the gallium nitride), or Ga\OS (gallium and an oxide semiconductor over the gallium), for example. Note that as the material used for the HEMT, any one or more selected from GaAs, InP, GaN, and SiGe can be used, for example.

As illustrated in FIG. 3B, the display apparatus 10A of one embodiment of the present invention can have a structure in which the light-emitting elements 61, the pixel circuits 51, the driver circuit 30, and the functional circuit 40 are stacked; thus, the aperture ratio (effective display area ratio) of the pixels can be extremely high. For example, the pixel aperture ratio can be higher than or equal to 40% and lower than 100%, preferably higher than or equal to 50% and lower than or equal to 95%, further preferably higher than or equal to 60% and lower than or equal to 95%. Furthermore, the pixel circuits 51 can be arranged extremely densely, and thus the resolution of the pixels can be extremely high. For example, the pixels can be arranged in the display portion 13 of the display apparatus 10A (a region where the pixel circuits 51 and the light-emitting elements 61 are stacked) with a resolution higher than or equal to 2000 ppi, preferably higher than or equal to 3000 ppi, further preferably higher than or equal to 5000 ppi, still further preferably higher than or equal to 6000 ppi, and lower than or equal to 20000 ppi or lower than or equal to 30000 ppi.

The display apparatus 10A described above has an extremely high resolution, and thus can be suitably used for a device for VR such as a head-mounted display or a glasses-type device for AR. For example, even in the case of a structure in which the display portion of the display apparatus 10A is seen through an optical member such as a lens, pixels of the extremely-high-resolution display portion included in the display apparatus 10A are not seen when the display portion is magnified by the lens, so that display providing a high sense of immersion can be performed.

Note that in the case where the display apparatus 10A is used as a wearable display apparatus for VR or AR, the display portion 13 can have a diagonal size greater than or equal to 0.1 inches and less than or equal to 5.0 inches, preferably greater than or equal to 0.5 inches and less than or equal to 2.0 inches, further preferably greater than or equal to 1 inch and less than or equal to 1.7 inches. For example, the display portion 13 may have a diagonal size of 1.5 inches or approximately 1.5 inches. When the display portion 13 has a diagonal size less than or equal to 2.0 inches, the number of times of light exposure treatment using a light exposure apparatus (typically, a scanner apparatus) can be one; thus, the productivity of a manufacturing process can be improved.

The display apparatus 10A according to one embodiment of the present invention can be used for an electronic device other than a wearable electronic device. In that case, the display portion 13 can have a diagonal size greater than 2.0 inches. The structure of transistors used in the pixel circuits 51 may be selected as appropriate depending on the diagonal size of the display portion 13. In the case where single crystal Si transistors are used in the pixel circuits 51, for example, the diagonal size of the display portion 13 is preferably greater than or equal to 0.1 inches and less than or equal to 3 inches. In the case where LTPS transistors are used in the pixel circuits 51, the diagonal size of the display portion 13 is preferably greater than or equal to 0.1 inches and less than or equal to 30 inches, further preferably greater than or equal to 1 inch and less than or equal to 30 inches. In the case where LTPO (a structure in which an LTPS transistor and an OS transistor are combined) is employed in the pixel circuit 51, the diagonal size of the display portion 13 is preferably greater than or equal to 0.1 inches and less than or equal to 50 inches, further preferably greater than or equal to 1 inch and less than or equal to 50 inches. In the case where OS transistors are used in the pixel circuits 51, the diagonal size of the display portion 13 is preferably greater than or equal to 0.1 inches and less than or equal to 200 inches, further preferably greater than or equal to 50 inches and less than or equal to 100 inches.

With single crystal Si transistors, a size increase is extremely difficult because of the size of a single crystal Si substrate. Furthermore, since a laser crystallization apparatus is used in the manufacturing process, LTPS transistors are unlikely to respond to a size increase (typically to a screen diagonal greater than 30 inches). By contrast, since the manufacturing process does not necessarily require a laser crystallization apparatus or the like or can be performed at a relatively low process temperature (typically, lower than or equal to 450° C.), OS transistors can be used for a display panel with a relatively large area (typically, a screen diagonal greater than or equal to 50 inches and less than or equal to 100 inches). In addition, LTPO is applicable to a diagonal size of a display portion between the case of using LTPS transistors and the case of using OS transistors (typically, greater than or equal to 1 inch and less than or equal to 50 inches).

Specific structure examples of the driver circuit 30 and the functional circuit 40 will be described with reference to FIG. 4. The block diagram of the display apparatus 10A in FIG. 4 illustrates a plurality of wirings connecting the pixel circuits 51, the driver circuit 30, and the functional circuit 40, a bus wiring in the display apparatus 10A, and the like.

Figure 4:
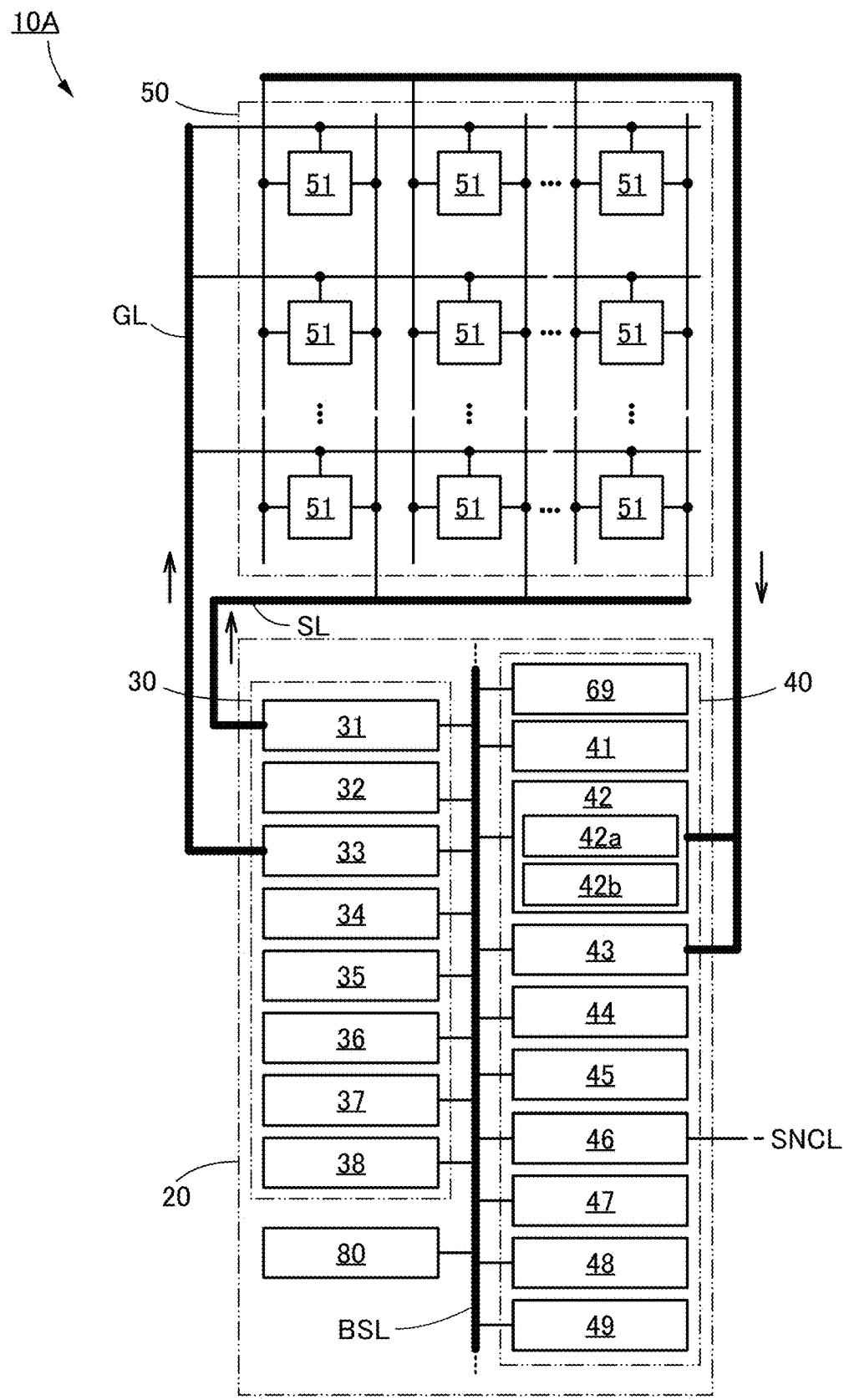
FIG. 4 is a diagram illustrating a structure example of a display apparatus.

In the display apparatus 10A illustrated in FIG. 4, the plurality of pixel circuits 51 are arranged in a matrix in the layer 50.

Furthermore, the driver circuit 30, the functional circuit 40, and the input/output circuit 80 are provided in the layer 20 in the display apparatus 10A illustrated in FIG. 4. The driver circuit 30 includes, for example, a source driver circuit 31, a digital-analog converter (DAC) circuit 32, a gate driver circuit 33, a level shifter 34, an amplifier circuit 35, an inspection circuit 36, a video generation circuit 37, and a video distribution circuit 38. The functional circuit 40 includes, for example, the luminance conversion circuit 69, a memory device 41, a GPU (AI accelerator) 42, an EL correction circuit 43, a timing controller 44, a CPU 45, a sensor controller 46, a power supply circuit 47, a temperature sensor 48, and a luminance correction circuit 49. The functional circuit 40 has a function of an application processor.

The input/output circuit 80 is compatible with a transmission method such as LVDS (Low Voltage Differential Signaling), and the input/output circuit 80 has a function of dividing control signals, image data, and the like input via the terminal portion 14 between the driver circuit 30 and the functional circuit 40. Furthermore, the input/output circuit 80 has a function of outputting information of the display apparatus 10A to the outside via the terminal portion 14.

In the display apparatus 10A in FIG. 4, an example of a structure in which the circuits included in the driver circuit 30 and the circuits included in the functional circuit 40 are each electrically connected to a bus wiring BSL is illustrated.

The source driver circuit 31 has a function of transmitting image data to the pixel circuits 51 included in the pixels 230, for example. Thus, the source driver circuit 31 is electrically connected to the pixel circuits 51 through a wiring SL. Note that a plurality of source driver circuits 31 may be provided.

The digital-analog converter circuit 32 has a function of converting image data that has been digitally processed by a GPU, a correction circuit, or the like described later, into analog data, for example. The image data converted into analog data is amplified by the amplifier circuit 35 such as an operational amplifier and is transmitted to the pixel circuits 51 via the source driver circuit 31. Note that the image data may be transmitted to the source driver circuit 31, the digital-analog converter circuit 32, and the pixel circuits 51 in this order. The digital-analog converter circuit 32 and the amplifier circuit 35 may be included in the source driver circuit 31.

The gate driver circuit 33 has a function of selecting the pixel circuit to which image data is to be transmitted among the pixel circuits 51, for example. Thus, the gate driver circuit 33 is electrically connected to the pixel circuits 51 through a wiring GL. Note that a plurality of gate driver circuits 33 may be provided such that the number of the gate driver circuits 33 corresponds to the number of the source driver circuits 31.

The level shifter 34 has a function of converting signals to be input to the source driver circuit 31, the digital-analog converter circuit 32, the gate driver circuit 33, and the like into appropriate levels, for example.

The luminance conversion circuit 69 has a function of converting image data displayed on the pixel circuit 51 in a section where display with a low driving frequency is performed to image data to be displayed with low luminance, for example. The conversion to the image data where display with low luminance is controlled by a proportion of a period where a black image is inserted in one frame period in a section where display with a high driving frequency is performed (a duty cycle). For example, in the case where the duty cycle is 50% (the ratio of a period where a light-emitting element emits light to a period where a black image is inserted is 1:1), the image data converted by the luminance conversion circuit 69 is image data with 50% reduced luminance compared to the original image data displayed. For example, in the case where the duty cycle is 20% (the ratio of a period where a light-emitting element emits light to a period where a black image is inserted is 1:4), the image data converted by the luminance conversion circuit 69 is image data with 20% reduced luminance compared to the original image data displayed.

In such a manner, a luminance difference between luminance based on image data of a section where a black image is not inserted between images and luminance based on image data of a section where a black image is inserted between images, which is also based on a difference of a lighting period, can be small, whereby display where a difference in luminance is not easily recognized can be performed even when the driving frequency is reduced in a section distant from the gaze point and a black image is not inserted between images for the display.

The memory device 41 has a function of storing image data to be displayed by the pixel circuits 51, for example. Note that the memory device 41 can be configured to store the image data as digital data or analog data.

In the case where the memory device 41 stores image data, the memory device 41 is preferably a nonvolatile memory. In that case, a NAND memory or the like can be used as the memory device 41, for example.

In the case where the memory device 41 stores temporary data generated in the GPU 42, the EL correction circuit 43, the CPU 45, or the like, the memory device 41 is preferably a volatile memory. In that case, an SRAM (Static Random Access Memory), a DRAM (Dynamic Random Access Memory), or the like can be used as the memory device 41, for example.

The GPU 42 has a function of performing processing for outputting, to the pixel circuits 51, image data read from the memory device 41, for example. Specifically, the GPU 42 is configured to perform pipeline processing in parallel and thus can perform high-speed processing of image data to be output to the pixel circuits 51. The GPU 42 can also have a function of a decoder for decoding an encoded image.

The functional circuit 40 may include a plurality of circuits that can improve the display quality of the display apparatus 10A. As such circuits, for example, correction (toning and dimming) circuits that detect color irregularity of a displayed image and correct the color irregularity to obtain an optimal image may be provided. In the case where a light-emitting device utilizing organic EL is used as the display element, for example, an EL correction circuit that corrects image data in accordance with the properties of the light-emitting device may be provided in the functional circuit 40. The functional circuit 40 includes, for example, the EL correction circuit 43.

The above-described image correction may be performed using artificial intelligence. For example, a current flowing in a pixel circuit (or a voltage applied to the pixel circuit) may be monitored and obtained, a displayed image may be obtained with an image sensor or the like, the current (or voltage) and the image may be used as input data in an arithmetic operation of the artificial intelligence (e.g., an artificial neural network), and the output result may be used to judge whether the image should be corrected.

Such an arithmetic operation of artificial intelligence can be applied to not only image correction but also upconversion for increasing the definition of image data. As an example, FIG. 4 illustrates the GPU 42 that includes blocks for performing arithmetic operations for various kinds of correction (e.g., color irregularity correction 42*a* and upconversion 42*b*).

The upconversion processing of image data can be performed with an algorithm selected from a Nearest neighbor method, a Bilinear method, a Bicubic method, a RAISR (Rapid and Accurate Image Super-Resolution) method, an ANR (Anchored Neighborhood Regression) method, an A+ method, an SRCNN (Super-Resolution Convolutional Neural Network) method, and the like.

The algorithm used for the upconversion processing may be different for each region determined in accordance with a gaze point. For example, upconversion processing for a region including the gaze point and the vicinity of the gaze point is performed using an algorithm with a low processing speed but high accuracy, and upconversion processing for a region other than the above region is performed using an algorithm with low accuracy but a high processing speed. In that case, the time required for upconversion processing can be shortened. In addition, power consumption required for upconversion processing can be reduced.

Without limitation to upconversion processing, downconversion processing for decreasing the definition of image data may be performed. In the case where the definition of image data is higher than the definition of the display portion 13, part of the image data is not displayed on the display portion 13, in some cases. In that case, downconversion processing enables the entire image data to be displayed on the display portion 13.

The timing controller 44 has a function of controlling a driving frequency (e.g., a frame frequency, a frame rate, or a refresh rate) for displaying an image, for example. In the case where a still image is displayed on the display apparatus 10A, for example, the driving frequency is lowered by the timing controller 44, so that power consumption of the display apparatus 10A can be reduced.

The CPU 45 has a function of performing general-purpose processing such as execution of an operating system, control of data, and execution of various kinds of arithmetic operations and programs, for example. The CPU 45 has a role in, for example, giving an instruction for a writing operation or a reading operation of image data in the memory device 41, an operation for correcting image data, an operation for a later-described sensor, or the like. Furthermore, the CPU 45 may have a function of transmitting a control signal to at least one of the circuits included in the functional circuit 40, for example.

The sensor controller 46 has a function of controlling a sensor, for example. FIG. 4 illustrates a wiring SNCL as a wiring for electrical connection to the sensor.

The sensor can be, for example, a touch sensor that can be provided in the display portion. Alternatively, the sensor can be an illuminance sensor, for example.

The power supply circuit 47 has a function of generating voltages to be supplied to the circuits and the like included in the pixel circuits 51, the driver circuit 30, and the functional circuit 40, for example. Note that the power supply circuit 47 may have a function of selecting a circuit to which a voltage is to be supplied. The power supply circuit 47 can stop supply of a voltage to the CPU 45, the GPU 42, and the like during a period in which a still image is displayed so that the power consumption of the whole display apparatus 10A is reduced, for example.

As described above, the display apparatus of one embodiment of the present invention can have a structure in which display elements, pixel circuits, a driver circuit, and the functional circuit 40 are stacked. The driver circuit and the functional circuit, which are peripheral circuits, can be provided so as to overlap with the pixel circuits and thus the width of the bezel can be made extremely small, so that a reduction in size of the display apparatus can be achieved. A structure of the display apparatus of one embodiment of the present invention in which circuits are stacked enables its wirings connecting the circuits to be shortened, resulting in a reduction in weight of the display apparatus. The display apparatus of one embodiment of the present invention can be a display portion with an increased pixel resolution; thus, the display apparatus can have high display quality.

<Structure Example of Display Module>

Next, a structure example of a display module including the display apparatus 10A will be described.

Figure 5A:
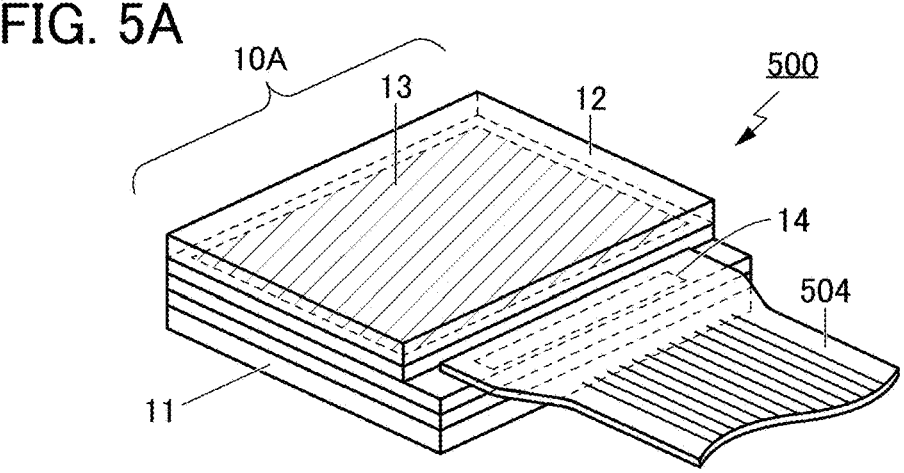
FIG. 5A to FIG. 5C are perspective views of a display module.
Figure 5B:
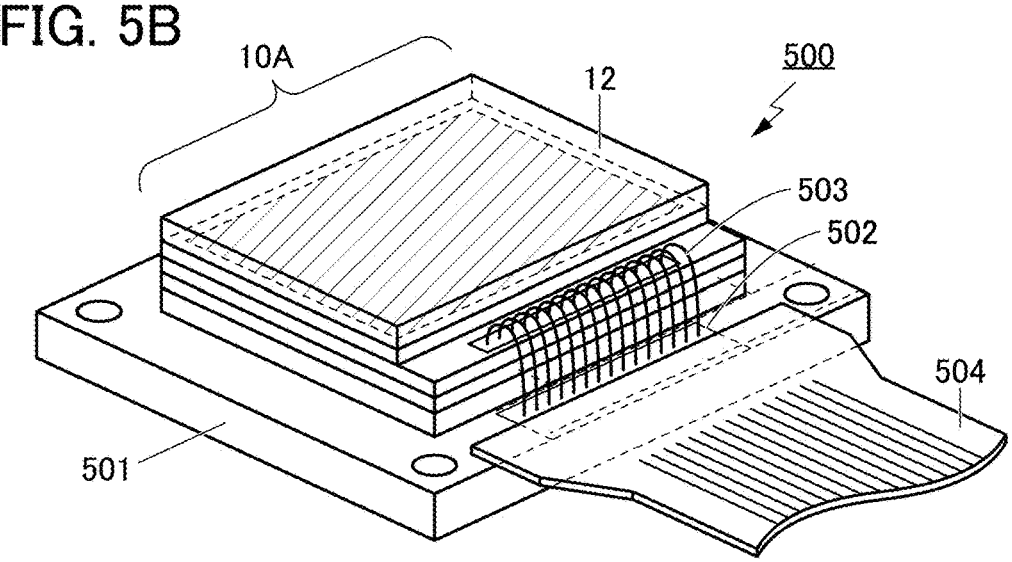
Figure 5C:
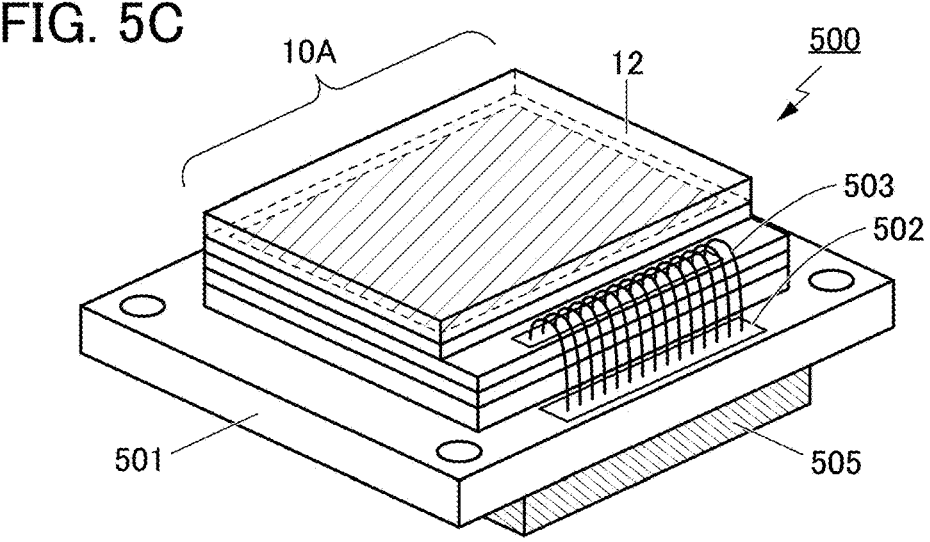

FIG. 5A to FIG. 5C are each a perspective view of a display module 500. The display module 500 has a structure in which an FPC (Flexible printed circuit) 504 is provided on the terminal portion 14 of the display apparatus 10A. The FPC 504 has a structure in which a film formed of an insulator is provided with a wiring. The FPC 504 is flexible. The FPC 504 functions as a wiring for supplying a video signal, a control signal, a power supply potential, and the like to the display apparatus 10A from the outside. An IC may be mounted on the FPC 504.

The display module 500 illustrated in FIG. 5B includes the display apparatus 10A over a printed wiring board 501. The printed wiring board 501 includes wirings inside a substrate formed of an insulator and/or on the surface of the substrate.

In the display module 500 illustrated in FIG. 5B, the terminal portion 14 of the display apparatus 10A is electrically connected to a terminal portion 502 of the printed wiring board 501 through a wire 503. The wire 503 can be formed in wire bonding. Ball bonding or wedge bonding can be used as the wire bonding.

After the wire 503 is formed, the wire 503 may be covered with a resin material or the like. Note that the display apparatus 10A and the printed wiring board 501 may be electrically connected to each other by a method other than the wire bonding. For example, the display apparatus 10A and the printed wiring board 501 may be electrically connected to each other using an anisotropic conductive adhesive or a bump.

In the display module 500 illustrated in FIG. 5B, the terminal portion 502 of the printed wiring board 501 is electrically connected to the FPC 504. In the case where the electrode pitch in the terminal portion 14 of the display apparatus 10A is different from the electrode pitch in the FPC 504, for example, the terminal portion 14 may be electrically connected to the FPC 504 via the printed wiring board 501. Specifically, the interval (pitch) between a plurality of electrodes in the terminal portion 14 can be converted into the interval between a plurality of electrodes in the terminal portion 502 using wirings formed on the printed wiring board 501. Accordingly, even when the electrode pitch in the terminal portion 14 is different from the electrode pitch in the FPC 504, electrical connection between the electrodes can be achieved.

The printed wiring board 501 can be provided with a variety of elements such as a resistor, a capacitor element, and a semiconductor element.

As in the display module 500 illustrated in FIG. 5C, the terminal portion 502 may be electrically connected to a connection portion 505 provided on the bottom surface (a surface where the display apparatus 10A is not provided) of the printed wiring board 501. With the use of a socket-type connection portion as the connection portion 505, for example, the display module 500 can be easily attached to and detached from another device.

<Operation Example of Electronic Device>

Figure 6:
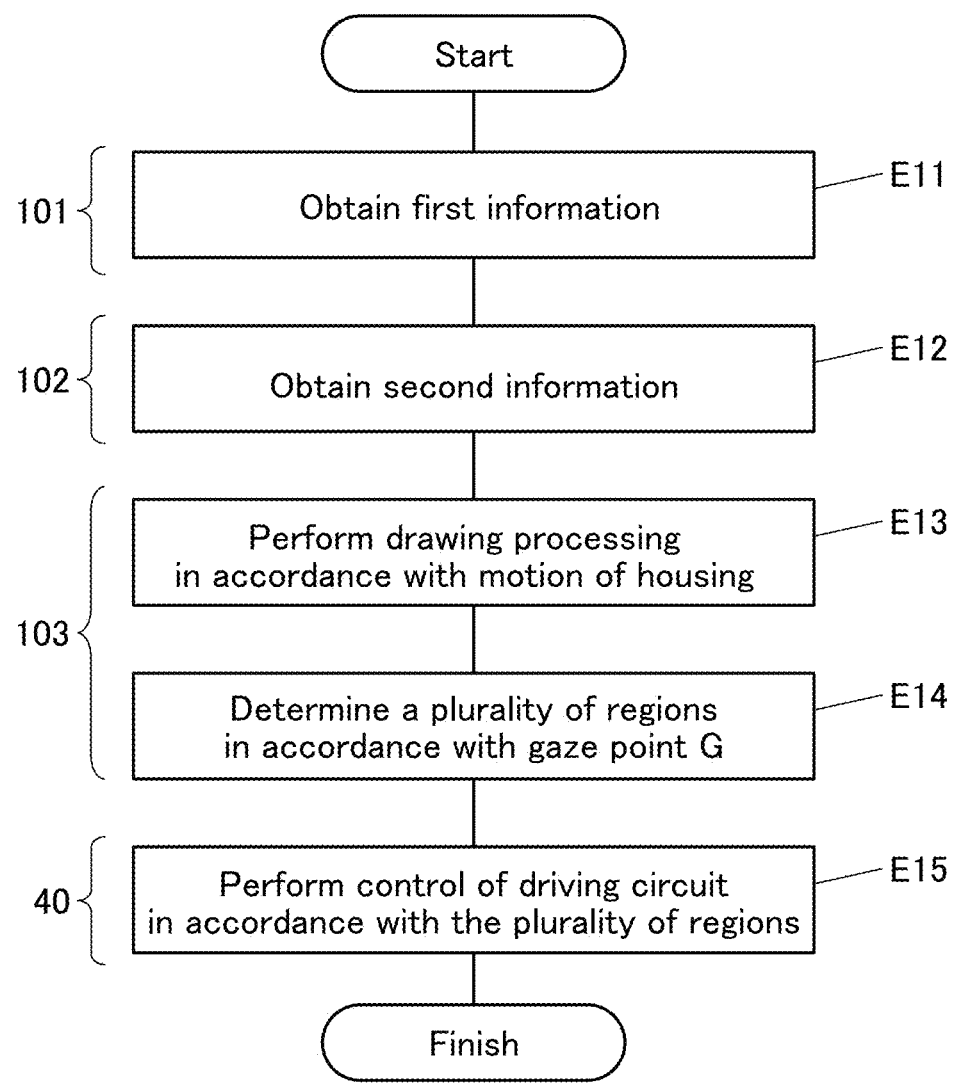
FIG. 6 is a diagram illustrating a structure example of a display apparatus.

An operation example of the electronic device 100 will be described with reference to drawings. FIG. 6 is a flow chart for illustrating the operation example of the electronic device 100.

The motion detection portion 101 obtains the first information (the information on the motion of the housing 105) (Step E11).

The gaze detection portion 102 obtains the second information (the information on the user's gaze) (Step E12).

The arithmetic portion 103 performs drawing processing of 360-degree omnidirectional image data on the basis of the first information (Step E13).

Figure 7A:
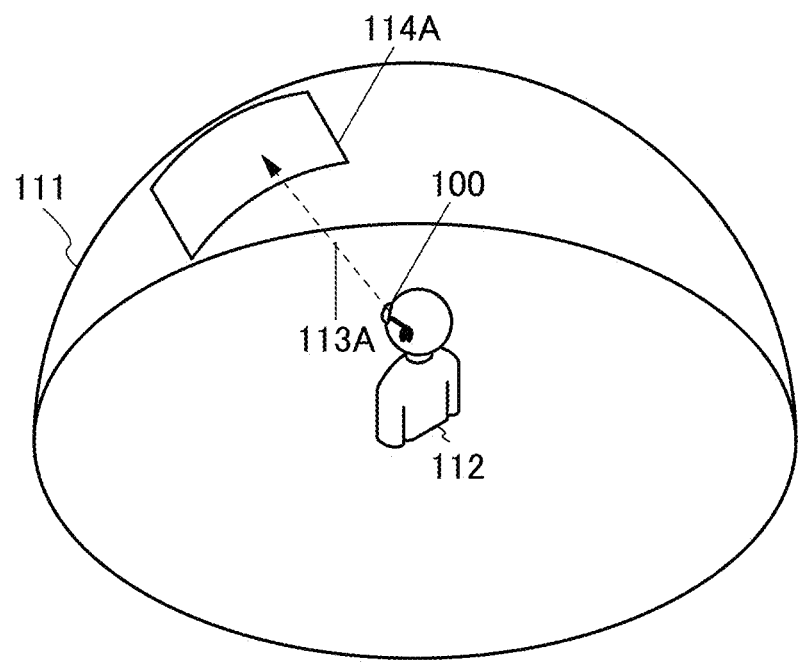
FIG. 7A and FIG. 7B are schematic diagrams illustrating structure examples of an electronic device.

Step E13 is described by giving a specific example. The schematic view in FIG. 7A illustrates a user 112 positioned at the center of a 360-degree omnidirectional image data 111. The user can see an image 114A that is displayed on the display apparatus 10A of the electronic device 100 and that is in a direction 113A.

Figure 7B:
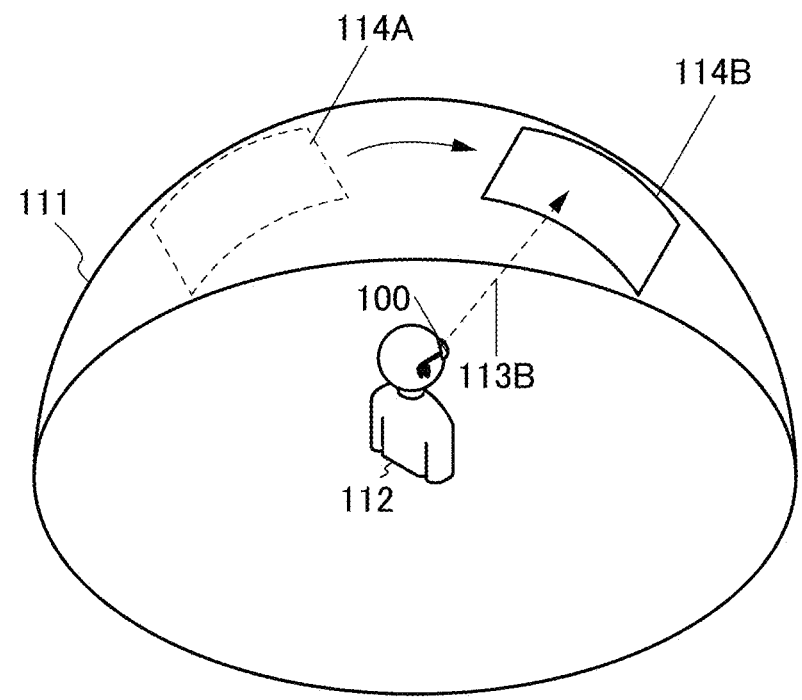

The schematic view in FIG. 7B illustrates the state where the user 112 that has been in the state of the schematic view in FIG. 7A moves his/her head to see an image 114B that is in a direction 113B. The image 114A changes into the image 114B in accordance with the motion of the housing of the electronic device 100, so that the user 112 can perceive the space expressed by the 360-degree omnidirectional image data 111.

As illustrated in FIG. 7A and FIG. 7B, the user 112 moves the housing of the electronic device 100 in accordance with the motion of his/her head. When an image obtained from the 360-degree omnidirectional image data 111 in accordance with the motion of the electronic device 100 is processed with higher drawing processing capacity, the user 112 can perceive a virtual space closer to the real world.

Figure 8A:
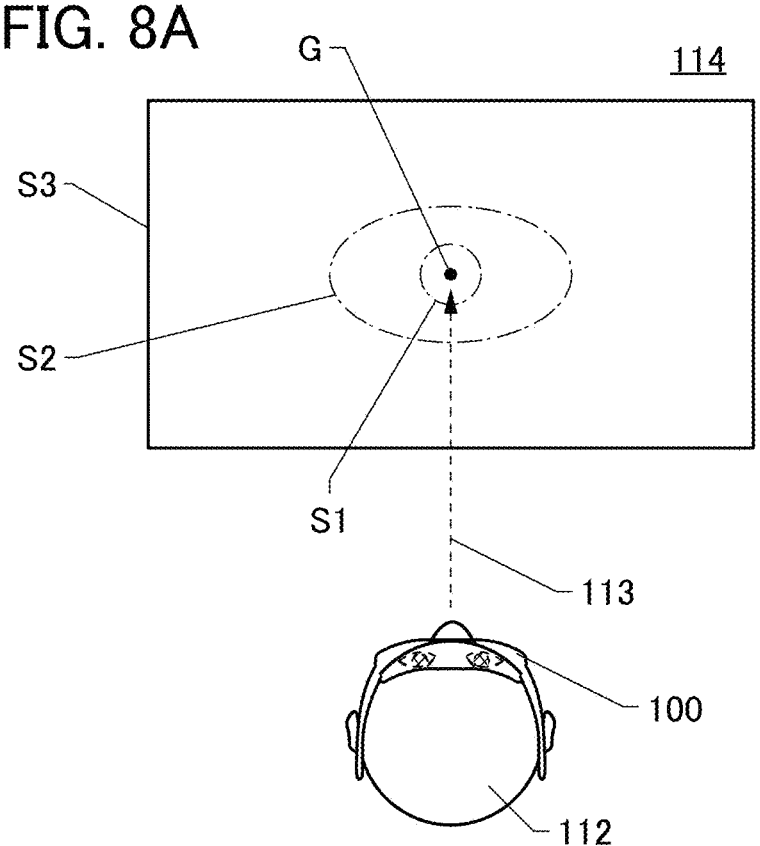
FIG. 8A and FIG. 8B are schematic diagrams illustrating structure examples of an electronic device.

The arithmetic portion 103 determines a plurality of regions of the display portion in the display apparatus in accordance with a gaze point G based on the second information (Step E14). As illustrated in FIG. 8A, the first region S1 including the gaze point G is determined, the second region S2 adjacent to the first region S1 is determined, for example. Furthermore, the outside of the second region is the third region S3.

Step E14 is described by giving a specific example.

In general, the human visual field is roughly classified into the following five fields, although varying between individuals. The discrimination visual field refers to a region including a gaze point within approximately 5° from the center of vision, where visual performance such as eyesight and color identification is the most excellent. The effective visual field refers to a region that is horizontally within approximately 30° and vertically within approximately 20° from the center of vision (a gaze point) and adjacent to the outside of the discrimination visual field, where instant identification of particular information is possible only with an eye movement. The stable visual field refers to a region that is horizontally within approximately 90° and vertically within approximately 70° from the center of vision and adjacent to the outside of the effective visual field, where identification of particular information is possible without any difficulty with a head movement. The inducting visual field refers to a region that is horizontally within approximately 100° and vertically within approximately 85° from the center of vision and adjacent to the outside of the stable visual field, where the existence of a particular target can be sensed but the identification ability is low. The supplementary visual field refers to a region that is horizontally within approximately 100° to 200° and vertically within approximately 85° to 130° from the center of vision and adjacent to the outside of the inducting visual field, where the identification ability for a particular target is significantly low to an extent that the existence of a stimulus can be sensed.

From the above, it is found that the image quality in the discrimination visual field and the effective visual field is important in the image 114. The image quality in the discrimination visual field is particularly important.

FIG. 8A is a schematic view illustrating the state where the user 112 sees the image 114 displayed on the display portion of the display apparatus 10A of the electronic device 100 from the front (image display surface). The image 114 illustrated in FIG. 8A also corresponds to the display portion. The gaze point G in the direction of a gaze 113 of the user 112 is illustrated on the image 114. In this specification and the like, a region including the discrimination visual field and a region including the effective visual field on the image 114 are referred to as the "first region S1" and the "second region S2", respectively. Furthermore, a region including the stable visual field, the inducting visual field, and/or the supplementary visual field is referred to as the "third region S3".

Figure 8B:
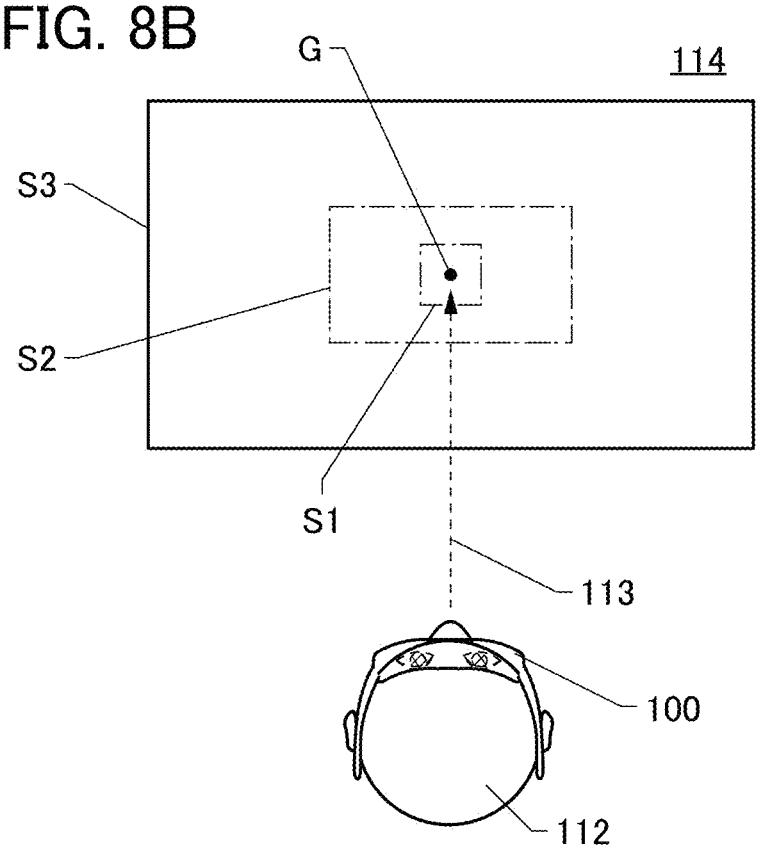

Although the boundary (outline) between the first region S1 and the second region S2 is illustrated by a curved line in FIG. 8A, one embodiment of the present invention is not limited thereto. As illustrated in FIG. 8B, the boundary (outline) between the first region S1 and the second region S2 may be rectangular or polygonal. Alternatively, the boundary may have a shape in which a straight line and a curved line are combined. The display portion of the display apparatus 10A may be divided into two regions; one of the regions including the discrimination visual field and the effective visual field may be referred to as the first region S1, and the other region may be referred to as the second region S2. In this case, the third region S3 is not formed.

Figure 9A:
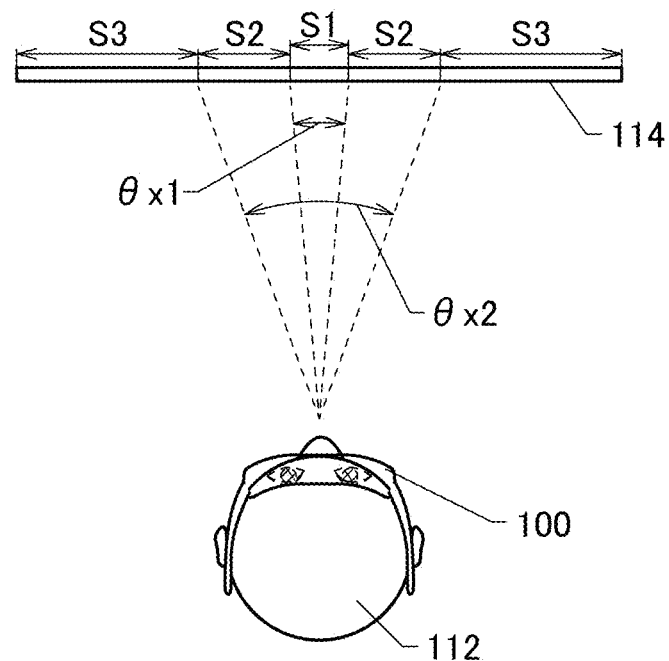
FIG. 9A and FIG. 9B are schematic diagrams illustrating structure examples of an electronic device.
Figure 9B:
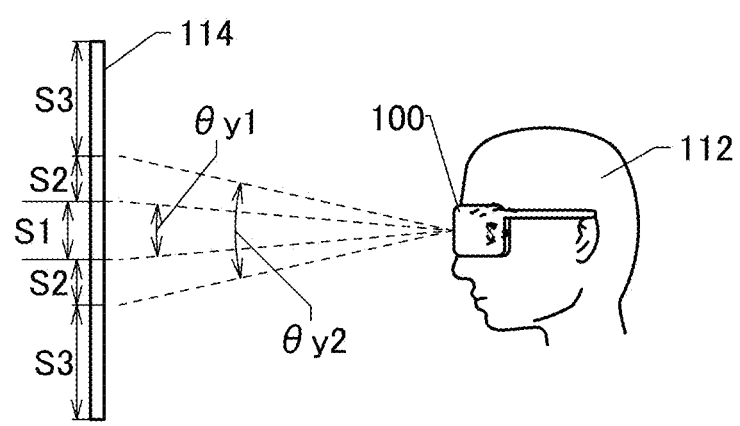

FIG. 9A is a top view of the image 114 displayed on the display portion of the display apparatus 10A of the electronic device 100, and FIG. 9B is a side view of the image 114 displayed on the display portion of the display apparatus 10A of the electronic device 100. In this specification and the like, the angle of the first region S1 in the horizontal direction is shown by "angle $\theta x1$", and the angle of the second region S2 in the horizontal direction is shown by "angle $\theta x2$" (see FIG. 9A). In this specification and the like, the angle of the first region S1 in the vertical direction is shown by "angle $\theta y1$", and the angle of the second region S2 in the vertical direction is shown by "angle $\theta y2$" (see FIG. 9B).

For example, by setting the angle $\theta x1$ to 10° and the angle $\theta y1$ to 10°, the area of the first region S1 can be widened. In that case, part of the effective visual field is included in the first region S1. Furthermore, by setting the angle $\theta x2$ to 45° and the angle $\theta y2$ to 35°, the area of the second region S2 can be widened. In that case, part of the stable visual field is included in the second region S2.

The position of the gaze point G varies to some extent by a swing of the user 112. Thus, the angle $\theta x1$ and the angle $\theta y1$ are each preferably greater than or equal to 5° and smaller than 20°. When the area of the first region S1 is set larger than the discrimination visual field, the operation of the display apparatus 10A is stabilized and the image visibility is improved.

When the gaze 113 of the user 112 moves, the gaze point G also moves. Accordingly, the first region S1 and the second region S2 also move. For example, in the case where the fluctuation amount of the gaze 113 exceeds a certain value, it is judged that the gaze 113 is moving. That is, in the case where the fluctuation amount of the gaze point G exceeds a certain value, it is judged that the gaze point G is moving. Furthermore, in the case where the fluctuation amount of the gaze 113 becomes lower than or equal to the certain value, it is judged that the gaze 113 has stopped moving, and the first region S1 to the third region S3 are determined. That is, in the case where the fluctuation amount of the gaze point G becomes lower than or equal to the certain value, it is judged that the gaze point G has stopped moving, and the first region S1 to the third region S3 are determined.

The functional circuit 40 performs control of the driver circuit 30 differing between a plurality of regions (the first region S1 to the third region S3) (Step E15).

<Specific Example of Display Apparatus>

Figure 10A:
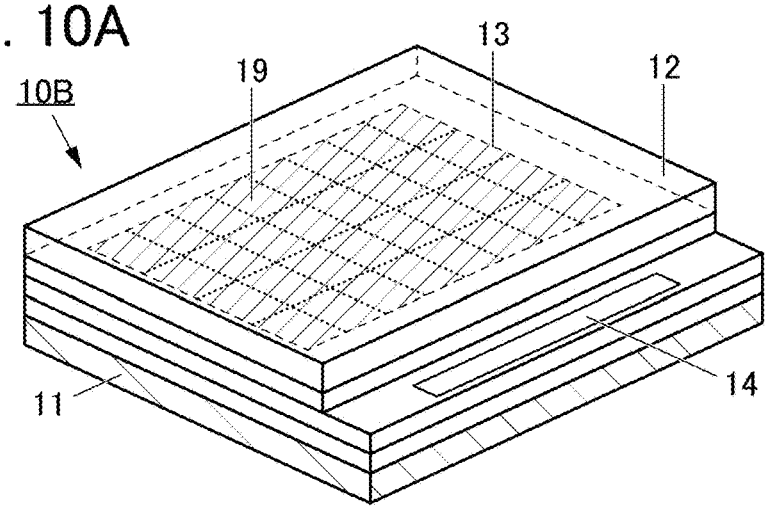
FIG. 10A and FIG. 10B are diagrams illustrating a structure example of a display apparatus.
Figure 10B:
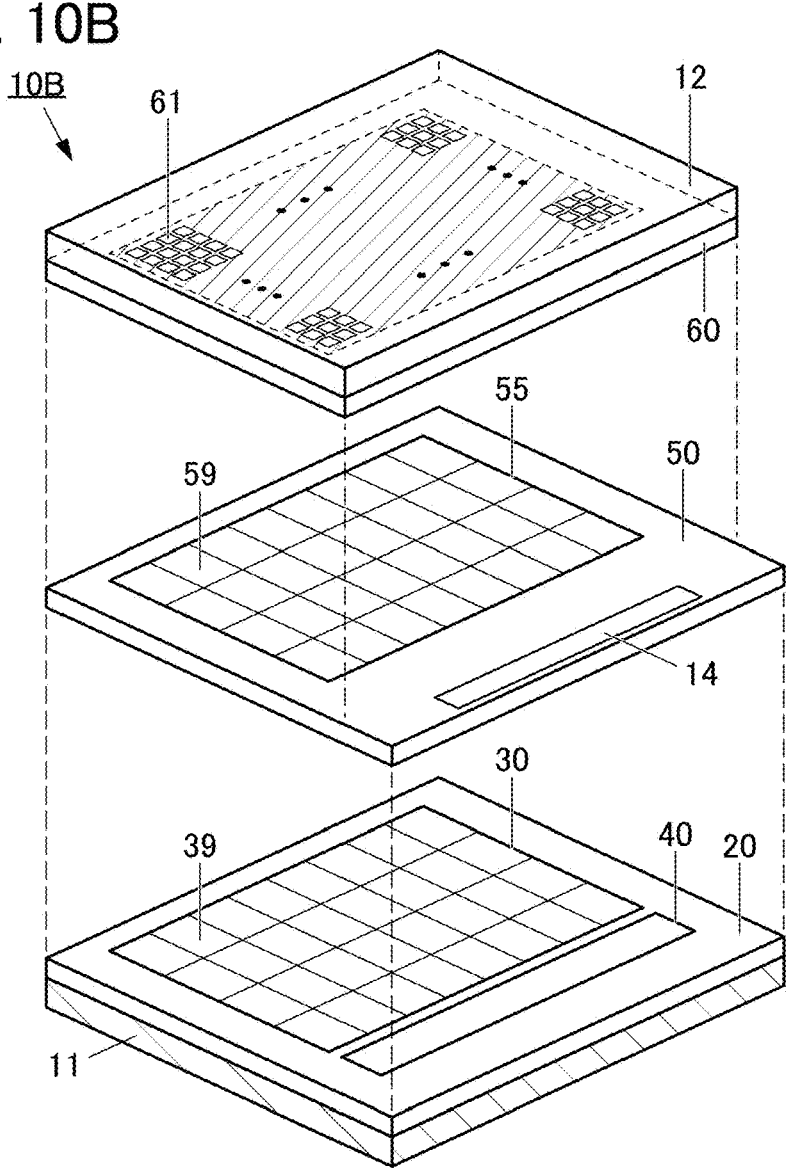

FIG. 10A and FIG. 10B illustrate perspective views of a display apparatus 10B which corresponds to a specific example of the display apparatus 10A. FIG. 10B is a perspective view for illustrating structures of layers included in the display apparatus 10B. Description is made mainly on portions different from those of the display apparatus 10A to reduce repeated description.

In the display apparatus 10B, the driver circuit 30 and the pixel circuit group 55 including the plurality of pixel circuits 51 overlap with each other. In the display apparatus 10B, the pixel circuit group 55 is divided into a plurality of sections 59 and the driver circuit 30 is divided into a plurality of sections 39. The plurality of sections 39 each include the source driver circuit 31 and the gate driver circuit 33.

Figure 11A:
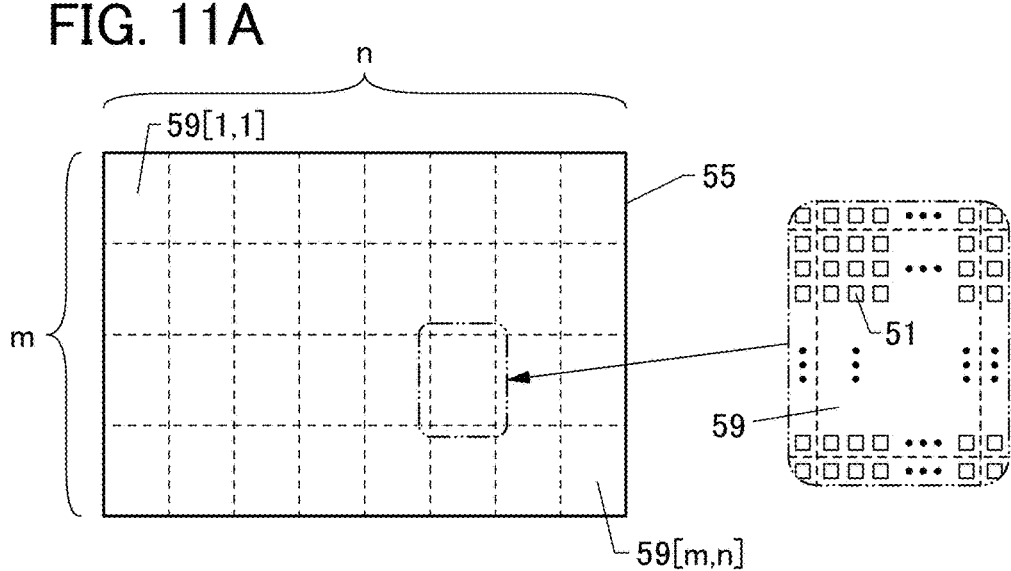
FIG. 11A to FIG. 11D are diagrams illustrating structure examples of a display apparatus.
Figure 11B:
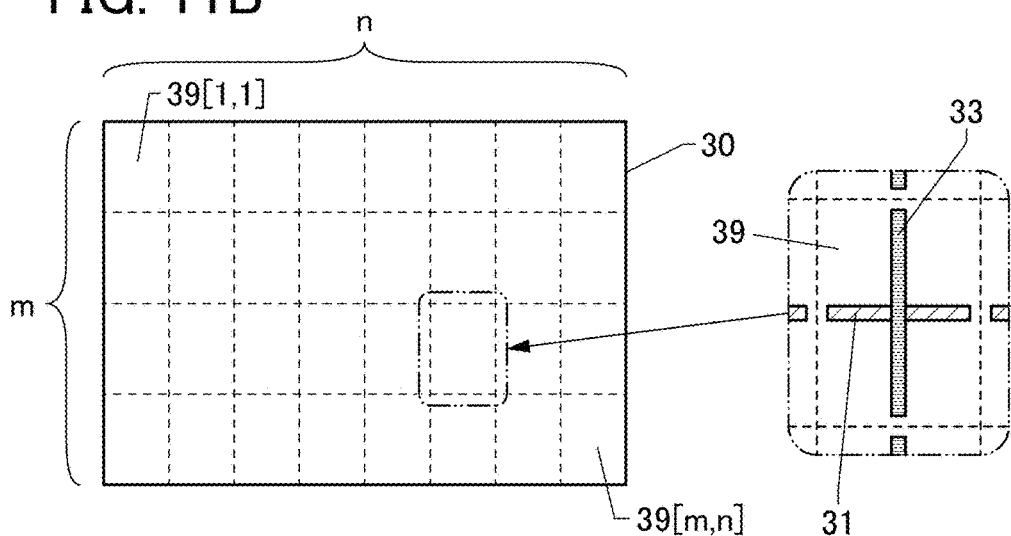

FIG. 11A illustrates a structure example of the pixel circuit group 55 included in the display apparatus 10B. FIG. 11B illustrates a structure example of the driver circuit 30 included in the display apparatus 10B. The sections 59 and the sections 39 are each arranged in a matrix of m rows and n columns (m and n are each an integer greater than or equal to 1). In this specification and the like, the section 59 in the first row and the first column is denoted by a section 59[1,1], and the section 59 in the m-th row and the n-th column is denoted by a section 59[m,n]. Similarly, the section 39 in the first row and the first column is denoted by a section 39[1, 1], and the section 39 in the m-th row and the n-th column is denoted by a section 39[m,n]. FIG. 11A and FIG. 11B illustrate a case where m is 4 and n is 8. That is, the pixel circuit group 55 and the driver circuit 30 are each divided into 32 sections.

The plurality of sections 59 each include the plurality of pixel circuits 51, a plurality of wirings SL, a plurality of wirings BL, and a plurality of wirings GL. In each of the plurality of sections 59, one of the plurality of pixel circuits 51 is electrically connected to at least one of the plurality of wirings SL, at least one of the plurality of wirings BL, and at least one of the plurality of wirings GL.

Figures 11C, 11D:
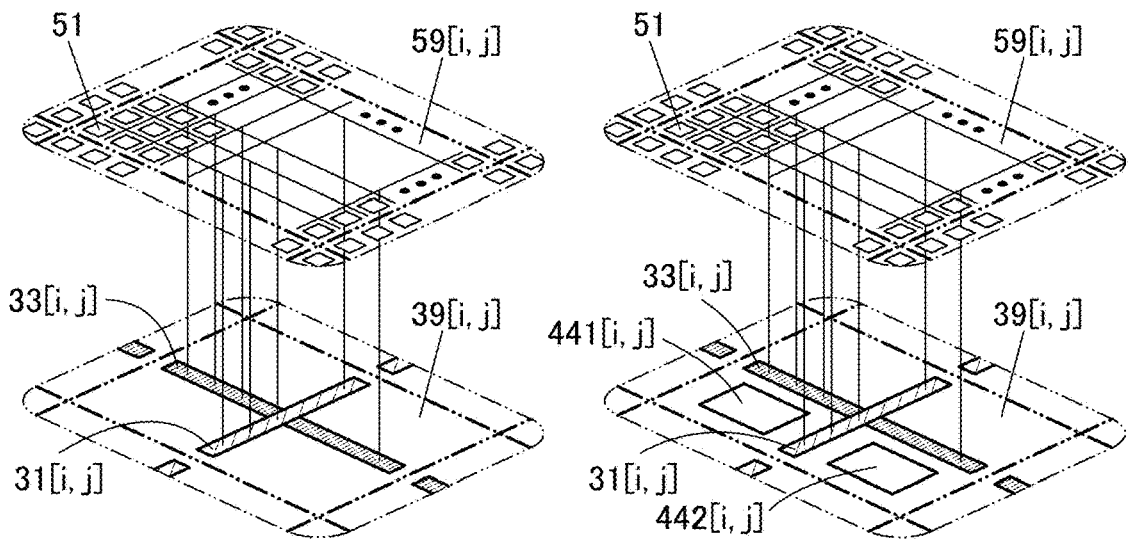

One of the sections 59 and one of the sections 39 are provided to overlap with each other (see FIG. 11C). For example, a section 59[i,j] (i is an integer greater than or equal to 1 and less than or equal to m, and j is an integer greater than or equal to 1 and less than or equal to n) and a section 39[i,j] are provided to overlap with each other. A source driver circuit 31[i,j] included in the section 39[i,j] is electrically connected to the wiring SL included in the section 59[i,j]. A gate driver circuit 33[i,j] included in the section 39[i,j] is electrically connected to the wiring GL and the wiring BL included in the section 59[i,j]. The source driver circuit 31[i,j] and the gate driver circuit 33[i,j] have a function of controlling the plurality of pixel circuits 51 included in the section 59[i,j].

When the section 59[i,j] and the section 39[i,j] are provided to overlap with each other, a connection distance (wiring length) between the pixel circuit 51 included in the section 59[i,j] and each of the source driver circuit 31 and the gate driver circuit 33 included in the section 39[i,j] can be made extremely short. As a result, the wiring resistance and the parasitic capacitance are reduced, and thus time taken for charging and discharging can be reduced and high-speed driving can be achieved. Moreover, power consumption can be reduced. Furthermore, the size and weight of the display apparatus can be reduced.

In addition, the display apparatus 10B includes the source driver circuit 31 and the gate driver circuit 33 in each of the sections 39. Thus, the display portion 13 can be divided into the sections 59 corresponding to the sections 39, and image data rewriting can be controlled in each section. For example, in the display portion 13, image data rewriting can be performed only in a section where an image has been changed and image data can be retained in a section with no change, so that power consumption can be reduced.

In this embodiment and the like, one section of the display portion 13 divided into the sections 59 is referred to as a sub-display portion 19. Thus, it can also be said that the sub-display portions 19 are divided to correspond to the sections 39. In the display apparatus 10B described with reference to FIG. 10 and FIG. 11, the display portion 13 is divided into 32 of the sub-display portions 19 (see FIG. 10A). Each of the sub-display portions 19 includes the plurality of pixels 230. Specifically, one of the sub-display portions 19 includes one of the sections 59 including the plurality of pixel circuits 51, and the plurality of light-emitting elements 61. Each of the sections 39 has a function of controlling the plurality of pixels 230 included in one of the sub-display portions 19.

In the display apparatus 10B, control of a proportion of a period where a black image is inserted in one frame (a duty cycle) can be set freely for each of the sub-display portions 19 by the timing controller included in the functional circuit 40. In the display apparatus 10B, a driving frequency at the time of displaying an image can be set freely for each of the sub-display portions 19 by the timing controller included in the functional circuit 40. In addition, in the display apparatus 10B, conversion of luminance in accordance with image data based on a duty cycle can be set freely for each of the sub-display portions 19 by the luminance conversion circuit included in the functional circuit 40. The functional circuit 40 has a function of controlling operations in the plurality of sections 39 and the plurality of sections 59. That is, the functional circuit 40 has a function of controlling the duty cycle, controlling the driving frequency, and controlling the proportion of luminance decrease at the time of converting the luminance based on the image data. In addition, the functional circuit 40 has a function of adjusting synchronization between the sub-display portions.

In the display apparatus 10B, by a combination with gaze measurement (eye tracking) or the like, foveated rendering, which is a driving in which the definition of a region is increased in accordance with the user's gaze, can be employed. Thus, an image with an excellent display quality can be output with a small load.

A timing controller 441 and an input/output circuit 442 may be provided for each of the sections 39 (see FIG. 11D). For the input/output circuit 442, an I2C (Inter-Integrated Circuit) interface can be used, for example. The timing controller 441 included in the section 39[i,j] is denoted as a timing controller 441[i,j] in FIG. 11D. Furthermore, the input/output circuit 442 included in the section 39[i,j] is denoted as an input/output circuit 442[i,j].

The functional circuit 40 supplies setting signals for the scan direction and a driving frequency of the gate driver circuit 33[i,j], control signals of a duty cycle, control signals of a proportion of luminance decrease in image data conversion, and operation parameters, such as the number of pixels in image data reduced for decreasing definition (the number of pixels where image data rewriting is not performed at the time of image data rewriting), to the input/output circuit 442[i,j], for example. The source driver circuit 31[i,j] and the gate driver circuit 33[i,j] operate in accordance with the operation parameters.

In the case where the sub-display portions 19 each include a light-receiving element, the input/output circuit 442 outputs information obtained by photoelectric conversion by the light-receiving element to the functional circuit 40.

In the display apparatus 10B in the electronic device of one embodiment of the present invention, in which has the structure where the pixel circuit 51 and the driver circuit 30 are stacked, a difference in luminance in accordance with a difference of a cumulative lighting period at the time of performing display with a high driving frequency where a black image is inserted between images and display with a low driving frequency where a black image is not inserted between images for each of the sub-display portions 19 in accordance with the user's gaze is reduced. Thus, display with a high driving frequency in the section close to the gaze point and with an excellent display quality by a motion blur reduction can be performed, and display where a difference in luminance is not easily recognized can be achieved even when the driving frequency in a section distant from the gaze point is reduced and a black image is not inserted between images for the display, so that high image quality and low power consumption can be achieved.

Figure 12A:
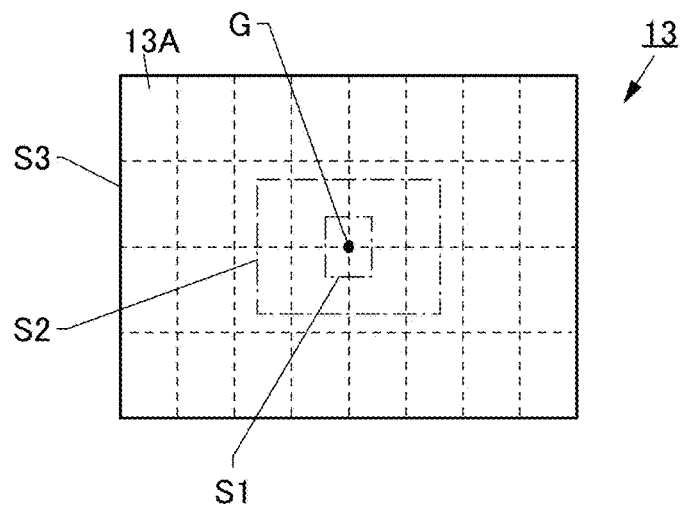
FIG. 12A to FIG. 12C are diagrams illustrating structure examples of a display apparatus.

FIG. 12A illustrates the display portion 13 including the sub-display portions 19 in four rows and eight columns. FIG. 12A also illustrates the first region S1 to the third region S3 with the gaze point G as a center. The arithmetic portion 103 allocates the plurality of sub-display portions 19 to a first section 29A overlapping with the first region S1 or the second region S2 or a second section 29B overlapping with the third region S3. In other words, the arithmetic portion 103 allocates the plurality of sections 39 to the first section 29A or the second section 29B. In this case, the first section 29A overlapping with the first region S1 or the second region S2 includes a region overlapping with the gaze point G. Furthermore, the second section 29B includes the sub-display portions 19 positioned outside the first section 29A (see FIG. 12B).

The operations of the driver circuits (the source driver circuit 31 and the gate driver circuit 33) included in each of the plurality of sections 39 are controlled by the functional circuit 40. For example, the second section 29B is a section overlapping with the third region S3 including the above-described stable visual field, inducting visual field, and supplementary visual field, and is hard for the user to discriminate. Thus, the user perceives a small reduction in practical display quality (hereinafter also referred to as "practical display quality") even when the number of times of image data rewriting per unit time (hereinafter also referred to as "image rewriting frequency") at the time of displaying an image is smaller in the second section 29B than in the first section 29A. In other words, a reduction in practical display quality is small even when the driving frequency of the sub-display portions 19 included in the second section 29B (also referred to as a "second driving frequency") is lower than the driving frequency of the sub-display portions 19 included in the first section 29A (also referred to as a "first driving frequency").

In the first section 29A, the functional circuit 40 alternately performs display based on image data and black display based on black image data in one frame period while the display is performed with a first driving frequency which is a high driving frequency. Thus, an image blur or an afterimage can be inhibited in the first section 29A. In the second section 29B, the functional circuit 40 only performs display based on image data in one frame period and does not perform insertion of black display based on black image data while the display is performed with a second driving frequency which is a lower driving frequency than the first driving frequency. Thus, when images with different driving frequencies are arranged and displayed, a black image recognized in a region with a low driving frequency can be less likely to be seen.

A lighting period of the light-emitting element is different for each section in accordance with presence or absence of black display based on black image data; thus, a difference in luminance between sections is significantly recognized as compared to the original image. In one embodiment of the present invention, display of a section where a black image is not inserted between images with a low driving frequency is supplied to a section distant from the gaze point by converting image data supplied to the section to image data with reduced luminance by the luminance conversion circuit 69. Thus, a difference in luminance corresponding to a difference in the cumulative lighting period between display with a high driving frequency where a black image is inserted between images and display with a low driving frequency where a black image is not inserted between images can be reduced. Thus, display with a high driving frequency in the section close to the gaze point and with an excellent display quality by a motion blur reduction can be performed, and display where a difference in luminance is not easily recognized can be performed even when the driving frequency in the section distant from the gaze point is reduced and a black image is not inserted between images for the display.

Low driving frequency can result in a reduction in power consumption of the display apparatus. On the other hand, a decrease in the driving frequency reduces the display quality. In particular, the display quality is decreased in display of moving image and display of black image. According to one embodiment of the present invention, a structure is employed where the second driving frequency is lower than the first driving frequency and black image insertion is not performed in a section where the visibility by the user is low. Image data supplied to the section where the visibility by the user is low is subjected to correction so as to have luminance corresponding to the duty cycle of a section where black display is performed based on black image data, whereby power consumption of the section where the visibility by the user is low can be reduced and reduction in the practical display quality can be inhibited. According to one embodiment of the present invention, both display quality maintenance and a reduction in power consumption can be achieved.

The first driving frequency can be higher than or equal to 30 Hz and lower than or equal to 500 Hz, preferably higher than or equal to 60 Hz and lower than or equal to 500 Hz. The second driving frequency is preferably lower than or equal to the first driving frequency, further preferably lower than or equal to a half of the first driving frequency, still further preferably lower than or equal to one fifth of the first driving frequency.

The above-described duty cycle in the first section 29A can have a structure where the proportion of a non-lighting period (a period of black display based on black image data) is larger than the proportion of a lighting period (a period of display based on image data) in one frame period. For example, the non-lighting period can be a period accounting for 10% to 50% of one frame period, and can be 50% of one frame period, for example. The conversion of image data in the second section 29B can be performed so as to have luminance corresponding to the duty cycle, and when the duty cycle in the first section 29A is 20% (the proportion of a lighting period), for example, image data can be converted so as to have the luminance that is 20% of the luminance of image data before corrected. That is, the luminance conversion circuit 69 has a function of converting image data to image data with luminance reduced from that of the original image data when image data is converted corresponding to the duty cycle.

A section of the sub-display portions 19 overlapping with the third region S3 may be set as a third section 29C (see FIG. 12C) on the outer side of the second section 29B, and the driving frequency of the sub-display portions 19 included in the third section 29C (also referred to as a "third driving frequency") may be made lower than the driving frequency in the second section 29B. The third driving frequency is preferably lower than or equal to the second driving frequency, further preferably lower than or equal to a half of the second driving frequency, still further preferably lower than or equal to one fifth of the second driving frequency. The presence or absence of a driving where a black image is inserted between images for each section or conversion of image data can be performed in a manner similar to the description in FIG. 12B. By significantly lowering image rewriting frequency, power consumption can be further reduced. In addition, a difference in luminance in accordance with the presence or absence of a driving where a black image is inserted between images can be less easily to be recognized. Note that rewriting of image data may be stopped if necessary. By stopping rewriting of image data, power consumption can be further reduced.

In the case where such a driving method is employed, a transistor with an extremely low off-state current is suitably used as a transistor included in the pixel circuit 51. For example, an OS transistor is suitably used as the transistor included in the pixel circuit 51. An OS transistor has an extremely low off-state current and thus can achieve long-term retention of image data supplied to the pixel circuit 51.

In some cases, an image whose brightness, contrast, color tone, or the like is greatly different from that of the previous image is displayed as in the case where a video scene displayed on the display portion 13 is changed, for example. Such a case causes a mismatch of the timing at which an image is changed between the first section 29A and a section whose driving frequency is lower than that of the first section 29A. This might cause a great difference in the brightness, contrast, color tone, or the like between the sections, leading to the loss of the practical display quality. In such a case where a video scene is changed, image rewriting can be temporarily performed in the section other than the first section 29A at a driving frequency which is the same as that of the first section 29A, and then the driving frequency of the section other than the first section 29A can be decreased.

Furthermore, in the case where the fluctuation amount of the gaze point G is judged to be exceeding a certain value, image rewriting may be performed in the section other than the first section 29A at a driving frequency which is the same as that of the first section 29A, and the driving frequency of the section other than the first section 29A may be decreased when the fluctuation amount is judged to be within the certain value. In the case where the fluctuation amount of the gaze point G is judged to be small, the driving frequency of the section other than the first section 29A may be further decreased.

In the case where the display apparatus 10B does not include a frame memory, which is a memory device for temporarily retaining image data, or includes one frame memory for the entire display portion 13, each of the second driving frequency and the third driving frequency needs to be an integral submultiple of the first driving frequency.

When the plurality of sub-display portions 19 are provided with respective frame memories, each of the second driving frequency and the third driving frequency can be set to a given value without limitation to an integral submultiple of the first driving frequency. When the second driving frequency and the third driving frequency are set to given values, the degree of freedom in setting the driving frequencies can be increased. As a result, a reduction in the practical display quality can be small.

Figure 13:
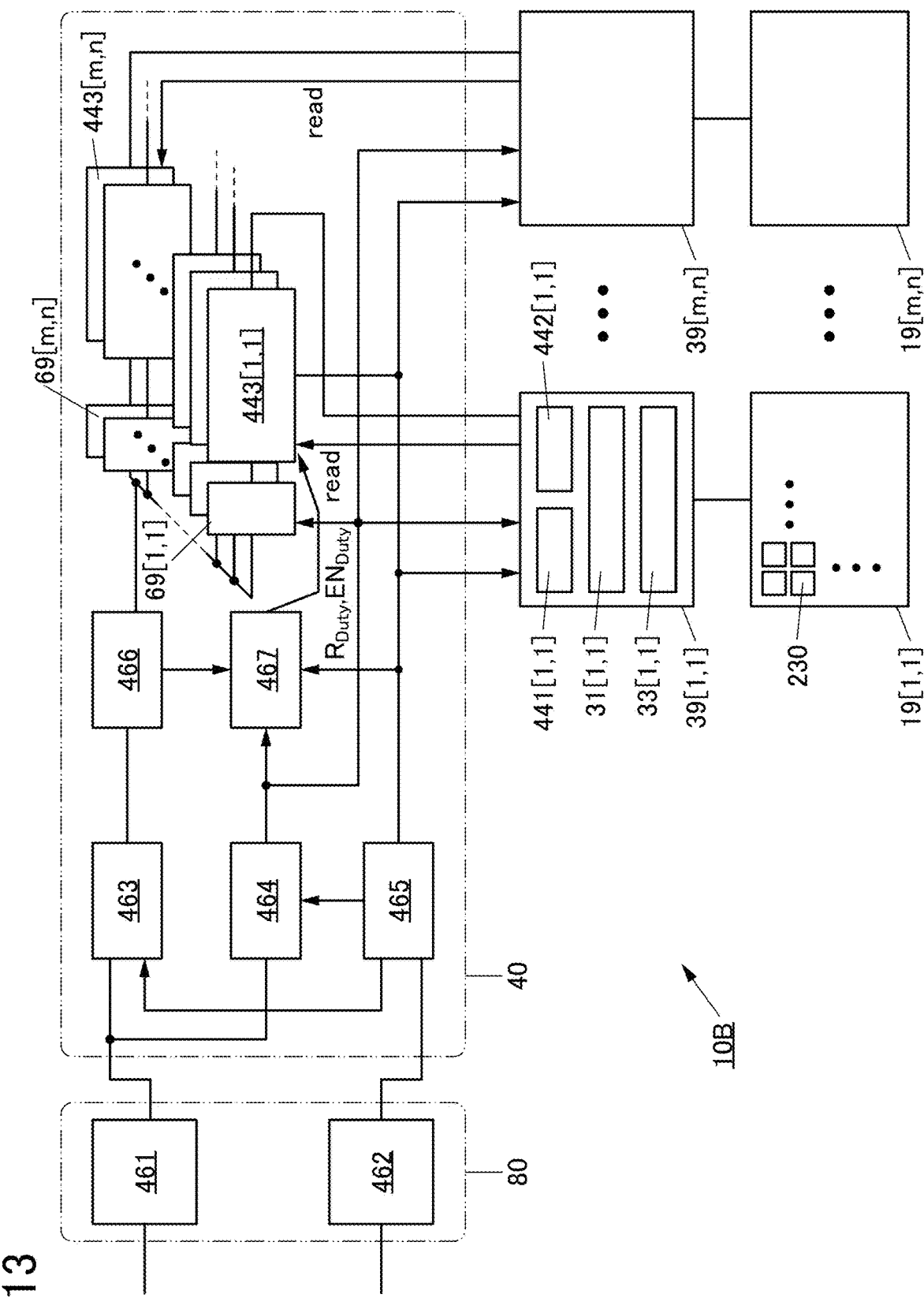
FIG. 13 is a diagram illustrating a structure example of a display apparatus.

FIG. 13 is a block diagram illustrating a structure example of the display apparatus 10B including the luminance conversion circuit 69 and a frame memory 443 for each of the sub-display portions 19. In FIG. 13, the input/output circuit 80 includes an image information input portion 461 and a clock signal input portion 462. The functional circuit 40 includes an image data temporary retention portion 463, an operation parameter setting portion 464, an internal clock signal generating portion 465, an image processing portion 466, a memory controller 467, a plurality of luminance conversion circuits 69, and a plurality of frame memories 443.

One of the luminance conversion circuits 69 has a function of converting image data displayed on one of the plurality of sub-display portions 19 into image data that performs display with low luminance in accordance with the driving frequency and the duty cycle of the sub-display portions 19. For example, the luminance conversion circuit 69[1, 1] has a function of converting image data in accordance with the driving frequency and the duty cycle of the sub-display portion 19[1,1]. Similarly, the luminance conversion circuit 69[m,n] has a function of converting image data in accordance with the driving frequency and the duty cycle of the sub-display portion 19[m,n]. By the luminance conversion circuit 69 corresponding to the sub-display portion 19 that performs display with a high driving frequency, the input image data is directly output to the frame memory. By the luminance conversion circuit 69 corresponding to the sub-display portion 19 that performs display with a low driving frequency, input image data is converted in accordance with the duty cycle in the sub-display portion 19 that performs display with a high driving frequency.

Each of the plurality of frame memories 443 has a function of retaining image data to be displayed on one of the plurality of sub-display portions 19 which is output from one of the plurality of luminance conversion circuits 69. For example, the frame memory 443[1,1] has a function of retaining image data to be displayed on the sub-display portion 19[1,1]. Similarly, the frame memory 443[m,n] has a function of retaining image data to be displayed on the sub-display portion 19[m,n].

Each of the plurality of sub-display portions 19 is electrically connected to one of the plurality of sections 39. In FIG. 13, each of the plurality of sections 39 includes the source driver circuit 31, the gate driver circuit 33, the timing controller 441, and the input/output circuit 442. The input/output circuit 442 is an interface circuit such as I2C.

Image data to be displayed on the display portion 13 and operation parameters of the display apparatus 10B are supplied to the image information input portion 461 from the outside. A clock signal is supplied to the clock signal input portion 462 from the outside. The clock signal is supplied to the internal clock signal generating portion 465 via the clock signal input portion 462.

The internal clock signal generating portion 465 has a function of generating a clock signal used in the display apparatus 10B (also referred to as "internal clock signal") with the use of the clock signal supplied from the outside. The internal clock signal is supplied to the image data temporary retention portion 463, the operation parameter setting portion 464, the memory controller 467, the section 39, and the like and used for matching operation timing between the circuits included in the display apparatus 10B, for example.

The image data input via the image information input portion 461 is supplied to the image data temporary retention portion 463. The operation parameters input via the image information input portion 461 are supplied to the operation parameter setting portion 464.

The image data temporary retention portion 463 retains the supplied image data, and supplies the image data to the image processing portion 466 in synchronization with the internal clock signal. Providing the image data temporary retention portion 463 can eliminate a mismatch between the timing at which image data is supplied from the outside and the timing at which the image data is processed in the display apparatus 10B.

The operation parameter setting portion 464 has a function of retaining the supplied operation parameters. The operation parameters include information for determining the driving frequency, the duty cycle ($R_{duty}$), a setting signal of a driving where a black image is inserted between images ($EN_{Duty}$), scan direction, definition, or the like for each of the plurality of sub-display portions 19.

The image processing portion 466 has a function of performing arithmetic processing of the image data retained in the image data temporary retention portion 463. For example, the image processing portion 466 has a function of performing contrast adjustment, brightness adjustment, and gamma correction of the image data. Furthermore, the image processing portion 466 has a function of dividing the image data retained in the image data temporary retention portion 463 for the sub-display portions 19.

The memory controller 467 has a function of controlling the operations of the plurality of frame memories 443. For the image data divided by the image processing portion 466 for each of the sub-display portions 19, whether the image data is converted or not is determined in accordance with settings of a driving where a black image is inserted between images by the luminance conversion circuit 69. That is, in the case where the driving where a black image is inserted between images is performed, the image data is not converted, and in the case where the driving where a black image is inserted between images is not performed, image data is converted. The conversion of image data is performed in accordance with the duty cycle. The image data and the converted image data are stored in the plurality of frame memories 443. Each of the plurality of frame memories 443 has a function of supplying image data to the corresponding section 39 in response to a read request signal (read) from the section 39.

Figure 14:
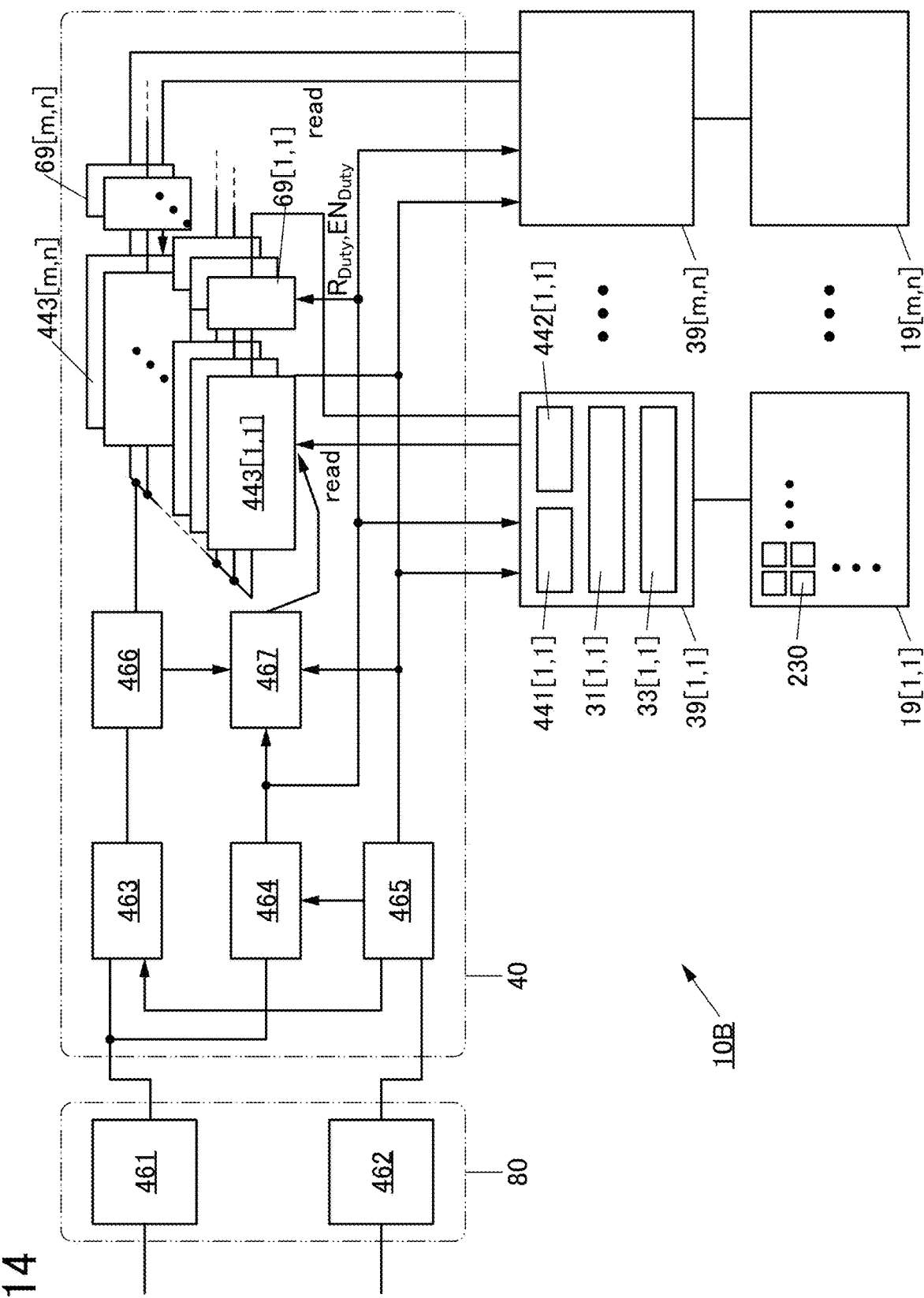
FIG. 14 is a diagram illustrating a structure example of a display apparatus.

As illustrated in FIG. 14, the image data may be stored in the plurality of frame memories 443 after being divided by the image processing portion 466 for the sub-display portions 19. The image data stored in the plurality of frame memories 443 is supplied to the corresponding section 39 in response to the read request signal (read) from the section 39. For the image data supplied to the section 39, whether the image data is converted or not is determined in accordance with the settings of a driving where a black image is inserted between images by the luminance conversion circuit 69, and the image data corresponding to the duty cycle is supplied to the section 39. With such a structure, the image data before conversion by the luminance conversion circuit 69 can be stored in the plurality of frame memories 443; thus, in the case where the settings for the sub-display portions 19 are switched, the conversion of the image data can be switched instantly and the image data can be supplied to the driver circuit of the sub-display portion 19.

The frame memories 443 may be provided in a component other than the functional circuit 40. Alternatively, the frame memory 443 may be provided in a semiconductor device other than a display portion 10B.

Figure 15:
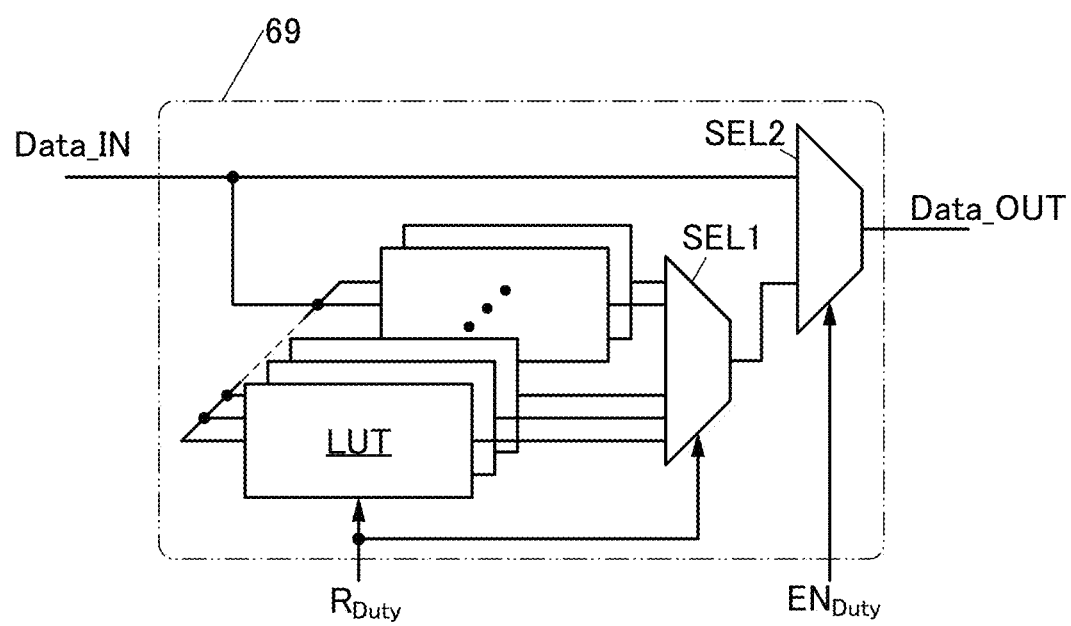
FIG. 15 is a diagram illustrating a structure example of a display apparatus.

FIG. 15 is a block diagram illustrating an example of the luminance conversion circuit 69. The luminance conversion circuit 69 includes a lookup table LUT, a switching circuit SEL1, and a switching circuit SEL2. The luminance conversion circuit 69 outputs the input image data Data_IN as image data Data_OUT in accordance with a duty cycle ($R_{duty}$) and a setting signal of a driving where a black image is inserted between images ($EN_{Duty}$).

The luminance conversion circuit 69 illustrated in FIG. 15 selects the lookup table LUT so as to reduce luminance of the image data Data_IN, at the time of display, supplied to the section where a driving of inserting a black image between images is not performed, in accordance with the duty cycle ($R_{duty}$) corresponding to the proportion of a period where a black image is inserted in one frame. In the lookup table LUT, a table for converting input image data to the image data in accordance with the duty cycle ($R_{duty}$) is stored. In the section where a driving of inserting a black image between images is performed, in the case where the duty cycle $R_{duty}$ is 50%, as for image data supplied to the section where a driving of inserting a black image between images is not performed selects the lookup table LUT in which image data where the luminance of image data Data_OUT at the time of display is 50% of the luminance of image data Data_IN at the time of display is stored by the switching circuit SEL1. The image data stored in the selected lookup table LUT is output as image data Data_OUT in accordance with a setting signal $EN_{Duty}$ corresponding to the settings of a driving where a black image is inserted between images by the switching circuit SEL2. As for the image data of a section where a driving of inserting a black image between images is performed, the image data Data_IN is output as the image data Data_OUT in accordance with the setting signal $EN_{Duty}$.

In the case where the gamma characteristic of the display apparatus is represented by a gamma curve of 2.2, for example, the image data Data_IN and the image data Data_OUT ($D_{OUT}$) that are of the image data converted in accordance with the duty cycle ($R_{duty}$) can be represented by Formula (1) and Formula (2), respectively when the luminance of the image data Data_IN ($D_{IN}$) is L. In each of Formula (1) and Formula (2), "a" is a given coefficient.

$$L = a \times D_{IN}^{2.2} \qquad (1)$$

$$0.5L = a \times D_{OUT}^{2.2} \qquad (2)$$

$D_{IN}$ and $D_{OUT}$ can be represented by Formula (3) and Formula (4) when Formula (1) and Formula (2) are solved.

$$D_{OUT}^{2.2} = 0.5 \times D_{IN}^{2.2} \qquad (3)$$

$$D_{OUT} = (0.5)^{1/2.2} \times D_{IN} \qquad (4)$$

That is, the luminance conversion circuit 69 performs conversion of image data to satisfy Formula (4). In the case of performing conversion of such image data, as described above, conversion using the lookup table LUT or estimation of the value of image data converted using the arithmetic circuit can be performed, for example.

Note that sections set for the display portion 13 are not limited to the three sections of the first section 29A, the second section 29B, and the third section 29C. The display portion 13 may include four or more sections. When a plurality of sections are set for the display portion 13 and the driving frequencies of the sections gradually decreases, a reduction in the practical display quality can be smaller.

The above-described upconversion processing may be performed on an image to be displayed on the first section 29A. When an image obtained by the upconversion processing is displayed on the first section 29A, the display quality can be increased. The above-described upconversion processing may be performed on an image to be displayed on the section other than the first section 29A. When an image obtained by the upconversion processing is displayed on the section other than the first section 29A, a reduction in the practical display quality that occurs in the case where the driving frequency of the section other than the first section 29A is decreased can be smaller.

Note that the upconversion processing of an image to be displayed on the first section 29A may be performed using an algorithm with high accuracy, and the upconversion processing of an image to be displayed on the section other than the first section 29A may be performed using an algorithm with low accuracy. A reduction in the practical display quality that occurs in the case where the driving frequency of the section other than the first section 29A is decreased can be smaller also in such a case.

In the case where the definition of image data is desired to be higher than the definition of the display portion 13, or in the case where high-speed rewriting and low power consumption have a priority, for example, downconversion processing may be performed on an image displayed on the sections other than the first section 29A in accordance with the purpose or the like. For example, high-speed rewriting and low power consumption can be achieved by rewriting an image displayed on the sections other than the first section 29A every several rows, every several columns, or every several pixels.

When image data rewriting performed in each of the sub-display portions 19 is performed concurrently in all of the sub-display portions 19, high-speed rewriting can be achieved. In other words, when image data rewriting performed in each of the sections 39 is performed concurrently in all of the sections 39, high-speed rewriting can be achieved.

In general, while pixels in one row are selected by a gate driver circuit, a source driver circuit writes image data to all of the pixels in one row concurrently in the case of a line sequential driving. In the case where the display portion 13 is not divided into the sub-display portions 19 and the definition is 4000×2000 pixels, for example, image data needs to be written to 4000 pixels by the source driver circuit while the pixels in one row are selected by the gate driver circuit. In the case where the frame frequency is 120 Hz, one frame period is approximately 8.3 msec. Accordingly, the gate driver needs to select 2000 rows in approximately 8.3 msec, and the time for selecting one gate line in one row, that is, the time for writing image data to each pixel is approximately 4.17 usec. In other words, it becomes more difficult to ensure sufficient time for rewriting image data as the definition of the display portion increases or as the frame frequency increases.

The display portion 13 of the display apparatus 10B described as an example in this embodiment is divided into four parts in the row direction. Thus, the time for writing image data to each pixel in one sub-display portion 19 can be four times as long as that of the case where the display portion 13 is not divided. According to one embodiment of the present invention, the time for rewriting image data can be easily ensured even in the case where frame frequency is 240 Hz or 360 Hz; thus, a display apparatus with high display quality can be achieved.

Since the display portion 13 of the display apparatus 10B described as an example in this embodiment is divided into four parts in the row direction, the length of the wiring SL electrically connecting the source driver circuit and the pixel circuit becomes one fourth. Accordingly, each of the resistance value and parasitic capacitance of the wiring SL becomes one fourth, whereby the time required for writing (rewriting) image data can be shortened.

In addition, the display portion 13 of the display apparatus 10B described as an example in this embodiment is divided into eight parts in the column direction; thus, the length of the wiring GL electrically connecting the gate driver circuit and the pixel circuit becomes one eighth. Accordingly, each of the resistance value and parasitic capacitance of the wiring GL becomes one eighth, whereby degradation and delay of a signal can be inhibited and the time for rewriting image data can be easily ensured.

According to the display apparatus 10B of one embodiment of the present invention, sufficient time for writing image data can be easily ensured, and thus high-speed rewriting of a display image can be achieved. Thus, a display apparatus with high display quality can be achieved. In particular, a display apparatus that excels in displaying a moving image can be achieved.

In one embodiment of the present invention, in the plurality of sub-display portions which are driven with different driving frequencies, a driving where a black image is inserted between images is performed in the sub-display portion which are driven with a high driving frequency while the driving where a black image is inserted between images is not performed but display based on image data with reduced luminance in accordance with a period of performing black display by the driving where a black image is inserted between images is performed in the sub-display portion which are driven with a low driving frequency. With this structure, a difference in luminance in the whole display portion where the plurality of sub-display portions are combined in accordance with the presence or absence of the duty driving can be reduced, display quality in a section around the gaze point can be improved, and low power consumption of display in a section distant from the gaze point can be achieved.

<Specific Example of Method for Driving Display Apparatus>

In the display apparatus 10B, a specific example of a driving where image data conversion is performed in accordance with presence or absence of a driving where a black image is inserted between images when image data is updated with a different driving frequency for each of the sub-display portions is described.

Figure 12B:
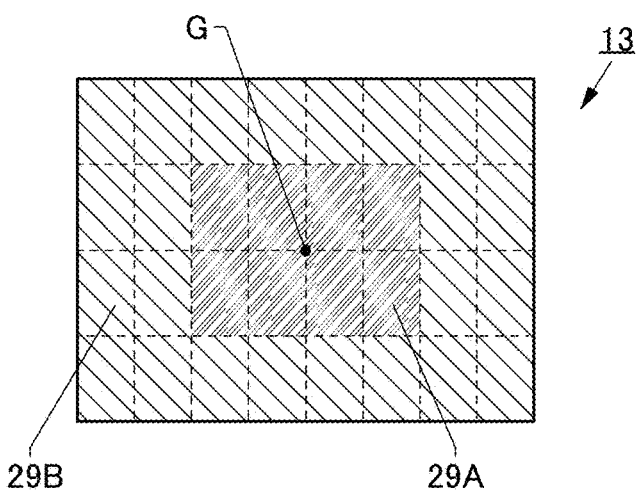
Figure 12C:
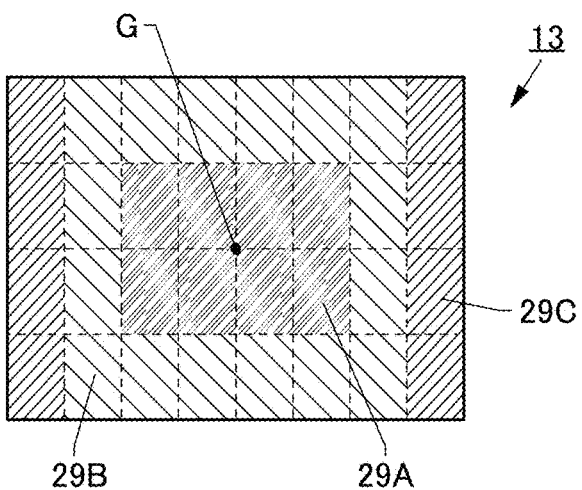
Figure 16:
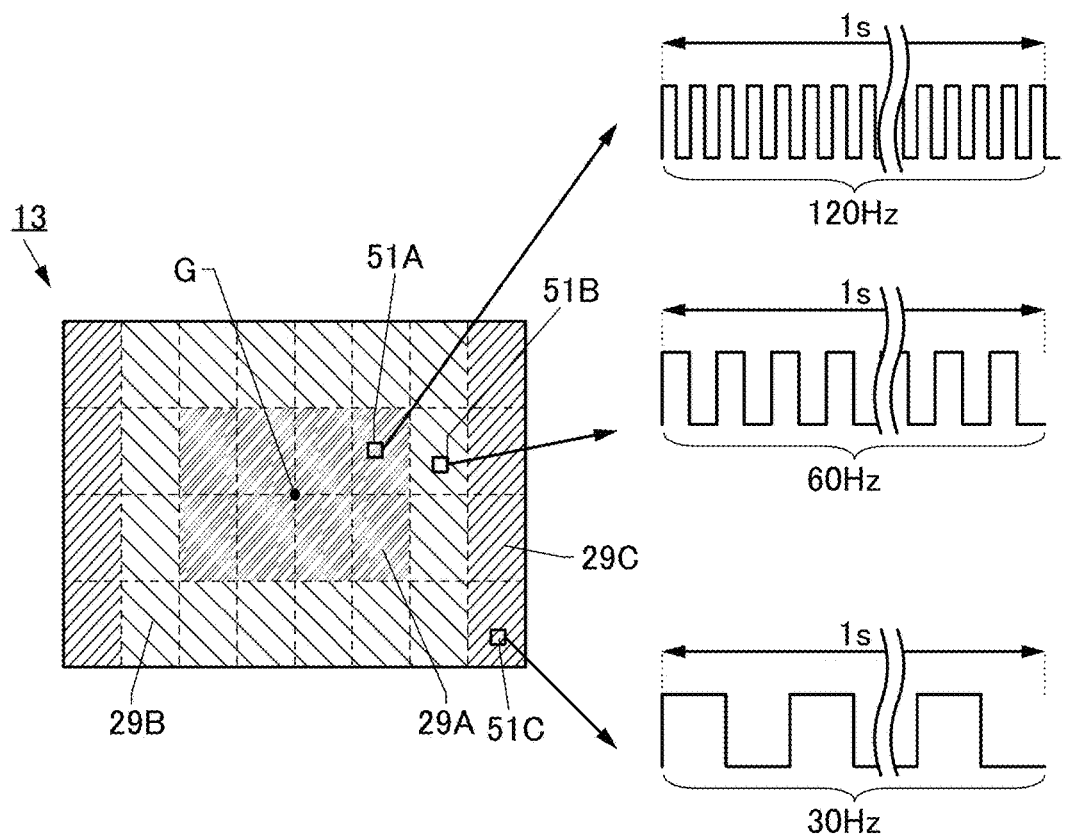
FIG. 16 is a diagram illustrating a structure example of a display apparatus.

FIG. 16 illustrates the display portion 13 including a sub-display portion 13A of four rows and eight columns illustrated in FIG. 12A to FIG. 12C. FIG. 16 illustrates a pixel circuit 51A provided in a sub-display portion allocated to the first section 29A, a pixel circuit 51B provided in a sub-display portion allocated to the second section 29B, and a pixel circuit 51C provided in a sub-display portion allocated to the third section 29C.

In the pixel circuit 51A of the first section 29A provided in the first region S1 overlapping with the gaze point G, the driving frequency in 1 second (1 s) is shown as 120 Hz (Hz is represented as fps in some cases). In the pixel circuit 51B of the second section 29B on the outer side of the first section 29A, the driving frequency in 1 second (1 s) is shown as 60 Hz. In the pixel circuit 51C of the third section 29C on the outer side of the second section 29B, the driving frequency in 1 second (1 s) is shown as 30 Hz. That is, a section of a region overlapping with the gaze point of the display portion 13 is shown as a high driving frequency, and a section of a region distant from the gaze point of the display portion 13 is shown as a low driving frequency.

Note that the pixel circuits 51A, 51B, and 51C provided in the first section 29A, the second section 29B, and the third section 29C have the same circuit structure. The pixel circuits 51A, 51B, and 51C each have a circuit structure including a driving transistor that controls a current flowing through the light-emitting element between wirings for supplying current, and a light-emitting control transistor that controls a lighting period of the light-emitting element.

In the structure of FIG. 16, display with a high driving frequency, 120 Hz, is performed in the first section 29A which is close to the gaze point, and a driving where a black image based on black image data is inserted between image displays based on image data in one frame period is performed. In the first section 29A close to the gaze point, an image blur or an afterimage can be inhibited by a motion blur reduction driving.

In the structure of FIG. 16, in the second section 29B and the third section 29C which are distant from the gaze point, display with a low driving frequency, 60 Hz or 30 Hz, is performed, and a driving with image display based on image data where a black image is not inserted in one frame period is performed. The display in the second section 29B and the third section 29C which are distant from the gaze point is performed by converting image data supplied to the section to the image data with reduced luminance by the luminance conversion circuit and supplying the image data to a section distant from the gaze point.

Figure 17A:
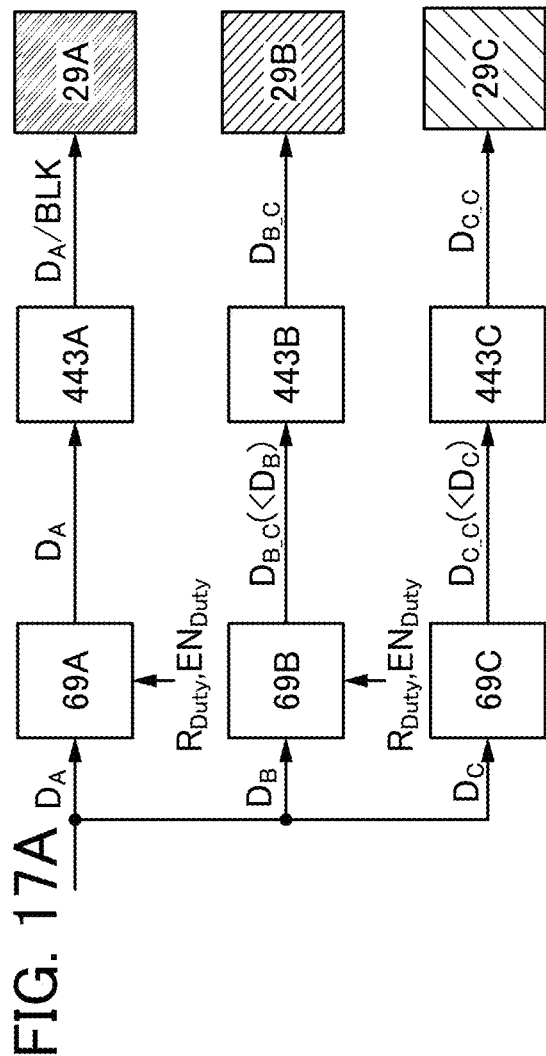
FIG. 17A and FIG. 17B are diagrams illustrating a structure example of a display apparatus.

FIG. 17A illustrates a block diagram for describing image data supplied to the first section 29A, the second section 29B, and the third section 29C which are illustrated in FIG. 16 through the luminance conversion circuit and the frame memory. In FIG. 17A, original image data supplied to the first section 29A, the second section 29B, and the third section 29C are image data $D_A$, $D_B$, and $D_C$, respectively. Luminance conversion circuits 69A, 69B, and 69C are illustrated as the luminance conversion circuits for the first section 29A, the second section 29B, and the third section 29C illustrated in FIG. 16. The luminance conversion circuits 69A, 69B, and 69C determine presence or absence of conversion of image data or image data conversion in accordance with the duty cycle $R_{duty}$ and the setting signal $EN_{Duty}$ of a driving where a black image is inserted between images. Frame memories 443A, 443B, and 443C are illustrated as the frame memories for the first section 29A, the second section 29B, and the third section 29C illustrated in FIG. 16. Image data converted by the luminance conversion circuits 69B and 69C supplied to the sections 29B and 29C are denoted by $D_{B\_C}$ and $D_{C\_C}$, respectively. The luminance of display based on the image data $D_{B\_C}$ and $D_{C\_C}$ is smaller than the luminance of display based on the image data $D_B$ and $D_C$ ($D_{B\_C}$ (<$D_B$) and $D_{C\_C}$ (<$D_C$)).

As illustrated in FIG. 17A, the image data $D_A$ supplied to the first section 29A illustrated in FIG. 16 is driven at a high driving frequency of 120 Hz; thus, the image data $D_A$ is not converted by the luminance conversion circuit 69A and stored in the frame memory 443A. The stored image data $D_A$ is displayed in the first section 29A alternately with the data BLK for displaying a black image in one frame period (1F), so that a motion blur reduction driving in the first section 29A can be performed.

As illustrated in FIG. 17A, the image data $D_B$ supplied to the second section 29B illustrated in FIG. 16 is driven at a driving frequency of 60 Hz lower than the driving frequency of 120 Hz; thus, the image data $D_B$ is converted to the image data $D_{B\_C}$ in the luminance conversion circuit 69B and stored in the frame memory 443B. The stored image data $D_{B\_C}$ is displayed in the second section 29B based on image data with reduced luminance without insertion of a black image; thus, display can be performed with a reduced difference between the luminance of the second section 29B and the luminance of the first section 29A where black insertion is performed. Similarly, as illustrated in FIG. 17A, the image data $D_C$ supplied to the third section 29C illustrated in FIG. 16 is driven at a driving frequency of 30 Hz lower than the driving frequency of 120 Hz; thus, the image data $D_C$ is converted to the image data $D_{C\_C}$ in the luminance conversion circuit 69C and stored in the frame memory 443C. The stored image data $D_{C\_C}$ performs display in the third section 29C without insertion of a black image based on image data with reduced luminance; thus, display can be performed with a reduced difference between the luminance of the third section 29C and the luminance of the first section 29A where black insertion is performed.

Figure 17B:
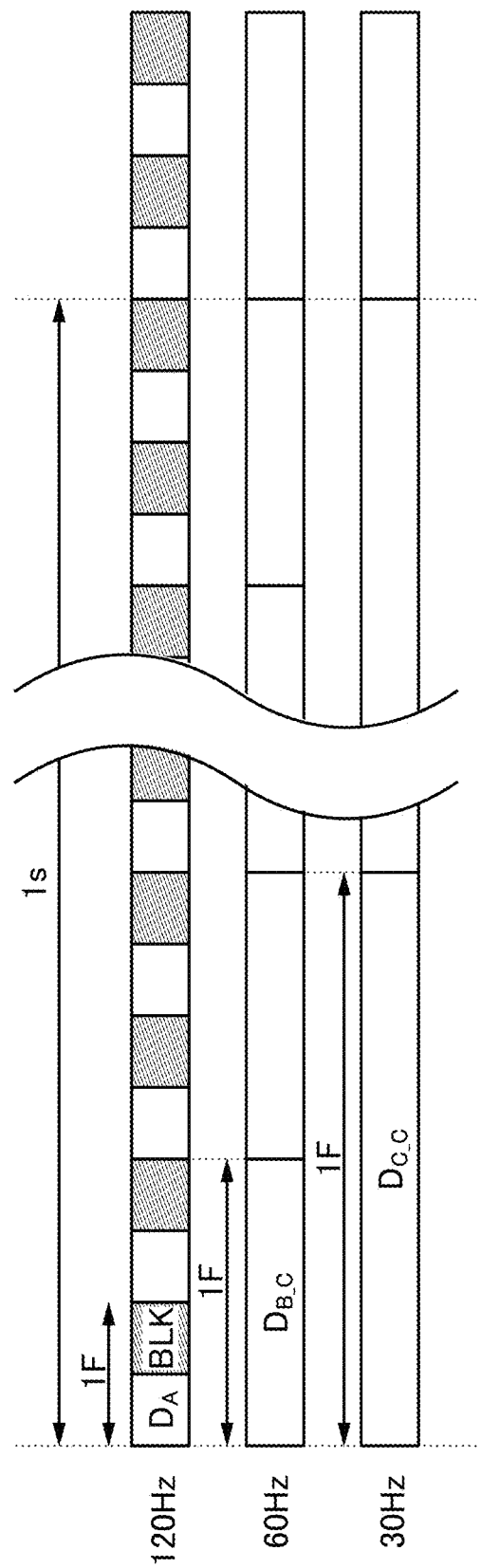

FIG. 17B illustrates a state where image data $D_A$ and data BLK are alternately performed in one frame period (1F) when display is performed at a driving frequency of 120 Hz in a period of one second (1 s). FIG. 17B also illustrates states where display based on the image data $D_{B\_C}$ and $D_{C\_C}$ is performed in one frame period (1F) when display is performed at driving frequencies of 60 Hz and 30 Hz in a period of one second (1 s). As illustrated in FIG. 17B, in the structure of one embodiment of the present invention, a difference in luminance corresponding to a difference of a cumulative lighting period between display where a black image is inserted with a high driving frequency and display where a black image is not inserted with a low driving frequency can be reduced. Thus, display with a high driving frequency in a section close to the gaze point and with an excellent display quality by a motion blur reduction can be performed, and display where a difference in luminance is not easily recognized can be performed even when the driving frequency in a section distant from the gaze point is reduced and a black image is not inserted between images for the display.

<Structure Example of Pixel Circuit>

FIG. 18A to FIG. 18F illustrate a structure example of a pixel circuit that can be used as the pixel circuit 51 and the light-emitting element 61 connected to the pixel circuit 51. Note that in the following description, the light-emitting element 61 is described as a light-emitting device such as an organic EL element (OLED: Organic Light Emitting Diode).

The light-emitting device described in one embodiment of the present invention is not limited to an organic EL element and can be a self-luminous light-emitting device such as an LED (Light Emitting Diode), a QLED (Quantum-dot Light Emitting Diode), or a semiconductor laser. As the LED, a micro LED whose diameter or one side is formed to be less than or equal to 50 μm or a mini LED whose diameter or one side is formed to be greater than 50 μm and less than or equal to 200 μm can be used, for example.

Figure 18A:
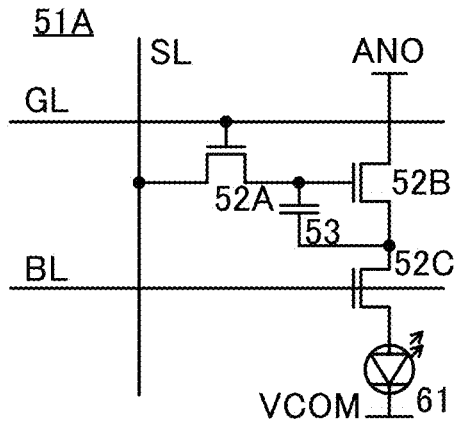
FIG. 18A to FIG. 18F are diagrams illustrating structure examples of a display apparatus.

The pixel circuit 51A illustrated in FIG. 18A includes a transistor 52A, a transistor 52B, a transistor 52C, and a capacitor 53. FIG. 18A illustrates the light-emitting element 61 connected to the pixel circuit 51A. FIG. 18A also illustrates the wiring SL, the wiring GL, the wiring BL, a wiring ANO, and a wiring VCOM.

A gate of the transistor 52A is electrically connected to the wiring GL, one of a source and a drain of the transistor 52A is electrically connected to the wiring SL, and the other of the source and the drain of the transistor 52A is electrically connected to a gate of the transistor 52B and one electrode of the capacitor 53. One of a source and a drain of the transistor 52B is electrically connected to the wiring ANO, and the other of the source and the drain of the transistor 52B is electrically connected to one of a source and a drain of the transistor 52C. A gate of the transistor 52C is electrically connected to the wiring BL and the other of the source and the drain of the transistor 52C is electrically connected to an anode of the light-emitting element 61. The other electrode of the capacitor 53 is electrically connected to the one of the source and the drain of the transistor 52C. A cathode of the light-emitting element 61 is electrically connected to the wiring VCOM. Note that the anode and the cathode of the light-emitting element 61 can be interchanged with each other as appropriate by changing the magnitude of the supplied potential.

Figure 18B:
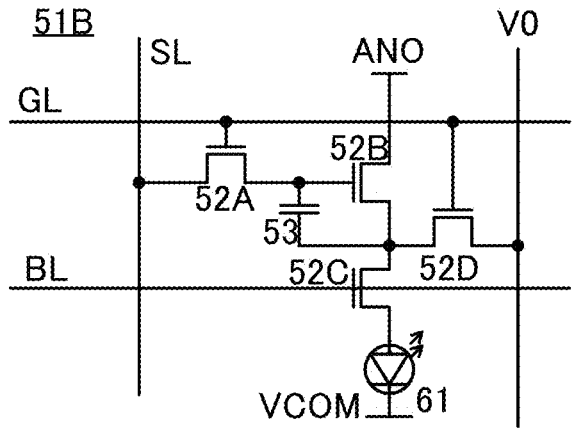

The pixel circuit 51B illustrated in FIG. 18B has a structure in which a transistor 52D is added to the pixel circuit 51A. A gate of the transistor 52D is electrically connected to the wiring GL, one of a source and a drain of the transistor 52D is electrically connected to the anode of the light-emitting element 61 through the transistor 52C, and the other of the source and the drain of the transistor 52D is electrically connected to a wiring V0. When the transistor 52A and the transistor 52D are turned on at the same time, the source and the gate of the transistor 52B have the same potential, and the case where the threshold voltage of the transistor 52B is larger than 0V, the transistor 52B can be turned off. Thus, a current flowing to the light-emitting element 61 can be blocked forcibly. Such a pixel circuit is suitable for the case of using a display method in which a display period and a non-lighting period are alternately provided.

Figure 18C:
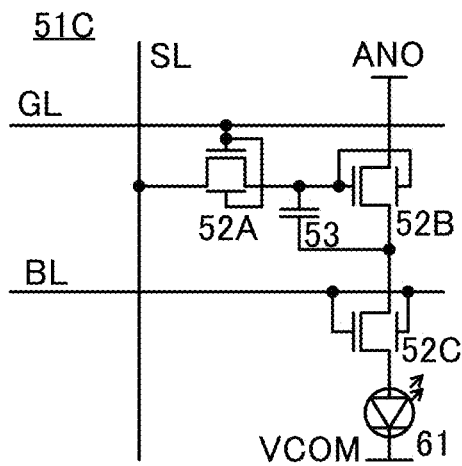

The pixel circuit 51C illustrated in FIG. 18C is an example of a case where transistors each including a pair of gates are used as each of the transistor 52A to the transistor 52C in the pixel circuit 51A. Thus, the current that can flow through the transistor can be increased. Note that although a transistor including a pair of gates is used for each of the transistors here, one embodiment of the present invention is not limited thereto. A transistor that includes a pair of gates electrically connected to different wirings may be used. When, for example, a transistor in which one of the gates is electrically connected to the source is used, the reliability can be increased.

Figure 18D:
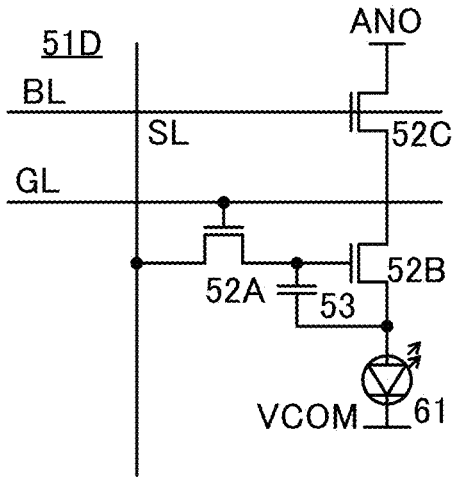

A pixel circuit 51D illustrated in FIG. 18D is an example of a case where the position of the transistor 52C in the pixel circuit 51A is changed to a position between the transistor 52B and the wiring ANO. Even with this structure, current flowing between the wiring ANO and the wiring VCOM can be controlled by the transistor 52C.

Figure 18E:
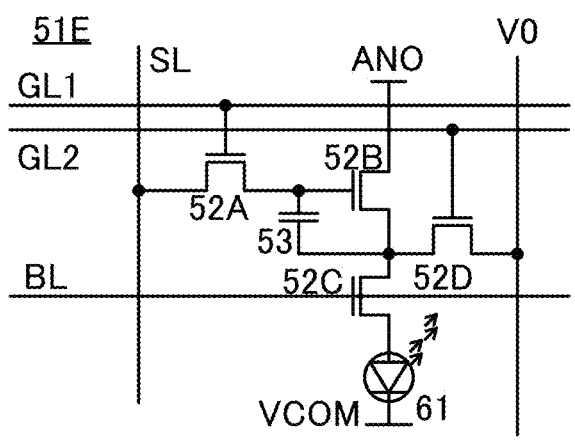

A pixel circuit 51E illustrated in FIG. 18E is an example of a case where the wiring GL in the pixel circuit 51B is a plurality of gate lines (a wiring GL1 and a wiring GL2) and the transistor 52A and the transistor 52D are separately controlled. Since current flowing through the light-emitting element 61 can be supplied to the wiring V0 through the transistor 52D, image data can be corrected on the basis of the value of the current.

Although FIG. 18A to FIG. 18E each illustrate a circuit structure example which can be constituted with only n-channel OS transistors, one embodiment of the present invention is not limited thereto. For example, as illustrated in FIG. 18F, a pixel circuit including an OS transistor and a Si transistor may be employed.

Figure 18F:
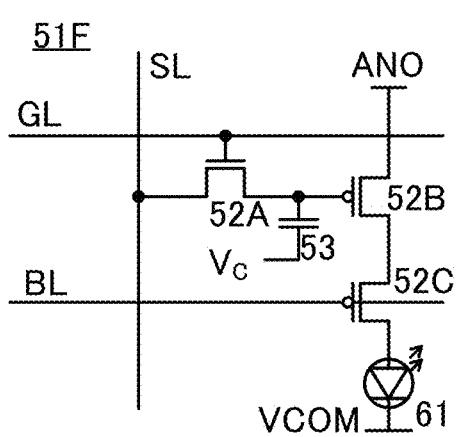

A pixel circuit 51F illustrated in FIG. 18F includes the transistor 52A, the transistor 52B, the transistor 52C, and the capacitor 53. The pixel circuit 51F illustrated in FIG. 18F is an example of a case where the transistors 52B and 52C in the pixel circuit 51A are replaced with p-channel Si transistors. The pixel circuit 51F illustrated in FIG. 18F can retain an analog potential corresponding to image data when the transistor 52A which is an OS transistor is brought into a non-conduction state. When the transistors 52B and 52C are Si transistors in the pixel circuit 51F, the amount of current flowing through the light-emitting element 61 can be increased.

In one embodiment of the present invention, in the plurality of sub-display portions where drivings with different driving frequencies are performed, a driving where a black image is inserted between images is performed in a sub-display portion where a driving is performed with a high driving frequency, and display based on image data with reduced luminance in accordance with a period where black display is performed by a driving where a black image is inserted between images not by performing a driving where a black image is inserted between images in a sub-display portion where a driving is performed with a low driving frequency. Thus, a luminance difference between luminance based on image data of a section where a black image is not inserted between images and luminance based on image data of a section where a black image is inserted between images, which is also based on a difference of a lighting period, can be small, whereby display where a difference in luminance is not easily recognized can be performed even when display where a black image is not inserted between images is performed with a low driving frequency in a section distant from the gaze point. As a result, an electronic device including a display apparatus achieving low power consumption and capable of performing favorable display difficult to recognize a luminance difference for sections, can be provided.

Embodiment 2

Figure 19A:
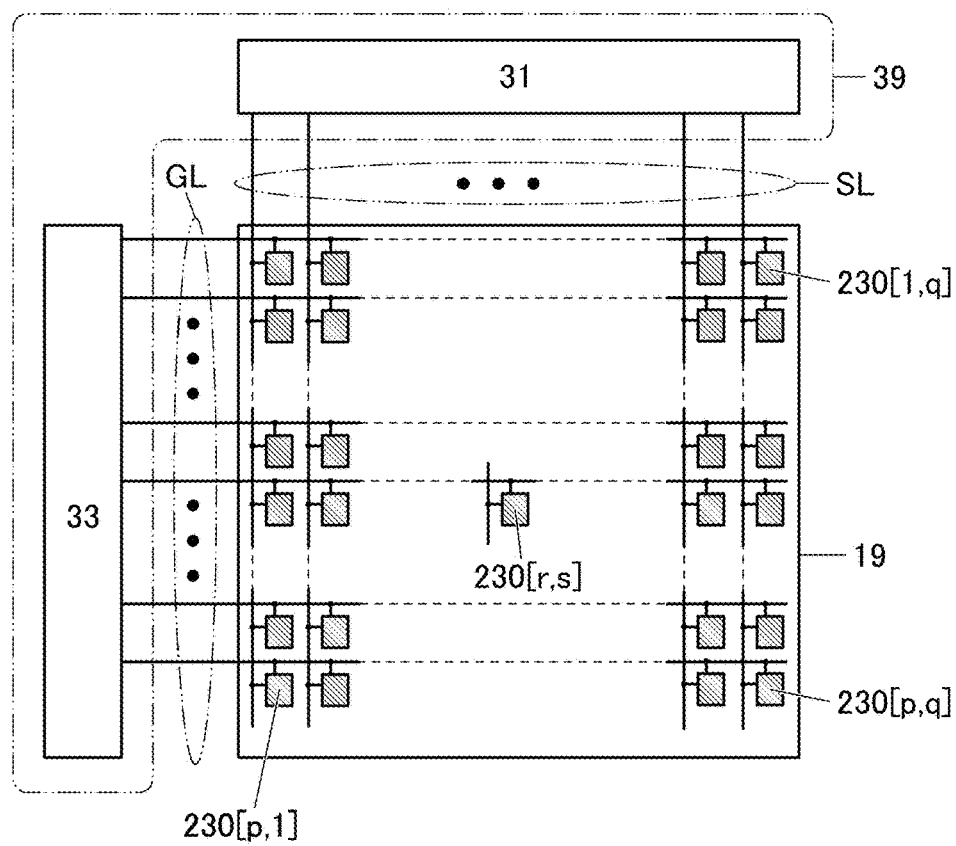
FIG. 19A is a diagram illustrating a sub-display portion.
Figure 19A:
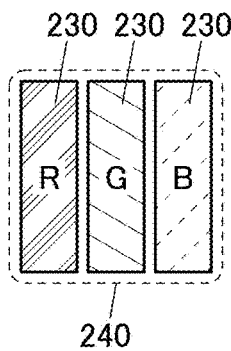
Figure 19A:
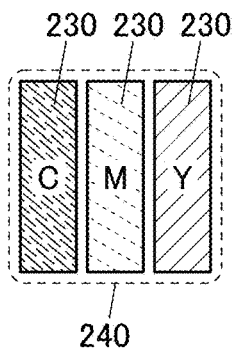
Figure 19A:
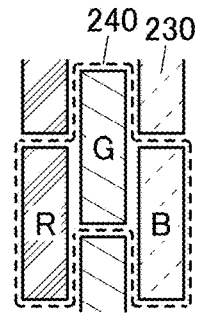
Figure 19A:
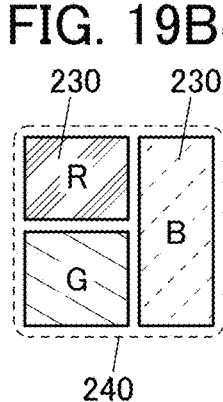
Figure 19A:
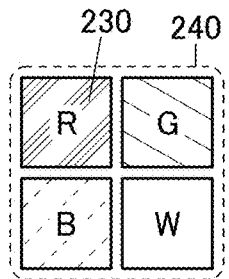
Figure 19A:
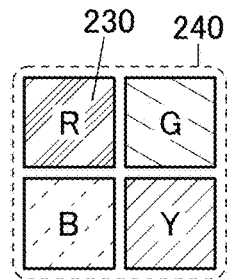
Figure 19A:
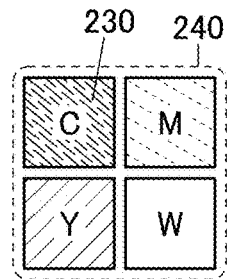

In this embodiment, a structure example of the sub-display portion 19 including the plurality of pixels 230 arranged in a matrix of p rows and q columns (p and q are each an integer greater than or equal to 2) will be described. FIG. 19A is a block diagram illustrating the sub-display portion 19. The sub-display portion 19 is electrically connected to the source driver circuit 31 and the gate driver circuit 33 which are provided in the section 39.

In FIG. 19A, the pixel 230 in the p-th row and the first column is denoted as a pixel 230[p,1], the pixel 230 in the first row and the q-th column is denoted as a pixel 230[1,q], and the pixel 230 in the p-th row and the q-th column is denoted as a pixel 230[p,q].

A circuit included in the gate driver circuit 33 functions as, for example, a scan line driver circuit. A circuit included in the source driver circuit 31 functions as, for example, a signal line driver circuit.

For example, OS transistors may be used as the transistors included in the pixels 230 and Si transistors may be used as the transistors included in a driver circuit. The off-state current of an OS transistor is low, so that power consumption can be reduced. Since a Si transistor has a higher operation speed than an OS transistor, a Si transistor is suitably used in a driver circuit. The display apparatus may include OS transistors as both the transistors included in the pixels 230 and the transistors included in a driver circuit. The display apparatus may include Si transistors as both the transistors included in the pixels 230 and the transistors included in a driver circuit. Alternatively, the display apparatus may include Si transistors as the transistors included in the pixels 230 and OS transistors as the transistors included in a driver circuit.

Both a Si transistor and an OS transistor may be used as the transistors included in the pixels 230. Both a Si transistor and an OS transistor may be used as the transistors included in a driver circuit.

In FIG. 19A, p wirings GL are arranged substantially parallel to each other and the potentials thereof are controlled by the gate driver circuit 33, and q wirings SL are arranged substantially parallel to each other and the potentials thereof are controlled by the source driver circuit 31. For example, the pixels 230 arranged in the r-th row (r represents a given number and is an integer greater than or equal to 1 and less than or equal to p in this embodiment and the like) are electrically connected to the gate driver circuit 33 through the r-th wiring GL. The pixels 230 arranged in the s-th column (s represents a given number and is an integer greater than or equal to 1 and less than or equal to q in this embodiment and the like) are electrically connected to the source driver circuit 31 through the s-th wiring SL.

Note that the number of the wirings GL electrically connected to the pixels 230 included in one row is not limited to one. Furthermore, the number of the wirings SL electrically connected to the pixels 230 included in one column is not limited to one. The wiring GL and the wiring SL are examples, and wirings connected to the pixels 230 are not limited to the wiring GL and the wiring SL.

Full-color display can be achieved by making the pixel 230 that controls red light, the pixel 230 that controls green light, and the pixel 230 that controls blue light, which are arranged in a stripe pattern, collectively function as one pixel 240 and by controlling the amount of light emission (emission luminance) from each of the pixels 230. In other words, each of the three pixels 230 functions as a subpixel. That is, three subpixels control the emission amount or the like of red light, green light, and blue light (see FIG. 19B1). Note that the colors of light controlled by the three subpixels are not limited to a combination of red (R), green (G), and blue (B) and may be cyan (C), magenta (M), and yellow (Y) (see FIG. 19B2).

By using the pixels 240 arranged in a matrix of 1920×1080, the display portion 13 can achieve full-color display with a so-called 2K definition. For example, by using the pixels 240 arranged in a matrix of 3840×2160, the display portion 13 can achieve full-color display with a so-called 4K definition. For example, by using the pixels 240 arranged in a matrix of 7680×4320, the display portion 13 can achieve full-color display with a so-called 8K definition. By increasing the number of pixels 240, the display portion 13 that can perform full-color display with 16K or 32K definition can also be obtained.

Alternatively, three pixels 230 constituting one pixel 240 may be arranged in a delta arrangement (see FIG. 19B3). Specifically, three pixels 230 constituting one pixel 240 may be arranged such that the lines connecting the center points of the three pixels 230 form a triangle. Note that the arrangement of the pixels 230 is not limited to a stripe arrangement or a delta arrangement. The pixels 230 may be arranged in a zigzag arrangement, an S-Stripe RGB arrangement, a Bayer arrangement, or a PenTile arrangement.

The three subpixels (the pixels 230) do not necessarily have the same area. In the case where the emission efficiency, reliability, and the like vary depending on emission colors, the subpixel area may be changed depending on the emission color (see FIG. 19B4). Note that the arrangement of the subpixels illustrated in FIG. 19B4 may be called an "S-Stripe RGB arrangement" or an "S stripe arrangement", for example.

Four subpixels may collectively function as one pixel. For example, a subpixel that controls white light may be added to the three subpixels that control red light, green light, and blue light (see FIG. 19B5). The addition of the subpixel that controls white light can increase the luminance of a display region. Alternatively, a subpixel that controls yellow light may be added to the three subpixels that control red light, green light, and blue light (see FIG. 19B6). Further alternatively, a subpixel that controls white light may be added to the three subpixels that control cyan light, magenta light, and yellow light (see FIG. 19B7).

When the number of subpixels functioning as one pixel is increased and subpixels that control light of red, green, blue, cyan, magenta, yellow, and the like are used in an appropriate combination, the reproducibility of halftones can be increased. Thus, display quality can be improved.

The display apparatus of one embodiment of the present invention can reproduce the color gamut of various standards. For example, the display apparatus of one embodiment of the present invention can reproduce the color gamut of the PAL (Phase Alternating Line) standard and the NTSC (National Television System Committee) standard used for TV broadcasting; the sRGB (standard RGB) standard and the Adobe RGB standard widely used for display apparatuses used in electronic devices such as personal computers, digital cameras, and printers; the ITU-R BT.709 (International Telecommunication Union Radiocommunication Sector Broadcasting Service (Television) 709) standard used for HDTV (High Definition Television, also referred to as Hi-Vision); the DCI-P3 (Digital Cinema Initiatives P3) standard used for digital cinema projection; the ITU-R BT.2020 (REC.2020 (Recommendation 2020)) standard used for UHDTV (Ultra High Definition Television, also referred to as Super Hi-Vision); and the like.

A pixel 231 including a light-receiving element in one pixel 240 may be provided. In the pixel 240 illustrated in FIG. 20A, a pixel 230(G) exhibiting green light, a pixel 230(B) exhibiting blue light, a pixel 230(R) exhibiting red light, and a pixel 231(S) including a light-receiving element are arranged in a stripe pattern. Note that in this specification and the like, the pixel 231 is also referred to as an "imaging pixel".

A light-receiving element included in the pixel 231 is preferably an element that detects visible light and is further preferably an element that detects one or more of blue light, violet light, bluish violet light, green light, yellowish green light, yellow light, orange light, red light, and the like. The light-receiving element included in the pixel 231 may be an element that detects infrared light.

Figure 20A:
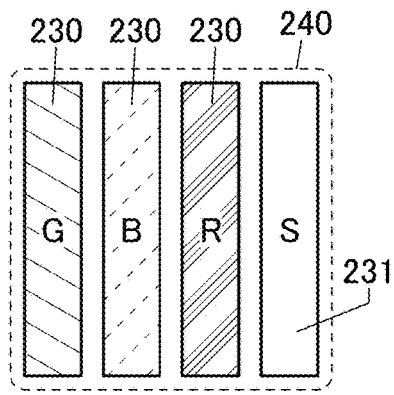
FIG. 20A to FIG. 20G are diagrams illustrating structure examples of pixels.

The pixel 240 illustrated in FIG. 20A employs a stripe arrangement. Note that in the case where the pixel 231 including a light-receiving element detects light of a specific color, the pixel 230 exhibiting light of the color is preferably disposed to be adjacent to the pixel 231, whereby detection accuracy can be increased.

Figure 20B:
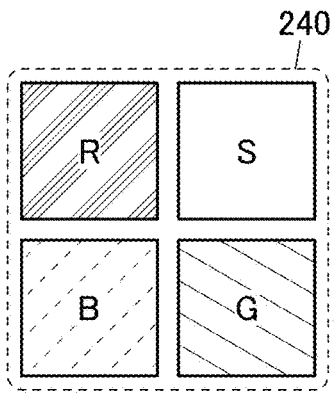

Three pixels 230 and one pixel 231 are arranged in a matrix in the pixel 240 illustrated in FIG. 20B. Although FIG. 20B illustrates an example in which the pixel 230 exhibiting red light is adjacent to the pixel 231 including a light-receiving element in the row direction and the pixel 230 exhibiting blue light is adjacent to the pixel 230 exhibiting green light in the row direction, one embodiment of the present invention is not limited thereto.

Figure 20C:
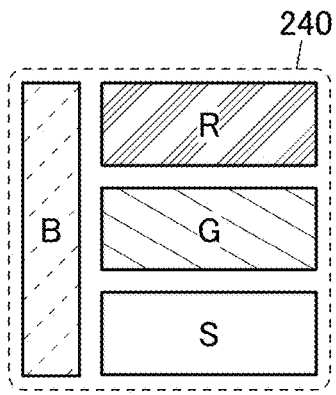

The pixel 240 illustrated in FIG. 20C has a structure in which the pixel 231 is added to an S-stripe arrangement. The pixel 240 in FIG. 20C includes one vertically oriented pixel 230, two horizontally oriented pixels 230, and one horizontally oriented pixel 231. Note that the vertically oriented pixel 230 may be any one of R, G, and S, and there is no particular limitation on the arrangement order of the horizontally oriented subpixels.

Figure 20D:
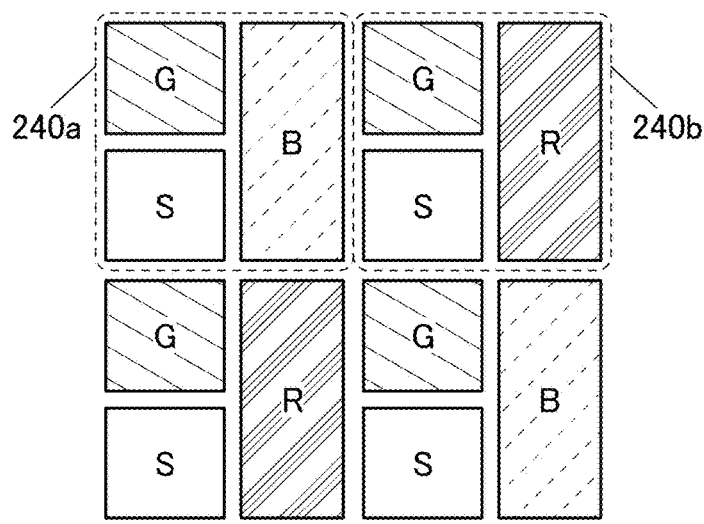

FIG. 20D illustrates an example in which a pixel 240a and a pixel 240b are alternately arranged. The pixel 240a includes the pixel 230 exhibiting blue light, the pixel 230 exhibiting green light, and the pixel 231 including a light-receiving element. The pixel 240b includes the pixel 230 exhibiting red light, the pixel 230 exhibiting green light, and the pixel 231 including a light-receiving element. The pixel 240a and the pixel 240b function as one pixel 240. Although FIG. 20D illustrates the pixel 240a and the pixel 240b each including the pixel 230 exhibiting green light and the pixel 231, one embodiment of the present invention is not limited thereto. When the pixel 240a and the pixel 240b each include the pixel 231, the resolution of an imaging pixel can be increased.

Figure 20E:
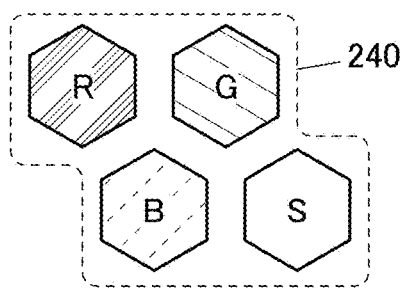
Figure 20F:
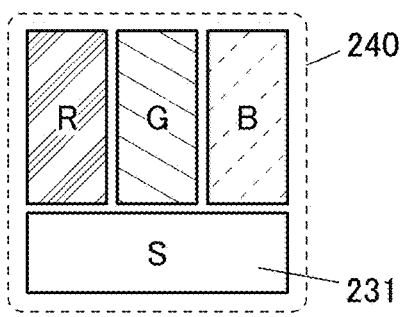

FIG. 20E illustrates an example in which a hexagonal close-packed layout is used for the arrangement of the pixels 230 and the pixel 231. The pixel layout illustrated in FIG. 20E is preferable because the aperture ratio of each subpixel can be increased. In FIG. 20F, an example in which the top surface shapes of the pixels 230 and the pixel 231 are hexagonal is illustrated.

The pixel 240 illustrated in FIG. 20F is an example in which the pixels 230 are arranged horizontally in one line and the pixel 231 is placed beneath the pixels 230.

Figure 20G:
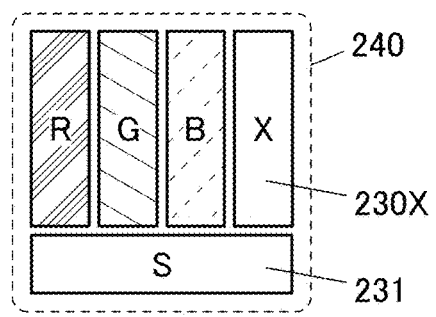

The pixel 240 illustrated in FIG. 20G is an example in which the pixels 230 and a pixel 230X are arranged horizontally in one line and the pixel 231 is placed beneath the pixels 230 and the pixel 230X.

As the pixel 230X, for example, the pixel 230 that exhibits infrared light (IR) can be used. That is, the pixel 230X includes the light-emitting element 61 that emits infrared light (IR). In that case, the pixel 231 preferably includes a light-receiving element that detects infrared light. For example, while an image is displayed by the pixel 230 emitting visible light, the pixel 231 can detect reflected light of infrared light emitted by a subpixel X.

A plurality of pixels 231 may be provided in one pixel 240. In that case, light detected by the plurality of pixels 231 may have the same wavelength range or different wavelength ranges. For example, part of the plurality of pixels 231 may detect visible light and another part may detect infrared light.

The pixel 231 is not necessarily provided in all the pixels 240. The pixel 240 including the pixel 231 may be provided for every certain number of pixels.

By using the pixel 231 or using the pixel 231 and the sensor 125, for example, information for personal authentication using a fingerprint, a palm print, an iris, a retina, a shape of a blood vessel (including the shape of a vein and a shape of an artery), face, or the like can be detected. Furthermore, by using the pixel 231 or using the pixel 231 and the sensor 125, the number of blinks, eyelid behavior, pupil size, body temperature, pulse, oxygen saturation in blood, or the like of the user may be measured, so that the user's fatigue level, health condition, and the like can be detected.

The electronic device can be operated using the motion of gaze, the number of blinks, the rhythm of blinks, and the like of the user. Specifically, by using the pixel 231 or using the pixel 231 and the sensor 125, information on the motion of gaze, the number of blinks, the rhythm of blinks, and the like of the user are detected, and one or more combinations of these information may be used as an operation signal of the electronic device. For example, it is possible to replace a blink with a clicking of a mouse. When the motion of a gaze and a blink are detected, the user can perform an input operation of the electronic device with holding nothing in his/her hand. Thus, the operability of the electronic device can be improved.

When a plurality of imaging pixels (the pixels 231) are provided in the display apparatus 10, the plurality of imaging pixels can be used as the gaze detection portion 102. Thus, the number of components of the electronic device can be reduced. Accordingly, improvement in productivity, reductions in weight and costs, and the like of the electronic device can be achieved.

Figure 21:
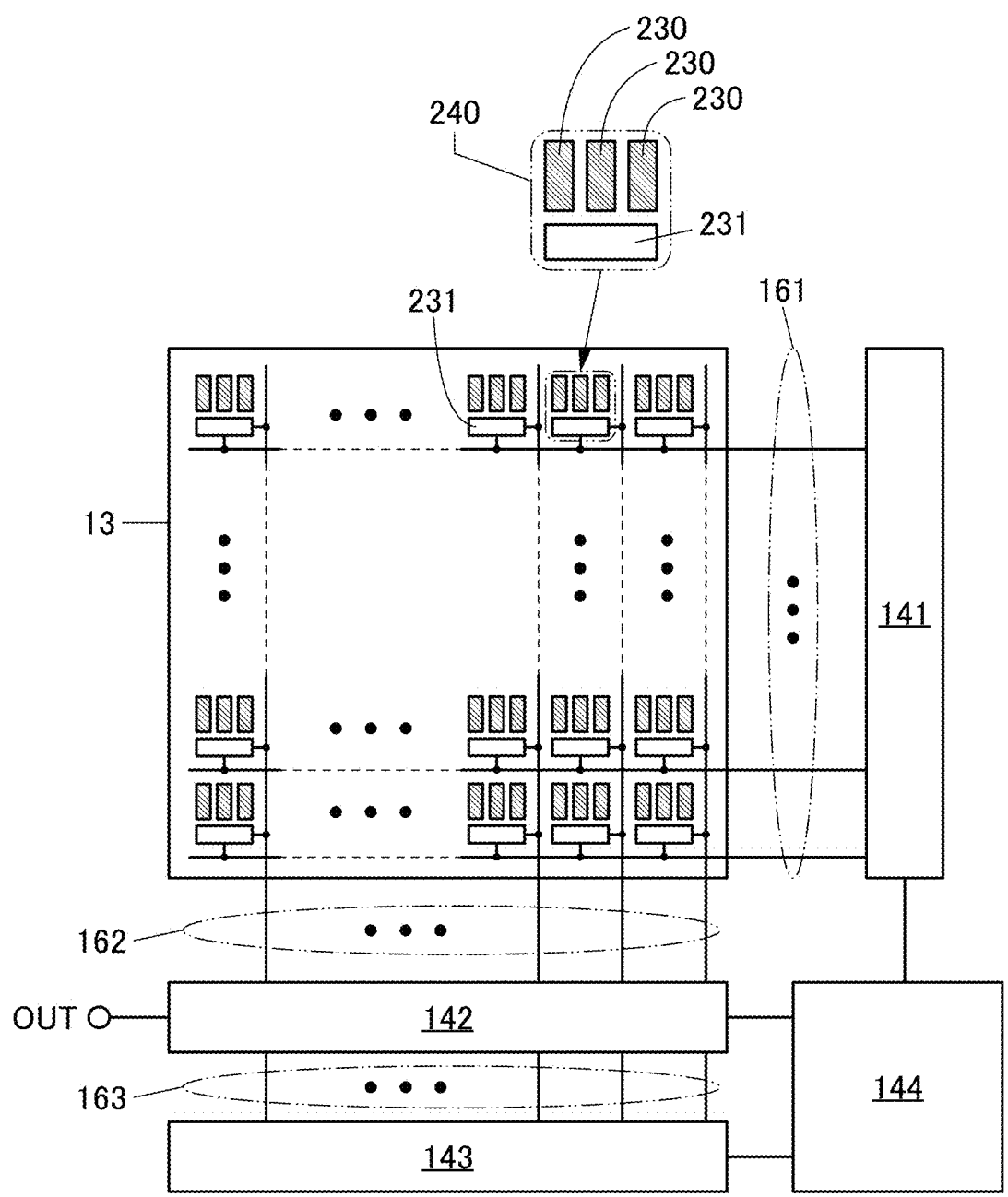
FIG. 21 is a diagram illustrating a display portion.

FIG. 21 illustrates a structure example of the display portion 13 in the case where the pixel 240 includes the pixel 231 including a light-receiving element. FIG. 21 is a block diagram illustrating the display portion 13 including the pixel 231. The display portion 13 includes a plurality of pixels 240 arranged in a matrix. FIG. 21 illustrates the pixel structure in FIG. 20F as the pixel 240.

In FIG. 21, the display portion 13 is electrically connected to a first driver portion 141, a second driver portion 143, and a reading portion 142. Specifically, the first driver portion 141 is electrically connected to the plurality of pixels 231 through a plurality of wirings 161. One wiring 161 is electrically connected to the plurality of pixels 231 arranged in one row. The reading portion 142 is electrically connected to the plurality of pixels 231 through a plurality of wirings 162. One wiring 162 is electrically connected to the plurality of pixels 231 arranged in one column. The second driver portion 143 is electrically connected to the reading portion 142 through a plurality of wirings 163.

Note that wirings connected to one pixel 231 are not limited to the wiring 161 and the wiring 162. A wiring other than the wiring 161 and the wiring 162 may be connected to the pixel 231.

The first driver portion 141, the reading portion 142, and the second driver portion 143 are electrically connected to a control portion 144. The control portion 144 has a function of controlling the operation of the first driver portion 141, the reading portion 142, and the second driver portion 143.

The first driver portion 141 has a function of selecting the pixels 231 row by row. The pixels 231 in the row selected by the first driver portion 141 output imaging data to the reading portion 142 through the wirings 162.

The reading portion 142 retains imaging data supplied from the pixels 231, and performs noise removal and the like. As the noise removal, for example, CDS (Correlated Double Sampling) treatment may be performed. The reading portion 142 may have a function of amplifying imaging data, an AD conversion function of imaging data, or the like.

The second driver portion 143 has a function of sequentially selecting imaging data retained in the reading portion 142 and outputting the imaging data from an output terminal OUT to the outside.

Note that although the plurality of pixels 230 are electrically connected to the source driver circuit 31 and the gate driver circuit 33 as illustrated in FIG. 19, the source driver circuit 31 and the gate driver circuit 33 are not illustrated in FIG. 21. Although FIG. 21 illustrates an example in which one first driver portion 141, one reading portion 142, one second driver portion 143, and the control portion 144 are provided in the display portion 13, they may be provided for each of the sub-display portions 19.

When the first driver portion 141, the reading portion 142, the second driver portion 143, and the control portion 144 are provided for each of the sub-display portions 19, the operation speed of the first driver portion 141, the reading portion 142, the second driver portion 143, and the control portion 144 in a region where an imaging operation is judged to be unnecessary can be decreased or the operation can be stopped. Thus, power consumption of the display apparatus can be reduced.

The first driver portion 141, the reading portion 142, the second driver portion 143, and the control portion 144 may be provided in the layer 20 like the source driver circuit 31 and the gate driver circuit 33.

<Circuit Structure Example of Pixel 231>

Figure 22A:
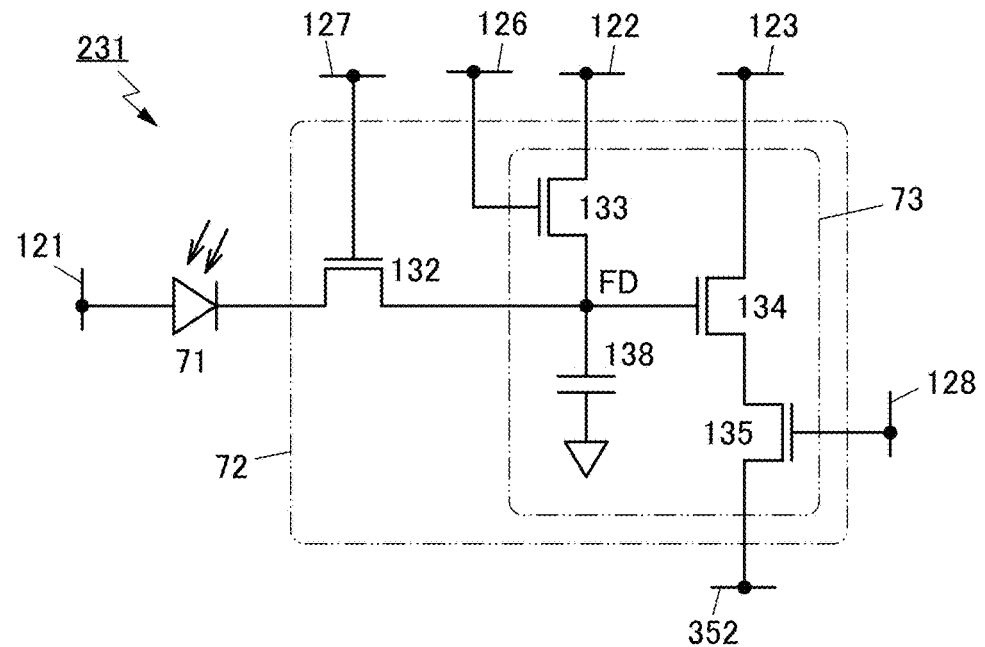
FIG. 22A and FIG. 22B are diagrams illustrating structure examples of a display apparatus.

FIG. 22A is a circuit diagram illustrating a circuit structure example of the pixel 231. The pixel 231 includes a light-receiving element 71 (also referred to as a "photoelectric conversion element" or an "imaging element") and a pixel circuit 72. Note that in this specification and the like, the pixel circuit 72 is referred to as an "imaging pixel circuit" in some cases.

The pixel circuit 72 includes a transistor 132 and a reading circuit 73. The reading circuit 73 includes a transistor 133, a transistor 134, a transistor 135, and a capacitor 138. Note that a structure in which the capacitor 138 is not provided may be employed.

One electrode (cathode) of the light-receiving element 71 is electrically connected to one of a source and a drain of the transistor 132. The other of the source and the drain of the transistor 132 is electrically connected to one of a source and a drain of the transistor 133. The one of the source and the drain of the transistor 133 is electrically connected to one electrode of the capacitor 138. The one electrode of the capacitor 138 is electrically connected to a gate of the transistor 134. One of a source and a drain of the transistor 134 is electrically connected to one of a source and a drain of the transistor 135.

Here, a wiring that connects the other of the source and the drain of the transistor 132, the one electrode of the capacitor 138, the one of the source and the drain of the transistor 133, and the gate of the transistor 134 is a node FD. The node FD can function as a charge detection portion.

The other electrode (anode) of the light-receiving element 71 is electrically connected to a wiring 121. A gate of the transistor 132 is electrically connected to a wiring 127. The other of the source and the drain of the transistor 133 is electrically connected to a wiring 122. The other of the source and the drain of the transistor 134 is electrically connected to a wiring 123. A gate of the transistor 133 is electrically connected to a wiring 126. A gate of the transistor 135 is electrically connected to a wiring 128. The other electrode of the capacitor 138 is electrically connected to a reference potential line such as a GND wiring, for example. The other of the source and the drain of the transistor 135 is electrically connected to a wiring 352.

The wiring 127, the wiring 126, and the wiring 128 each have a function of a signal line controlling on and off states of the corresponding transistor. The wiring 352 has a function as an output line.

The wiring 121, the wiring 122, and the wiring 123 each have a function of a power supply line. In the structure illustrated in FIG. 22A, the cathode side of the light-receiving element 71 is electrically connected to the transistor 132, and the node FD is reset to a high potential in the operation. Thus, the wiring 122 is at a high potential (a potential higher than that of the wiring 121).

Although the cathode of the light-receiving element 71 is electrically connected to the node FD in FIG. 22A, the anode side of the light-receiving element 71 may be electrically connected to the one of the source and the drain of the transistor 132. In that case, since the node FD is reset to a low potential in the operation in the structure, the wiring 122 is set to a low potential (a potential lower than that of the wiring 121).

The transistor 132 has a function of controlling the potential of the node FD. The transistor 132 is also referred to as a "transfer transistor". The transistor 133 has a function of resetting the potential of the node FD. The transistor 133 is also referred to as a "reset transistor". The transistor 134 functions as a source follower circuit and can output the potential of the node FD as image data to the wiring 352. The transistor 135 has a function of selecting a pixel to which the image data is output. The transistor 134 is also referred to as an "amplifier transistor". The transistor 135 is also referred to as a "selection transistor".

Figure 22B:
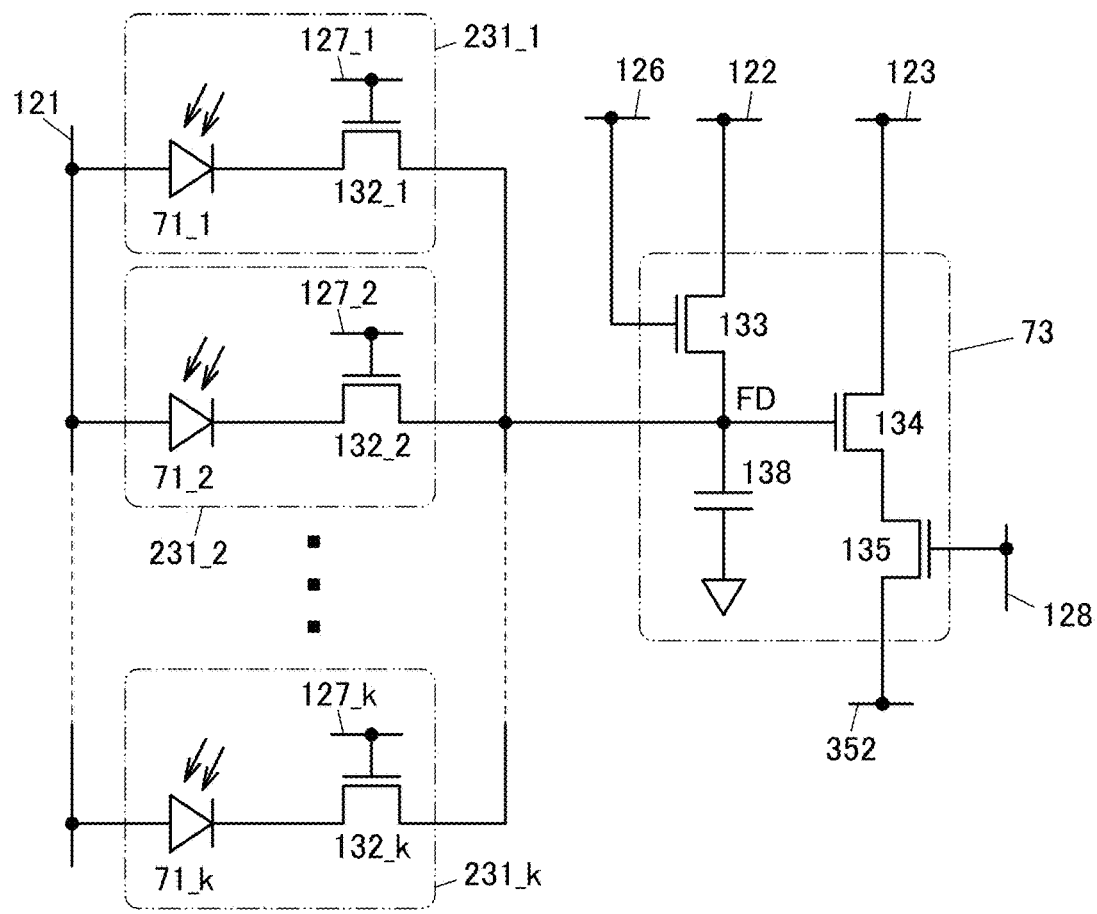

With the light-receiving element 71 and the transistor 132 regarded as one set as illustrated in FIG. 22B, a plurality of sets of light-receiving elements 71 and transistors 132 may be electrically connected to one node FD. That is, the plurality of sets of light-receiving elements 71 and transistors 132 may be electrically connected to one reading circuit 73.

When one reading circuit 73 is shared by the plurality of sets of light-receiving elements 71 and transistors 132, the area occupied by one pixel 231 can be reduced. Thus, the packing density of the pixels 231 can be increased. For example, the reading circuit 73 may be formed in the layer 20 and the light-receiving element 71 and the transistor 132 may be formed in the layer 50. Alternatively, the light-receiving element 71 may be formed in the layer 60.

In FIG. 22B, the light-receiving element 71 and the transistor 132 in the first set are shown as a light-receiving element 71_1 and a transistor 132_1, respectively. A gate of the transistor 132_1 is electrically connected to a wiring 127_1. The light-receiving element 71 and the transistor 132 in the second set are shown as a light-receiving element 71_2 and a transistor 132_2, respectively. A gate of the transistor 132_2 is electrically connected to a wiring 127_2. The light-receiving element 71 and the transistor 132 in the k-th set (k is an integer greater than or equal to 1) are shown as a light-receiving element 71_k and a transistor 132_k, respectively. A gate of the transistor 132_k is electrically connected to a wiring 127_k.

In the case of the structure illustrated in FIG. 22B, one set of the light-receiving element 71 and the transistor 132 can be regarded as one pixel 231. In FIG. 22B, the pixel 231 that includes the light-receiving element 71_1 and the transistor 132_1 is shown as a pixel 231_1. The pixel 231 that includes the light-receiving element 71_2 and the transistor 132_2 is shown as a pixel 231_2. The pixel 231 that includes the light-receiving element 71_k and the transistor 132_k is shown as a pixel 231_k. In the case of the structure illustrated in FIG. 22B, the transistor 132 corresponds to the pixel circuit 72.

<Structure Example of Light-Emitting Element>

The light-emitting element 61 that can be used in the display apparatus according to one embodiment of the present invention will be described.

Figure 23A:
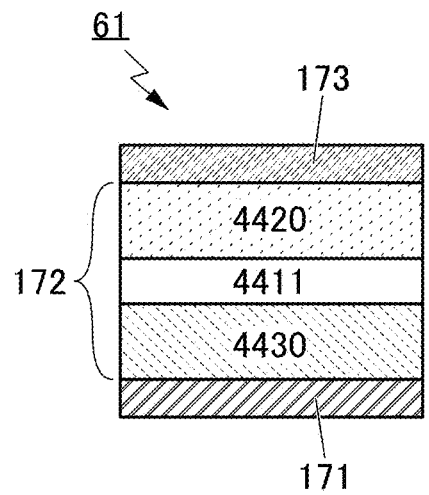
FIG. 23A to FIG. 23D are diagrams illustrating structure examples of a light-emitting element.

As illustrated in FIG. 23A, the light-emitting element 61 includes an EL layer 172 between a pair of electrodes (a conductor 171 and a conductor 173). The EL layer 172 can be formed of a plurality of layers such as a layer 4420, a light-emitting layer 4411, and a layer 4430. The layer 4420 can include, for example, a layer containing a substance with a high electron-injection property (an electron-injection layer) and a layer containing a substance with a high electron-transport property (an electron-transport layer). The light-emitting layer 4411 contains a light-emitting compound, for example. The layer 4430 can include, for example, a layer containing a substance with a high hole-injection property (a hole-injection layer) and a layer containing a substance with a high hole-transport property (a hole-transport layer).

The structure including the layer 4420, the light-emitting layer 4411, and the layer 4430, which are provided between the pair of electrodes, can function as a single light-emitting unit, and the structure in FIG. 23A is referred to as a single structure in this specification and the like.

Figure 23B:
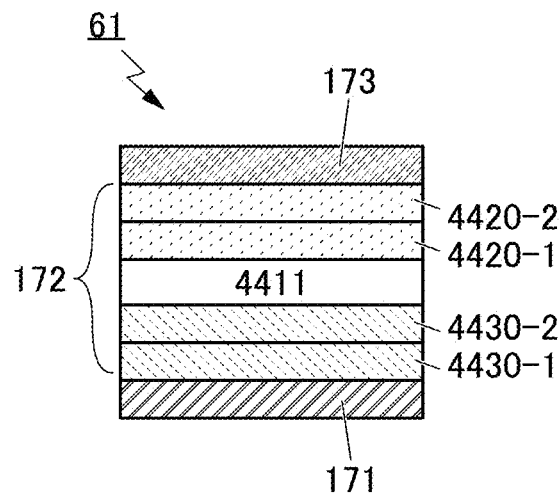

FIG. 23B illustrates a variation example of the EL layer 172 included in the light-emitting element 61 illustrated in FIG. 23A. Specifically, the light-emitting element 61 illustrated in FIG. 23B includes a layer 4430-1 over the conductor 171, a layer 4430-2 over the layer 4430-1, the light-emitting layer 4411 over the layer 4430-2, a layer 4420-1 over the light-emitting layer 4411, a layer 4420-2 over the layer 4420-1, and the conductor 173 over the layer 4420-2. In the case where the conductor 171 is an anode and the conductor 173 is a cathode, for example, the layer 4430-1 functions as a hole-injection layer, the layer 4430-2 functions as a hole-transport layer, the layer 4420-1 functions as an electron-transport layer, and the layer 4420-2 functions as an electron-injection layer. Alternatively, in the case where the conductor 171 is a cathode and the conductor 173 is an anode, the layer 4430-1 functions as an electron-injection layer, the layer 4430-2 functions as an electron-transport layer, the layer 4420-1 functions as a hole-transport layer, and the layer 4420-2 functions as a hole-injection layer. With such a layered structure, carriers can be efficiently injected to the light-emitting layer 4411, and the efficiency of the recombination of carriers in the light-emitting layer 4411 can be enhanced.

Figure 23C:
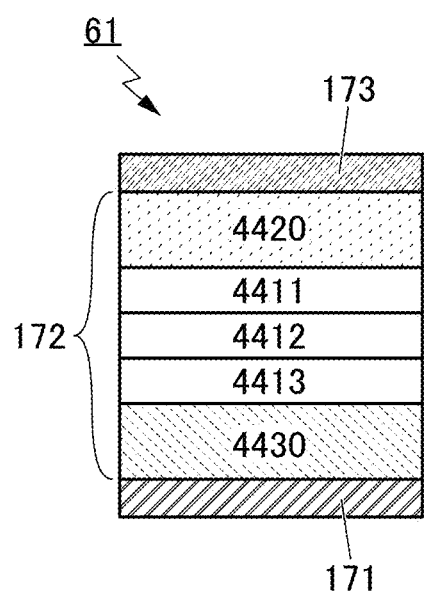

Note that the structure in which a plurality of light-emitting layers (the light-emitting layer 4411, a light-emitting layer 4412, and a light-emitting layer 4413) are provided between the layer 4420 and the layer 4430 as illustrated in FIG. 23C is also an example of the single structure.

Figure 23D:
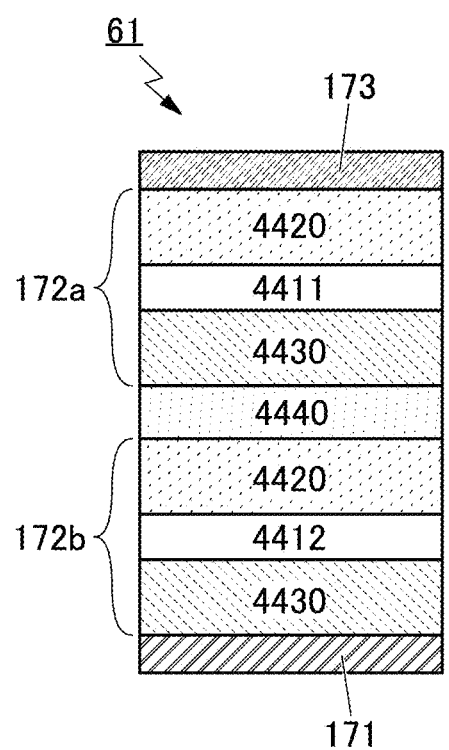

The structure in which a plurality of light-emitting units (an EL layer 172a and an EL layer 172b) are connected in series with an intermediate layer (charge-generation layer) 4440 therebetween as illustrated in FIG. 23D is referred to as a tandem structure or a stack structure in this specification and the like. The tandem structure enables a light-emitting element capable of high luminance light emission.

In the case where the light-emitting element 61 has the tandem structure illustrated in FIG. 23D, the EL layer 172a and the EL layer 172b may emit light of the same color. For example, the EL layer 172a and the EL layer 172b may both emit green light.

Note that full-color display can be achieved by using the light-emitting element 61 emitting red light (R), the light-emitting element 61 emitting green light (G), and the light-emitting element 61 emitting blue light (B) as subpixels and constituting one pixel with these three subpixels. In the case where the display portion 13 includes three kinds of subpixels of R, G, and B, the light-emitting elements may each have a tandem structure. Specifically, the EL layer 172a and the EL layer 172b in the subpixel of R each contain a material capable of emitting red light, the EL layer 172a and the EL layer 172b in the subpixel of G each contain a material capable of emitting green light, and the EL layer 172a and the EL layer 172b in the subpixel of B each contain a material capable of emitting blue light. In other words, the light-emitting layer 4411 and the light-emitting layer 4412 may contain the same material. When the EL layer 172a and the EL layer 172b emit light of the same color, the current density per unit emission luminance can be reduced. Thus, the reliability of the light-emitting element 61 can be increased.

The emission color of the light-emitting element can be red, green, blue, cyan, magenta, yellow, white, or the like depending on the material that constitutes the EL layer 172. Furthermore, the color purity can be further increased when the light-emitting element has a microcavity structure.

The light-emitting layer may contain two or more light-emitting substances that emit light of R (red), G (green), B (blue), Y (yellow), O (orange), or the like. The light-emitting element that emits white light preferably contains two or more kinds of light-emitting substances in the light-emitting layer. To obtain white light emission, two or more light-emitting substances are selected such that their emission colors are complementary colors. For example, when the emission color of a first light-emitting layer and the emission color of a second light-emitting layer have a relationship of complementary colors, it is possible to obtain a light-emitting element which emits white light as a whole. The same applies to a light-emitting element including three or more light-emitting layers.

The light-emitting layer preferably contains two or more light-emitting substances that emit light of R (red), G (green), B (blue), Y (yellow), O (orange), or the like. Alternatively, the light-emitting layer preferably contains two or more light-emitting substances that emit light containing two or more of spectral components of R, G, and B.

Alternatively, as the light-emitting substance, a substance that emits near-infrared light can be used.

Examples of a light-emitting substance include a substance that emits fluorescent light (a fluorescent material), a substance that emits phosphorescent light (a phosphorescent material), and a substance that exhibits thermally activated delayed fluorescence (a thermally activated delayed fluorescence (TADF) material). As the light-emitting substance contained in the EL element, not only an organic compound but also an inorganic compound (a quantum dot material or the like) can be used.

<Method for Forming Light-Emitting Element>

An example of a method for forming the light-emitting element 61 will be described below.

Figure 24A:
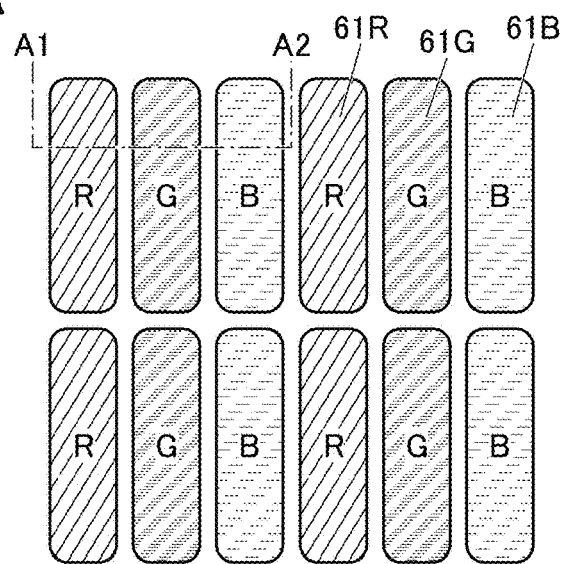
FIG. 24A to FIG. 24D are diagrams illustrating structure examples of light-emitting elements.

FIG. 24A illustrates a schematic top view of the light-emitting element 61. The light-emitting element 61 includes a plurality of light-emitting elements 61R exhibiting red, a plurality of light-emitting elements 61G exhibiting green, and a plurality of light-emitting elements 61B exhibiting blue. In FIG. 24A, light-emitting regions of the light-emitting elements are denoted by R, G, and B to easily differentiate the light-emitting elements. Although FIG. 24A illustrates the structure having three emission colors of red (R), green (G), and blue (B), one embodiment of the present invention is not limited thereto. For example, the structure may have four or more colors.

The light-emitting elements 61R, the light-emitting elements 61G, and the light-emitting elements 61B are arranged in a matrix. Although FIG. 24A illustrates what is called a stripe arrangement in which the light-emitting elements of the same color are arranged in one direction, the arrangement method of the light-emitting elements is not limited thereto.

As the light-emitting element 61R, the light-emitting element 61G, and the light-emitting element 61B, an organic EL device such as an OLED (Organic Light EmittinGDiode) or a QLED (Quantum-dot Light Emitting Diode) is preferably used.

Figure 24B:
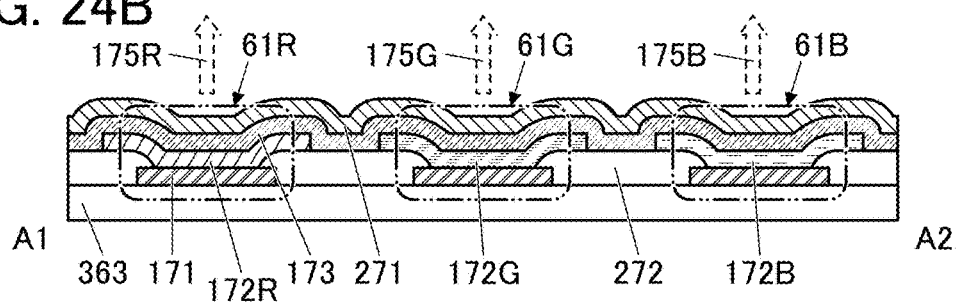

FIG. 24B is a cross-sectional schematic view taken along the dashed-dotted line A1-A2 in FIG. 24A. FIG. 24B illustrates cross sections of the light-emitting element 61R, the light-emitting element 61G, and the light-emitting element 61B. The light-emitting element 61R, the light-emitting element 61G, and the light-emitting element 61B are each provided over an insulator 363 and include the conductor 171 functioning as a pixel electrode and the conductor 173 functioning as a common electrode. For the insulator 363, one or both of an inorganic insulating film and an organic insulating film can be used. An inorganic insulating film is preferably used for the insulator 363. Examples of the inorganic insulating film include an oxide insulating film and a nitride insulating film such as a silicon oxide film, a silicon oxynitride film, a silicon nitride oxide film, a silicon nitride film, an aluminum oxide film, an aluminum oxynitride film, and a hafnium oxide film.

The light-emitting elements 61R each include an EL layer 172R between the conductor 171 functioning as a pixel electrode and the conductor 173 functioning as a common electrode. The EL layer 172R contains at least a light-emitting organic compound that emits red light. An EL layer 172G included in the light-emitting element 61G contains at least a light-emitting organic compound that emits green light. An EL layer 172B included in the light-emitting element 61B contains at least a light-emitting organic compound that emits blue light.

The EL layer 172R, the EL layer 172G, and the EL layer 172B may each include one or more of an electron-injection layer, an electron-transport layer, a hole-injection layer, and a hole-transport layer in addition to the layer containing a light-emitting substance (the light-emitting layer).

The conductor 171 functioning as a pixel electrode is provided in each of the light-emitting elements. The conductor 173 functioning as a common electrode is provided as a continuous layer shared by the light-emitting elements. A conductive film that has a property of transmitting visible light is used for either the conductor 171 functioning as a pixel electrode or the conductor 173 functioning as a common electrode, and a conductive film that has a reflective property is used for the other. When the conductor 171 functioning as a pixel electrode has a light-transmitting property and the conductor 173 functioning as a common electrode has a reflective property, a bottom-emission display apparatus can be obtained, whereas when the conductor 171 functioning as a pixel electrode has a reflective property and the conductor 173 functioning as a common electrode has a light-transmitting property, a top-emission display apparatus can be obtained. Note that when both the conductor 171 functioning as a pixel electrode and the conductor 173 functioning as a common electrode have a light-transmitting property, a dual-emission display apparatus can be obtained.

For example, in the case where the light-emitting element 61R has a top-emission structure, light 175R is emitted from the light-emitting element 61R to the conductor 173 side. In the case where the light-emitting element 61R has a top-emission structure, light 175G is emitted from the light-emitting element 61G to the conductor 173 side. In the case where the light-emitting element 61B has a top-emission structure, light 175B is emitted from the light-emitting element 61B to the conductor 173 side.

An insulator 272 is provided to cover end portions of the conductor 171 functioning as a pixel electrode. End portions of the insulator 272 are preferably tapered. For the insulator 272, a material similar to the material that can be used for the insulator 363 can be used.

The insulator 272 is provided to prevent an unintentional electric short-circuit between adjacent light-emitting elements 61 and unintended light emission therefrom. The insulator 272 also has a function of preventing the contact of a metal mask with the conductor 171 in the case where the metal mask is used to form the EL layer 172.

The EL layer 172R, the EL layer 172G, and the EL layer 172B each include a region in contact with the top surface of the conductor 171 functioning as a pixel electrode and a region in contact with a surface of the insulator 272. End portions of the EL layer 172R, the EL layer 172G, and the EL layer 172B are positioned over the insulator 272.

As illustrated in FIG. 24B, there is a gap between the two EL layers of the light-emitting elements with different light emission colors. In this manner, the EL layer 172R, the EL layer 172G, and the EL layer 172G are preferably provided so as not to be in contact with each other. This suitably prevents unintentional light emission (also referred to as crosstalk) from being caused by current flowing through two adjacent EL layers. As a result, the contrast can be increased to achieve a display apparatus with high display quality.

The EL layer 172R, the EL layer 172G, and the EL layer 172G can be formed separately by a vacuum evaporation method or the like using a shadow mask such as a metal mask. Alternatively, these layers may be formed separately by a photolithography method. The use of a photolithography method achieves a display apparatus with high resolution, which is difficult to obtain in the case of using a metal mask.

In this specification and the like, a device formed using a metal mask or an FMM (a fine metal mask or a high-resolution metal mask) may be referred to as a device having an MM (metal mask) structure. In addition, in this specification and the like, a device formed without using a metal mask or an FMM is sometimes referred to as a device having an MML (metal maskless) structure. A display apparatus having an MML structure is formed without using a metal mask and thus has higher flexibility in designing the pixel arrangement, the pixel shape, and the like than a display apparatus having an MM structure.

A protective layer 271 is provided over the conductor 173 functioning as a common electrode so as to cover the light-emitting element 61R, the light-emitting element 61G, and the light-emitting element 61B. The protective layer 271 has a function of preventing diffusion of impurities such as water into the light-emitting elements from above.

The protective layer 271 can have, for example, a single-layer structure or a stacked-layer structure at least including an inorganic insulating film. Examples of the inorganic insulating film include an oxide film or a nitride film such as a silicon oxide film, a silicon oxynitride film, a silicon nitride oxide film, a silicon nitride film, an aluminum oxide film, an aluminum oxynitride film, and a hafnium oxide film. Alternatively, a semiconductor material such as indium gallium oxide or indium gallium zinc oxide (IGZO) may be used for the protective layer 271. Note that the protective layer 271 is formed by an ALD method, a CVD method, or a sputtering method. Although the protective layer 271 includes an inorganic insulating film in this example, one embodiment of the present invention is not limited thereto. For example, the protective layer 271 may have a stacked-layer structure of an inorganic insulating film and an organic insulating film.

Note that in this specification, a nitride oxide refers to a compound that contains more nitrogen than oxygen. An oxynitride refers to a compound that contains more oxygen than nitrogen. The content of each element can be measured by Rutherford backscattering spectrometry (RBS), for example.

In the case where indium gallium zinc oxide is used for the protective layer 271, indium gallium zinc oxide can be processed by a wet etching method or a dry etching method. For example, in the case where IGZO is used as the protective layer 271, a chemical solution of oxalic acid, phosphoric acid, a mixed chemical solution (e.g., a mixed chemical solution of phosphoric acid, acetic acid, nitric acid, and water (also referred to as a mixed acid aluminum etchant)), or the like can be used. Note that the volume ratio of phosphoric acid, acetic acid, nitric acid, and water in the mixed acid aluminum etchant can be 53.3:6.7:3.3:36.7 or in the vicinity thereof.

Note that the structure illustrated in FIG. 24B may be referred to as an SBS structure described later.

Figure 24C:
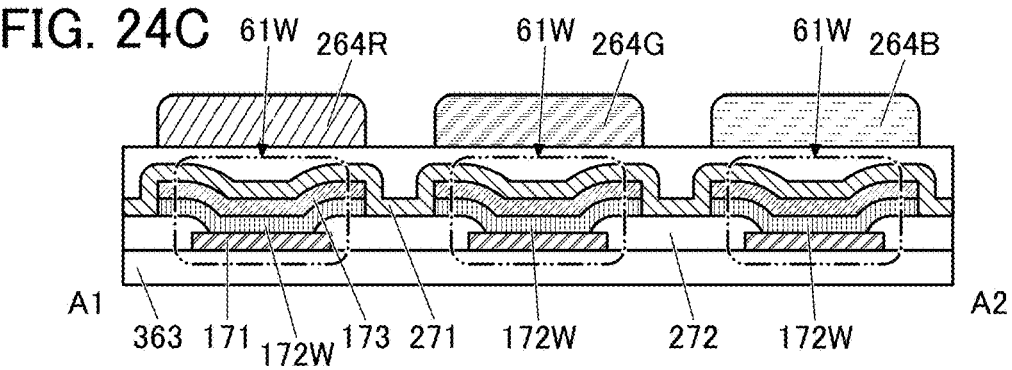

FIG. 24C illustrates an example different from the above. Specifically, in FIG. 24C, light-emitting elements 61W that emits white light are provided. The light-emitting elements 61W each include an EL layer 172W that emits white light between the conductor 171 functioning as a pixel electrode and the conductor 173 functioning as a common electrode.

The EL layer 172W can have, for example, a structure in which two or more light-emitting layers that are selected so as to emit light of complementary colors are stacked. It is also possible to use a stacked EL layer in which a charge-generation layer is provided between light-emitting layers.

FIG. 24C illustrates three light-emitting elements 61W side by side. A coloring layer 264R is provided above the light-emitting element 61W on the left. The coloring layer 264R functions as a band path filter that transmits red light. Similarly, a coloring layer 264G that transmits green light is provided above the light-emitting element 61W in the middle, and a coloring layer 264B that transmits blue light is provided above the light-emitting element 61W on the right. Thus, the display apparatus can display an image with colors.

Here, the EL layer 172W and the conductor 173 functioning as a common electrode are each separated between two adjacent light-emitting elements 61W. This can prevent unintentional light emission from being caused by current flowing through the EL layers 172W of the two adjacent light-emitting elements 61W. Particularly when stacked EL layers in which a charge-generation layer is provided between two light-emitting layers are used as the EL layer 172W, crosstalk is more significant as the resolution increases, i.e., as the distance between adjacent pixels decreases, leading to lower contrast. Thus, the above structure can achieve a display apparatus having both high resolution and high contrast.

The EL layer 172W and the conductor 173 functioning as a common electrode are preferably separated by a photolithography method. This can reduce an interval between light-emitting elements, enabling a display apparatus with a higher aperture ratio than that formed using, for example, a shadow mask such as a metal mask.

Note that in the case of a bottom-emission light-emitting element, a coloring layer may be provided between the conductor 171 functioning as a pixel electrode and the insulator 363.

Figure 24D:
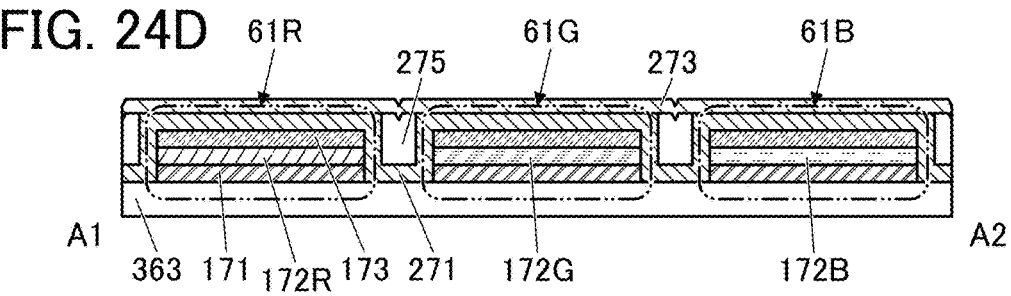

FIG. 24D illustrates an example different from the above. Specifically, in FIG. 24D, the insulators 272 are not provided between the light-emitting element 61R, the light-emitting element 61G, and the light-emitting element 61B. With such a structure, the display apparatus can have a high aperture ratio. When the insulators 272 are not provided, unevenness formed by the light-emitting elements 61 can be reduced, thereby improving the viewing angle of the display apparatus. Specifically, the viewing angle can be greater than or equal to 150° and less than 180°, preferably greater than or equal to 160° and less than 180°, further preferably greater than or equal to 160° and less than 180°.

The protective layer 271 covers side surfaces of the EL layer 172R, the EL layer 172G, and the EL layer 172B. With this structure, impurities (typically, water or the like) can be inhibited from entering the EL layer 172R, the EL layer 172G, and the EL layer 172B through their side surfaces. In addition, a leakage current between adjacent light-emitting elements 61 is reduced, so that color saturation and contrast ratio are improved and power consumption is reduced.

In the structure illustrated in FIG. 24D, the top shapes of the conductor 171, the EL layer 172R, and the conductor 173 are substantially the same. This structure can be formed in such a manner that the conductor 171, the EL layer 172R, and the conductor 173 are formed and collectively processed using a resist mask or the like. In this process, the EL layer 172R and the conductor 173 are processed using the conductor 173 as a mask, and thus this process can be called self-alignment patterning. Although the EL layer 172R is described here, the EL layer 172G and the EL layer 172B can each have a similar structure.

In FIG. 24D, a protective layer 273 is further provided over the protective layer 271. For example, the protective layer 271 can be formed with an apparatus that can deposit a film with excellent coverage (typically, an ALD apparatus or the like), and the protective layer 273 can be formed with an apparatus that can deposit a film with coverage inferior to that of the protective layer 271 (typically, a sputtering apparatus or the like), whereby a region 275 can be provided between the protective layer 271 and the protective layer 273. In other words, the regions 275 are positioned between the EL layer 172R and the EL layer 172G and between the EL layer 172G and the EL layer 172B.

Note that the region 275 includes, for example, any one or more selected from air, nitrogen, oxygen, carbon dioxide, and Group 18 elements (typically, helium, neon, argon, xenon, krypton, and the like). Furthermore, for example, a gas used during the deposition of the protective layer 273 is sometimes included in the region 275. For example, in the case where the protective layer 273 is deposited by a sputtering method, any one or more of the above-described Group 18 elements is sometimes included in the region 275. In the case where a gas is included in the region 275, a gas can be identified with a gas chromatography method or the like. Alternatively, in the case where the protective layer 273 is deposited by a sputtering method, a gas used in the sputtering is sometimes contained in the protective layer 273. In this case, an element such as argon is sometimes detected when the protective layer 273 is analyzed by an energy dispersive X-ray analysis (EDX analysis) or the like.

In the case where the refractive index of the region 275 is lower than the refractive index of the protective layer 271, light emitted from the EL layer 172R, the EL layer 172G, or the EL layer 172B is reflected at the interface between the protective layer 271 and the region 275. Thus, light emitted from the EL layer 172R, the EL layer 172G, or the EL layer 172B can be inhibited from entering an adjacent pixel in some cases. This can inhibit color mixture of light emitted from adjacent pixels and thus can improve the display quality of the display apparatus.

In the case of the structure illustrated in FIG. 24D, a region between the light-emitting element 61R and the light-emitting element 61G or a region between the light-emitting element 61G and the light-emitting element 61B (hereinafter simply referred to as a distance between the light-emitting elements) can be small. Specifically, the distance between the light-emitting elements can be less than or equal to 1 µm, preferably less than or equal to 500 nm, further preferably less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display apparatus includes a region in which an interval between the side surface of the EL layer 172R and the side surface of the EL layer 172G or an interval between the side surface of the EL layer 172G and the side surface of the EL layer 172B is less than or equal to 1 µm, preferably less than or equal to 0.5 µm (500 nm), further preferably less than or equal to 100 nm.

In the case where the region 275 includes a gas, the light-emitting elements can be separated from each other and color mixture of light from the light-emitting elements, crosstalk, or the like can be inhibited.

The region 275 may be a space or may be filled with a filler. Examples of the filler include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. Alternatively, a photoresist may be used as the filler. The photoresist used as the filler may be a positive photoresist or a negative photoresist.

Figure 25A:
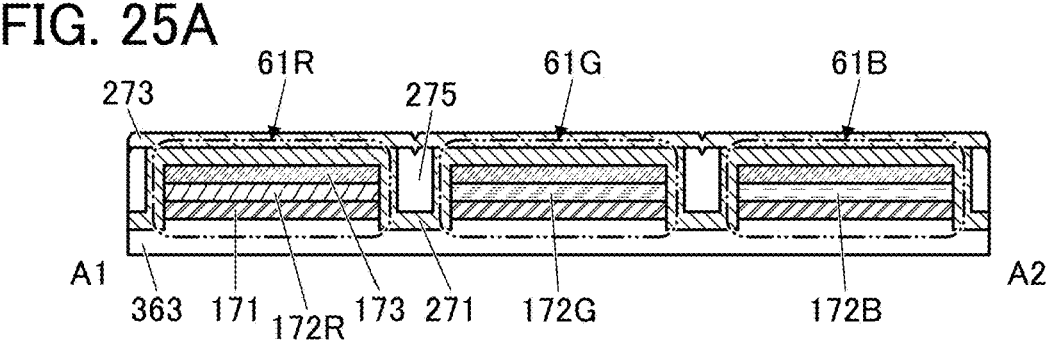
FIG. 25A to FIG. 25D are diagrams illustrating structure examples of light-emitting elements.

FIG. 25A illustrates an example different from the above. Specifically, the structure illustrated in FIG. 25A is different from the structure illustrated in FIG. 24D in the structure of the insulator 363. The top surface of the insulator 363 is partly removed when the light-emitting element 61R, the light-emitting element 61G, and the light-emitting element 61B are processed, so that the insulator 363 has a depressed portion. In addition, the protective layer 271 is formed in the depressed portion. In other words, in the cross-sectional view, a region is provided, in which the bottom surface of the protective layer 271 is positioned below the bottom surface of the conductor 171. With the region, impurities (typically, water or the like) can be suitably inhibited from entering the light-emitting element 61R, the light-emitting element 61G, and the light-emitting element 61B from the bottom. It is likely that the depressed portion can be formed when impurities (also referred to as residue) that could be attached to the side surfaces of the light-emitting element 61R, the light-emitting element 61G, and the light-emitting element 61B in processing of the light-emitting elements are removed by e.g., wet etching. After the residue is removed, the side surfaces of the light-emitting elements are covered with the protective layer 271, whereby a highly reliable display apparatus can be provided.

Figure 25B:
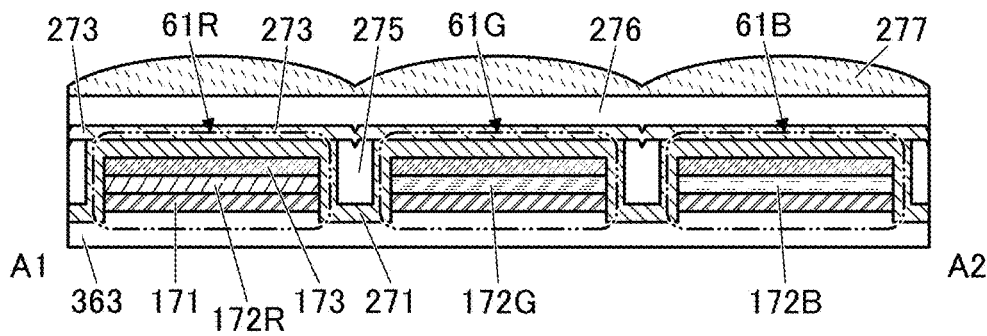

FIG. 25B illustrates an example different from the above. Specifically, the structure illustrated in FIG. 25B includes an insulator 276 and a microlens array 277 in addition to the structure illustrated in FIG. 25A. The insulator 276 functions as an adhesive layer. Note that when the refractive index of the insulator 276 is lower than that of the microlens array 277, the microlens array 277 can condense light emitted from the light-emitting element 61R, the light-emitting element 61G, and the light-emitting element 61B. This can increase the light extraction efficiency of the display apparatus. In particular, this is suitable, because a user can see bright images when the user sees the display surface from the front of the display apparatus. As the insulator 276, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-liquid-mixture-type resin may be used. An adhesive sheet or the like may be used.

Figure 25C:
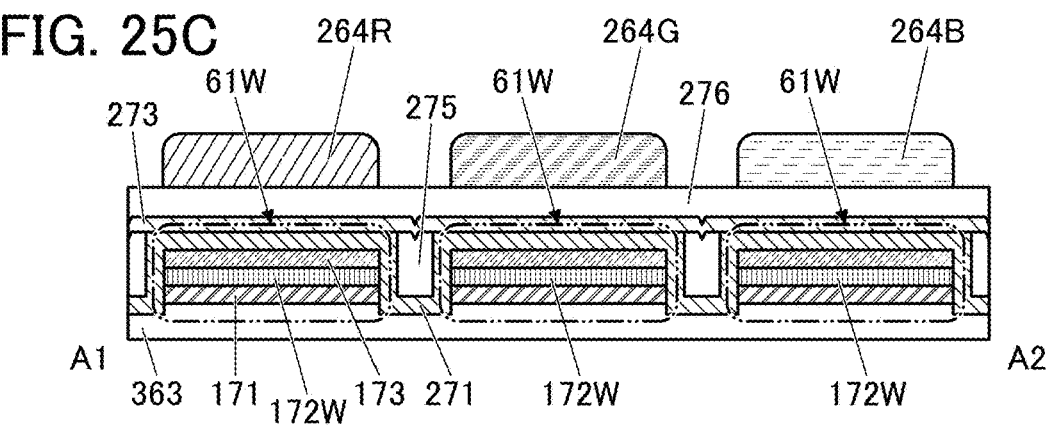

FIG. 25C illustrates an example different from the above. Specifically, the structure illustrated in FIG. 25C includes three light-emitting elements 61W instead of the light-emitting element 61R, the light-emitting element 61G, and the light-emitting element 61B in the structure illustrated in FIG. 25A. In addition, the insulator 276 is provided over the three light-emitting elements 61W, and the coloring layer 264R, the coloring layer 264G, and the coloring layer 264B are provided over the insulator 276. Specifically, the coloring layer 264R that transmits red light is provided at a position overlapping with the light-emitting element 61W on the left, the coloring layer 264G that transmits green light is provided at a position overlapping with the light-emitting element 61W in the middle, and the coloring layer 264B that transmits blue light is provided at a position overlapping with the light-emitting element 61W on the right. Thus, the semiconductor device can display an image with colors. The structure illustrated in FIG. 25C is also a variation example of the structure illustrated in FIG. 24C.

Figure 25D:
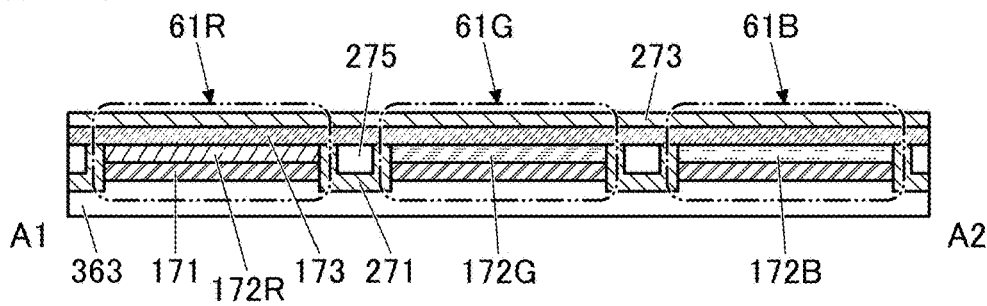

FIG. 25D illustrates an example different from the above. Specifically, in the structure illustrated in FIG. 25D, the protective layer 271 is provided adjacent to the side surfaces of the conductor 171 and the EL layer 172. The conductor 173 is provided as a continuous layer shared by the light-emitting elements. In the structure illustrated in FIG. 25D, the region 275 is preferably filled with a filler.

Furthermore, the color purity of emitted light can be increased when the light-emitting element 61 has a microcavity structure. In order that the light-emitting element 61 has a microcavity structure, a product of a distance d between the conductor 171 and the conductor 173 and a refractive index n of the EL layer 172 (optical path length) is set to m times half of a wavelength λ (m is an integer greater than or equal to 1). The distance d can be obtained by Formula (5).

$$d = m \times \lambda / (2 \times n) \quad (5)$$

According to Formula (5), in the light-emitting element 61 having the microcavity structure, the distance d is determined in accordance with the wavelength (emission color) of emitted light. The distance d corresponds to the thickness of the EL layer 172. Thus, the EL layer 172G is provided to have a larger thickness than the EL layer 172B, and the EL layer 172R is provided to have a larger thickness than the EL layer 172G in some cases.

To be exact, the distance d is a distance from a reflection region in the conductor 171 functioning as a reflective electrode to a reflection region in the conductor 173 functioning as an electrode having properties of transmitting and reflecting emitted light (a semi-transmissive and semi-reflective electrode). For example, in the case where the conductor 171 is a stack of silver and ITO (Indium Tin Oxide) that is a transparent conductive film and the ITO is positioned on the EL layer 172 side, the distance d suitable for the emission color can be set by adjusting the thickness of the ITO. That is, even when the EL layer 172R, the EL layer 172G, and the EL layer 172B have the same thickness, the distance d suitable for the emission color can be obtained by adjusting the thickness of the ITO.

However, it is sometimes difficult to determine the exact position of the reflection region in each of the conductor 171 and the conductor 173. In that case, it is assumed that the effect of the microcavity can be fully obtained with a certain position in each of the conductor 171 and the conductor 173 being supposed as the reflection region.

The light-emitting element 61 includes a hole-injection layer, a hole-transport layer, a light-emitting layer, an electron-transport layer, an electron-injection layer, and the like. Note that a specific structure example of the light-emitting element 61 will be described in another embodiment. In order to increase the light extraction efficiency in the microcavity structure, the optical path length from the conductor 171 functioning as a reflective electrode to the light-emitting layer is preferably set to an odd multiple of λ/4. In order to achieve this optical path length, the thicknesses of the layers in the light-emitting element 61 are preferably adjusted as appropriate.

In the case where light is emitted from the conductor 173 side, the reflectance of the conductor 173 is preferably higher than the transmittance thereof. The light transmittance of the conductor 173 is preferably higher than or equal to 2% and lower than or equal to 50%, further preferably higher than or equal to 2% and lower than or equal to 30%, still further preferably higher than or equal to 2% and lower than or equal to 10%. When the transmittance of the conductor 173 is set low (the reflectance is set high), the effect of the microcavity can be enhanced.

Figure 26A:
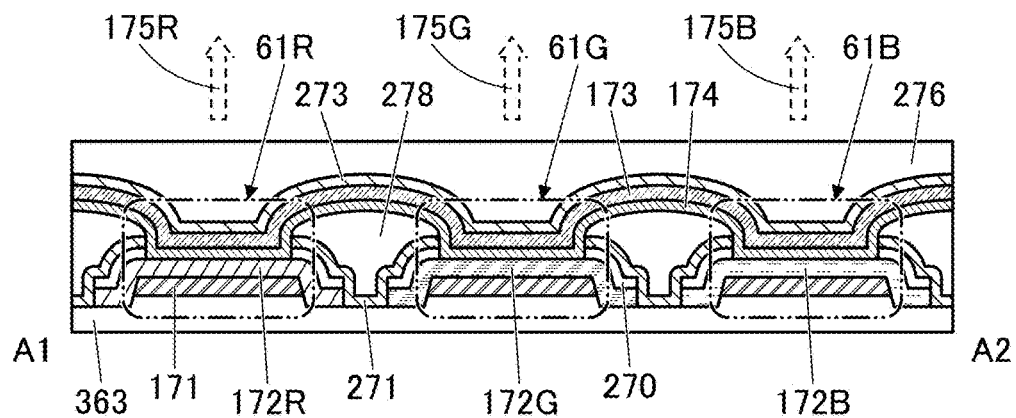
FIG. 26A to FIG. 26C are diagrams illustrating structure examples of light-emitting elements.

FIG. 26A illustrates an example different from the above. Specifically, in the structure illustrated in FIG. 26A, the EL layer 172 extends beyond the end portions of the conductor 171 in each of the light-emitting element 61R, the light-emitting element 61G, and the light-emitting element 61B. For example, in the light-emitting element 61R, the EL layer 172R extends beyond the end portions of the conductor 171. In the light-emitting element 61G, the EL layer 172G extends beyond the end portions of the conductor 171. In the light-emitting element 61B, the EL layer 172B extends beyond the end portions of the conductor 171.

The light-emitting element 61R, the light-emitting element 61G, and the light-emitting element 61B each include a region where the EL layer 172 overlaps with the protective layer 271 with an insulator 270 therebetween. In a region between adjacent light-emitting elements 61, an insulator 278 is provided over the protective layer 271.

Examples of the insulator 278 include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. Alternatively, a photoresist may be used as the insulator 278. The photoresist used as the insulator 278 may be a positive photoresist or a negative photoresist.

A common layer 174 is provided over the light-emitting element 61R, the light-emitting element 61G, the light-emitting element 61B, and the insulator 278, and the conductor 173 is provided over the common layer 174. The common layer 174 includes a region in contact with the EL layer 172R, a region in contact with the EL layer 172G, and a region in contact with the EL layer 172B. The common layer 174 is shared by the light-emitting element 61R, the light-emitting element 61G, and the light-emitting element 61B.

As the common layer 174, one or more of a hole-injection layer, a hole-transport layer, a hole-blocking layer, an electron-blocking layer, an electron-transport layer, and an electron-injection layer can be used. For example, the common layer 174 may be a carrier-injection layer (a hole-injection layer or an electron-injection layer). The common layer 174 can also be regarded as part of the EL layer 172. Note that the common layer 174 is provided as necessary. In the case where the common layer 174 is provided, a layer having the same function as the common layer 174 among the layers included in the EL layer 172 is not necessarily provided.

The protective layer 273 is provided over the conductor 173, and the insulator 276 is provided over the protective layer 273.

Figure 26B:
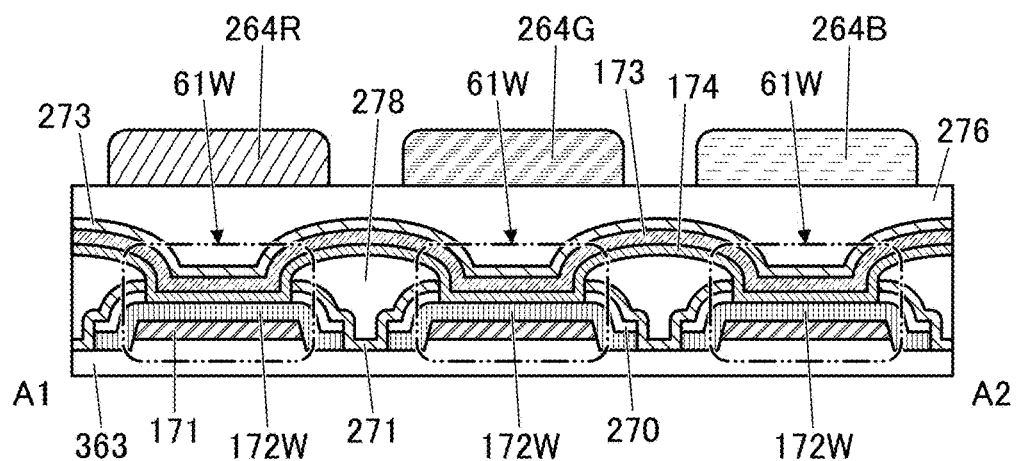

FIG. 26B illustrates an example different from the above. Specifically, the structure illustrated in FIG. 26B includes three light-emitting elements 61W instead of the light-emitting element 61R, the light-emitting element 61G, and the light-emitting element 61B in the structure illustrated in FIG. 26A. In addition, the insulator 276 is provided over the three light-emitting elements 61W, and the coloring layer 264R, the coloring layer 264G, and the coloring layer 264B are provided over the insulator 276. Specifically, the coloring layer 264R that transmits red light is provided at a position overlapping with the light-emitting element 61W on the left, the coloring layer 264G that transmits green light is provided at a position overlapping with the light-emitting element 61W in the middle, and the coloring layer 264B that transmits blue light is provided at a position overlapping with the light-emitting element 61W on the right. Thus, the semiconductor device can display an image with colors. The structure illustrated in FIG. 26B is also a variation example of the structure illustrated in FIG. 25C.

Figure 26C:
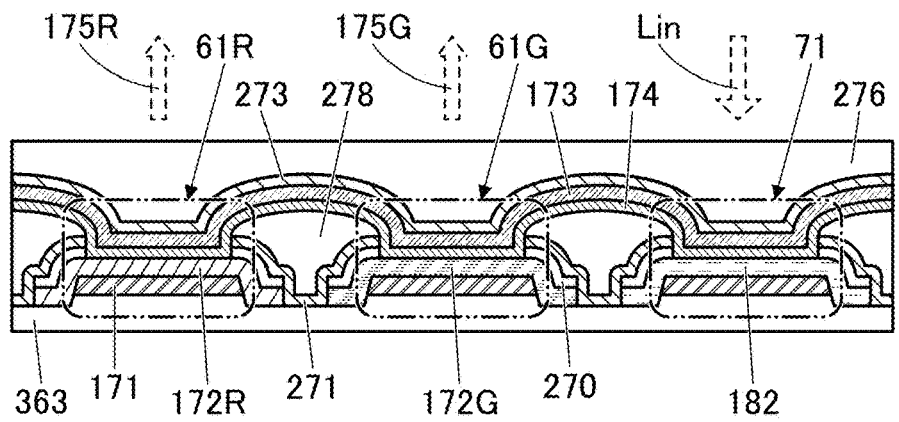

As illustrated in FIG. 26C, the light-emitting element 61R, the light-emitting element 61G, and the light-receiving element 71 may be provided over the insulator 363. The light-receiving element 71 illustrated in FIG. 26C is achieved by replacing the EL layer 172 of the light-emitting element 61 with an active layer 182 (also referred to as a "light-receiving layer") functioning as a photoelectric conversion layer. The active layer 182 has a function of changing a resistance value depending on the wavelength and intensity of the incident light. The active layer 182 can be formed with an organic compound similar to that of the EL layer 172. Note that an inorganic material such as silicon may be used for the active layer 182.

The light-receiving element 71 has a function of detecting light Lin entering from the outside of the display apparatus and passing through the protective layer 273, the conductor 173, and the common layer 174. A coloring layer transmitting light in a given wavelength range may be provided on the incident side of the light Lin so as to overlap with the light-receiving element 71.

<Materials that can be Used for Light-Emitting Element and Light-Receiving Element>

Materials that can be used for the light-emitting element and the light-receiving element will be described.

The hole-injection layer is a layer injecting holes from an anode to the hole-transport layer, and a layer containing a material having a high hole-injection property. Examples of a material having a high hole-injection property include an aromatic amine compound and a composite material containing a hole-transport material and an acceptor material (electron-accepting material).

The hole-transport layer is a layer transporting holes, which are injected from the anode by the hole-injection layer, to the light-emitting layer. The hole-transport layer is a layer containing a hole-transport material. For the hole-transport material, a substance having a hole mobility higher than or equal to $1 \times 10^{-6}$ cm$^2$/Vs is preferable. Note that other substances can also be used as long as they have a property of transporting more holes than electrons. As the hole-transport material, materials having a high hole-transport property, such as a π-electron rich heteroaromatic compound (e.g., a carbazole derivative, a thiophene derivative, and a furan derivative) and an aromatic amine (a compound having an aromatic amine skeleton), are preferable.

The electron-transport layer is a layer transporting electrons, which are injected from a cathode by the electron-injection layer, to the light-emitting layer. The electron-transport layer is a layer containing an electron-transport material. As the electron-transport material, a substance having an electron mobility greater than or equal to $1 \times 10^{-6}$ cm$^2$/Vs is preferable. Note that other substances can also be used as long as they have a property of transporting more electrons than holes. As the electron-transport material, it is possible to use a material having a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound.

The electron-injection layer is a layer injecting electrons from the cathode to the electron-transport layer and a layer containing a material having a high electron-injection property. As the material having a high electron-injection property, an alkali metal, an alkaline earth metal, or a compound thereof can be used. As the material having a high electron-injection property, a composite material containing an electron-transport material and a donor material (an electron-donating material) can also be used.

For the electron-injection layer, an alkali metal, an alkaline earth metal, or a compound thereof, such as lithium, cesium, ytterbium, lithium fluoride (LiF), cesium fluoride (CSF), calcium fluoride (CaFx, where X is a given number), 8-(quinolinolato) lithium (abbreviation: Liq), 2-(2-pyridyl) phenolatolithium (abbreviation: LiPP), 2-(2-pyridyl)-3-pyridinolatolithium (abbreviation: LiPPy), 4-phenyl-2-(2-pyridyl) phenolatolithium (abbreviation: LiPPP), lithium oxide (LiOx), or cesium carbonate can be used, for example. In addition, the electron-injection layer may have a stacked-layer structure of two or more layers. For example, it is possible to employ a structure where lithium fluoride is used for a first layer and ytterbium is provided for a second layer as the stacked-layer structure.

Alternatively, the electron-injection layer may be formed using an electron-transport material. For example, a compound having an unshared electron pair and an electron deficient heteroaromatic ring can be used for the electron-transport material. Specifically, a compound having at least one of a pyridine ring, a diazine ring (a pyrimidine ring, a pyrazine ring, and a pyridazine ring), and a triazine ring can be used.

Note that the lowest unoccupied molecular orbital (LUMO) of an organic compound having an unshared electron pair is preferably greater than or equal to −3.6 eV and less than or equal to −2.3 eV. In general, the highest occupied molecular orbital (HOMO) level and the LUMO level of an organic compound can be estimated by CV (cyclic voltammetry), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-a:2′,3′-c]phenazine (abbreviation: HATNA), 2,4,6-tris[3′-(pyridin-3-yl)biphenyl-3-yl]-1,3,5-triazine (abbreviation: TmPPPyTz), or the like can be used for the organic compound having an unshared electron pair. Note that NBPhen has a higher glass transition temperature (Tg) than BPhen and thus has high heat resistance.

The light-receiving element includes at least an active layer that functions as a photoelectric conversion layer between a pair of electrodes. In this specification and the like, one of the pair of electrodes may be referred to as a pixel electrode and the other may be referred to as a common electrode.

One of the pair of electrodes of the light-receiving element functions as an anode, and the other electrode functions as a cathode. The case where the pixel electrode functions as an anode and the common electrode functions as a cathode is described below as an example. When the light-receiving element is driven by application of reverse bias between the pixel electrode and the common electrode, light entering the light-receiving element can be detected and charge can be generated and extracted as current.

Alternatively, the pixel electrode may function as a cathode and the common electrode may function as an anode.

The active layer included in the light-receiving element includes a semiconductor. Examples of the semiconductor include an inorganic semiconductor such as silicon and an organic semiconductor including an organic compound. This embodiment shows an example in which an organic semiconductor is used as the semiconductor included in the active layer. The use of an organic semiconductor is preferable because the light-emitting layer and the active layer can be formed by the same method (e.g., a vacuum evaporation method) and thus the same manufacturing apparatus can be used.

Examples of an n-type semiconductor material contained in the active layer include electron-accepting organic semiconductor materials such as fullerene (e.g., $C_{60}$ and $C_{70}$) and fullerene derivatives. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugation (resonance) spreads on a plane as in benzene, an electron-donating property (donor property) usually increases; however, fullerene has a spherical shape, and thus has a high electron-accepting property although π-electron conjugation widely spreads therein. The high electron-accepting property efficiently causes rapid charge separation and is useful for a light-receiving element. Both $C_{60}$ and $C_{70}$ have a wide absorption band in the visible light region, and $C_{70}$ is especially preferable because of having a larger π-electron conjugation system and a wider absorption band in the long wavelength region than $C_{60}$. Other examples of fullerene derivatives include [6,6]-Phenyl-$C_{71}$-butyric acid methyl ester (abbreviation: PC70BM), [6,6]-Phenyl-C61-butyric acid methyl ester (abbreviation: PC60BM), and 1',1'',4',4'''-Tetrahydro-di[1,4]methanonaphthaleno[1,2:2',3',56,60:2'',3''][5,6]fullerene-$C_{60}$ (abbreviation: ICBA).

Another example of an n-type semiconductor material is a perylenetetracarboxylic derivative such as N,N'-dimethyl-3,4,9,10-perylenetetracarboxylic diimide (abbreviation: Me-PTCDI).

Another example of an n-type semiconductor material is 2,2'-(5,5'-(thieno[3,2-b]thiophene-2,5-diyl)bis(thiophene-5,2-diyl)) bis(methan-1-yl-1-ylidene)dimalononitrile (abbreviation: FT2TDMN).

Other examples of an n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer include electron-donating organic semiconductor materials such as copper (II) phthalocyanine (CuPc), tetraphenyldibenzoperiflanthene (DBP), zinc phthalocyanine (ZnPc), tin phthalocyanine (SnPc), quinacridone, and rubrene.

Examples of a p-type semiconductor material include a carbazole derivative, a thiophene derivative, a furan derivative, and a compound having an aromatic amine skeleton. Furthermore, other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a rubrene derivative, a tetracene derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can increase a carrier-transport property.

For example, the active layer is preferably formed by co-evaporation of an n-type semiconductor and a p-type semiconductor. Alternatively, the active layer may be formed by stacking an n-type semiconductor and a p-type semiconductor.

In addition to the active layer, the light-receiving element may further include a layer containing any of a substance having a high hole-transport property, a substance having a high electron-transport property, a substance having a bipolar property (a substance having a high electron-transport property and a high hole-transport property), and the like. Without limitation to the above, the light-receiving element may further include a layer containing any of a substance having a high hole-injection property, a hole-blocking material, a material having a high electron-injection property, an electron-blocking material, and the like.

Either a low molecular compound or a high molecular compound can be used for the light-receiving element, and an inorganic compound may be contained. Each of the layers included in the light-receiving element can be formed by an evaporation method (including a vacuum evaporation method), a transfer method, a printing method, an inkjet method, a coating method, or the like.

As the hole-transport material or the electron-blocking material, a high molecular compound such as poly(3,4-ethylenedioxythiophene)/(polystyrenesulfonic acid) (abbreviation: PEDOT/PSS), or an inorganic compound such as molybdenum oxide or copper iodide (CuI) can be used, for example. As the electron-transport material or the hole-blocking material, an inorganic compound such as zinc oxide (ZnO), or an organic compound such as polyethylenimine ethoxylate (PEIE) can be used. The light-receiving element may include a mixed film of PEIE and ZnO, for example.

For the active layer, a high molecular compound such as Poly[[4,8-bis[5-(2-ethylhexyl)-2-thienyl]benzo[1,2-b:4,5-b']dithiophene-2,6-diyl]-2,5-thiophenediyl[5,7-bis(2-ethylhexyl)-4,8-dioxo-4H,8H-benzo[1,2-c:4,5-c']dithiophene-1,3-diyl]] polymer (abbreviation: PBDB-T) or a PBDB-T derivative, which functions as a donor, can be used. For example, a method in which an acceptor material is dispersed to PBDB-T or a PBDB-T derivative can be used.

The active layer may contain a mixture of three or more kinds of materials. For example, a third material may be mixed with an n-type semiconductor material and a p-type semiconductor material in order to extend the wavelength range. In this case, the third material may be a low molecular compound or a high molecular compound.

At least part of the structure examples, the drawings corresponding thereto, and the like described in this embodiment as an example can be combined with the other structure examples, the other drawings, and the like as appropriate.

Embodiment 3

In this embodiment, a cross-sectional structure example of the display apparatus 10 (the display apparatus 10A or the display apparatus 10B) of one embodiment of the present invention will be described.

Figure 27:
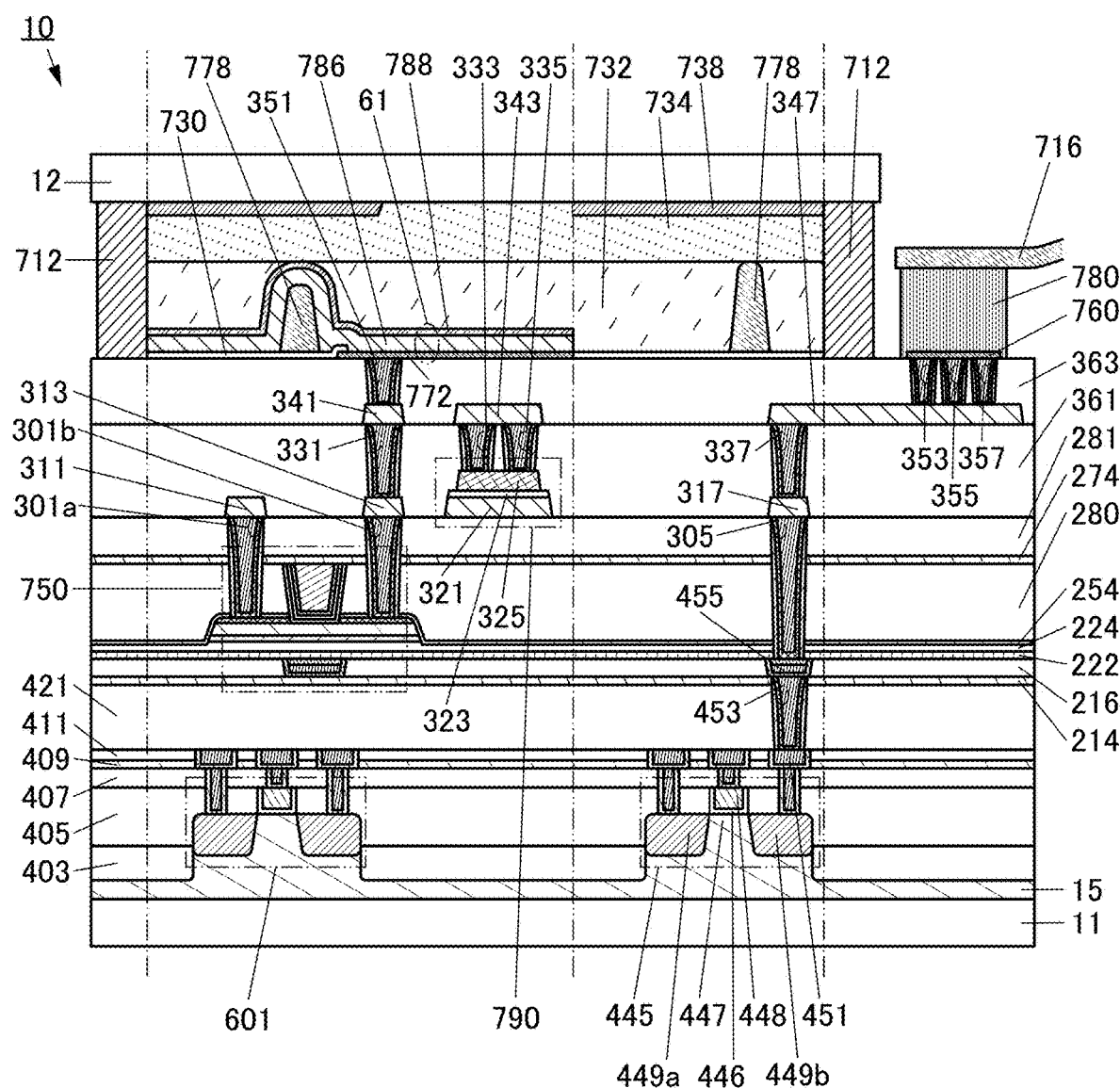
FIG. 27 is a diagram illustrating a structure example of a display apparatus.

FIG. 27 is a cross-sectional view illustrating a structure example of the display apparatus 10. The display apparatus 10 includes the substrate 11 and the substrate 12, and the substrate 11 and the substrate 12 are bonded to each other with a sealant 712.

As the substrate 11, for example, a substrate such as a glass substrate or a single crystal silicon substrate can be used.

A semiconductor substrate 15 is provided over the substrate 11, and provided with a transistor 445 and a transistor 601. The transistor 445 and the transistor 601 can each be the transistor 21 provided in the layer 20 described in Embodiment 1.

The transistor 445 is formed of a conductor 448 having a function of a gate electrode, an insulator 446 having a function of a gate insulator, and part of the substrate 11 and includes a semiconductor region 447 including a channel formation region, a low-resistance region 449a having a function of one of a source region and a drain region, and a low-resistance region 449b having a function of the other of the source region and the drain region. The transistor 445 can be a p-channel transistor or an n-channel transistor.

The transistor 445 is electrically isolated from other transistors by an element isolation layer 403. FIG. 27 illustrates the case where the transistor 445 and the transistor 601 are electrically isolated from each other by the element isolation layer 403. The element isolation layer 403 can be formed by a LOCOS (LOCal Oxidation of Silicon) method, an STI (Shallow Trench Isolation) method, or the like.

Here, in the transistor 445 illustrated in FIG. 27, the semiconductor region 447 has a projecting shape. Moreover, the conductor 448 is provided to cover the side surface and the top surface of the semiconductor region 447 with the insulator 446 therebetween. Note that FIG. 27 does not illustrate the state where the conductor 448 covers the side surface of the semiconductor region 447. A material for adjusting a work function can be used for the conductor 448.

A transistor having a projecting semiconductor region, like the transistor 445, can be referred to as a fin-type transistor because a projecting portion of a semiconductor substrate is used. An insulator having a function of a mask for forming a projecting portion may be provided in contact with the top surface of the projecting portion. Although FIG. 27 illustrates the structure in which the projecting portion is formed by processing part of the substrate 11, a semiconductor having a projecting shape may be formed by processing an SOI substrate.

Note that the structure of the transistor 445 illustrated in FIG. 27 is only an example; the structure of the transistor 445 is not limited thereto and can be changed as appropriate in accordance with the circuit structure, an operation method of the circuit, or the like. For example, the transistor 445 may be a planar transistor.

The transistor 601 can have a structure similar to that of the transistor 445.

An insulator 405, an insulator 407, an insulator 409, and an insulator 411 are provided over the substrate 11, in addition to the element isolation layer 403, the transistor 445, and the transistor 601. A conductor 451 is embedded in the insulator 405, the insulator 407, the insulator 409, and the insulator 411. Here, the top surface of the conductor 451 and the top surface of the insulator 411 can be substantially level with each other.

An insulator 421 and an insulator 214 are provided over the conductor 451 and the insulator 411. A conductor 453 is embedded in the insulator 421 and the insulator 214. Here, the top surface of the conductor 453 and the top surface of the insulator 214 can be substantially level with each other.

An insulator 216 is provided over the conductor 453 and the insulator 214. A conductor 455 is embedded in the insulator 216. Here, the top surface of the conductor 455 and the top surface of the insulator 216 can be substantially level with each other.

An insulator 222, an insulator 224, an insulator 254, an insulator 280, an insulator 274, and an insulator 281 are provided over the conductor 455 and the insulator 216. A conductor 305 is embedded in the insulator 222, the insulator 224, the insulator 254, the insulator 280, the insulator 274, and the insulator 281. Here, the top surface of the conductor 305 and the top surface of the insulator 281 can be substantially level with each other.

An insulator 361 is provided over the conductor 305 and the insulator 281. A conductor 317 and a conductor 337 are embedded in the insulator 361. Here, the top surface of the conductor 337 and the top surface of the insulator 361 can be substantially level with each other.

The insulator 363 is provided over the conductor 337 and the insulator 361. A conductor 347, a conductor 353, a conductor 355, and a conductor 357 are embedded in the insulator 363. Here, the top surfaces of the conductor 353, the conductor 355, and the conductor 357 and the top surface of the insulator 363 can be substantially level with each other.

A connection electrode 760 is provided over the conductor 353, the conductor 355, the conductor 357, and the insulator 363. In addition, an anisotropic conductor 780 is provided to be electrically connected to the connection electrode 760, and an FPC (Flexible Printed Circuit) 716 is provided to be electrically connected to the anisotropic conductor 780. A variety of signals and the like are supplied to the display apparatus 10 from the outside of the display apparatus 10 through the FPC 716.

As illustrated in FIG. 27, the low-resistance region 449b having a function of the other of the source region and the drain region of the transistor 445 is electrically connected to the FPC 716 through the conductor 451, the conductor 453, the conductor 455, the conductor 305, the conductor 317, the conductor 337, the conductor 347, the conductor 353, the conductor 355, the conductor 357, the connection electrode 760, and the anisotropic conductor 780. Although FIG. 27 illustrates three conductors of the conductor 353, the conductor 355, and the conductor 357 as conductors that have a function of electrically connecting the connection electrode 760 and the conductor 347, one embodiment of the present invention is not limited thereto. The number of conductors having a function of electrically connecting the connection electrode 760 and the conductor 347 may be one, two, or four or more. Providing a plurality of conductors having a function of electrically connecting the connection electrode 760 and the conductor 347 can reduce the contact resistance.

A transistor 750 is provided over the insulator 214. The transistor 750 can be the transistor 52 provided in the layer 50 described in Embodiment 1. For example, the transistor 750 can be the transistor provided in the pixel circuit 51. An OS transistor can be suitably used as the transistor 750. The OS transistor has a feature of an extremely low off-state current. Consequently, the retention time for image data or the like can be increased, so that the frequency of the refresh operation can be reduced. For example, the frame frequency or the refresh rate of the case where a still image is displayed can be less than or equal to 1 Hz, preferably less than or equal to 0.1 Hz. Thus, power consumption of the display apparatus 10 can be reduced.

A conductor 301a and a conductor 301b are embedded in the insulator 254, the insulator 280, the insulator 274, and the insulator 281. The conductor 301a is electrically connected to one of a source and a drain of the transistor 750, and the conductor 301b is electrically connected to the other of the source and the drain of the transistor 750. Here, the top surfaces of the conductor 301a and the conductor 301b and the top surface of the insulator 281 can be substantially level with each other.

A conductor 311, a conductor 313, a conductor 331, a capacitor 790, a conductor 333, and a conductor 335 are embedded in the insulator 361. The conductor 311 and the conductor 313 are electrically connected to the transistor 750 and have a function of a wiring. The conductor 333 and the conductor 335 are electrically connected to the capacitor 790. Here, the top surfaces of the conductor 331, the conductor 333, and the conductor 335 and the top surface of the insulator 361 can be substantially level with each other.

A conductor 341, a conductor 343, and a conductor 351 are embedded in the insulator 363. Here, the top surface of the conductor 351 and the top surface of the insulator 363 can be substantially level with each other.

The insulator 405, the insulator 407, the insulator 409, the insulator 411, the insulator 421, the insulator 214, the insulator 280, the insulator 274, the insulator 281, the insulator 361, and the insulator 363 have a function of an interlayer film and may also have a function of a planarization film that covers unevenness thereunder. For example, the top surface of the insulator 363 may be planarized by planarization treatment using a chemical mechanical polishing (CMP) method or the like to have increased planarity.

As illustrated in FIG. 27, the capacitor 790 includes a lower electrode 321 and an upper electrode 325. An insulator 323 is provided between the lower electrode 321 and the upper electrode 325. That is, the capacitor 790 has a stacked-layer structure in which the insulator 323 functioning as a dielectric is held between the pair of electrodes. Although FIG. 27 illustrates an example in which the capacitor 790 is provided over the insulator 281, the capacitor 790 may be provided over an insulator different from the insulator 281.

In the example illustrated in FIG. 27, the conductor 301a, the conductor 301b, and the conductor 305 are formed in the same layer. An example where the conductor 311, the conductor 313, the conductor 317, and the lower electrode 321 are formed in the same layer is illustrated. An example where the conductor 331, the conductor 333, the conductor 335, and the conductor 337 are formed in the same layer is illustrated. An example where the conductor 341, the conductor 343, and the conductor 347 are formed in the same layer is illustrated. An example where the conductor 351, the conductor 353, the conductor 355, and the conductor 357 are formed in the same layer is illustrated. Forming a plurality of conductors in the same layer simplifies the manufacturing process of the display apparatus 10 and thus the manufacturing cost of the display apparatus 10 can be reduced. Note that these conductors may be formed in different layers or may contain different types of materials.

The display apparatus 10 illustrated in FIG. 27 includes the light-emitting element 61. The light-emitting element 61 includes a conductor 772, an EL layer 786, and a conductor 788. The EL layer 786 contains an organic compound or an inorganic compound such as quantum dots.

Examples of materials that can be used as an organic compound include a fluorescent material and a phosphorescent material. Examples of materials that can be used as quantum dots include a colloidal quantum dot material, an alloyed quantum dot material, a core-shell quantum dot material, and a core quantum dot material.

The conductor 772 is electrically connected to the other of the source and the drain of the transistor 750 through the conductor 351, the conductor 341, the conductor 331, the conductor 313, and the conductor 301b. The conductor 772 is formed over the insulator 363 and has a function of a pixel electrode.

A material having a visible-light-transmitting property or a material having a visible-light-reflecting property can be used for the conductor 772. As a light-transmitting material, for example, an oxide material containing indium, zinc, tin, or the like is preferably used. As a reflective material, for example, a material containing aluminum, silver, or the like is preferably used.

Although not illustrated in FIG. 27, an optical member (optical substrate) such as a polarizing member, a retardation member, or an anti-reflection member can be provided in the display apparatus 10, for example.

On the substrate 12 side, a light-blocking layer 738 and an insulator 734 that is in contact with the light-blocking layer 738 are provided. The light-blocking layer 738 has a function of blocking light emitted from adjacent regions. Alternatively, the light-blocking layer 738 has a function of preventing external light from reaching the transistor 750 or the like.

In the display apparatus 10 illustrated in FIG. 27, an insulator 730 is provided over the insulator 363. Here, the insulator 730 can cover part of the conductor 772. Here, the light-emitting element 61 is a top-emission light-emitting element, which includes the conductor 788 having a light-transmitting property.

The light-blocking layer 738 is provided to include a region overlapping with the insulator 730. The light-blocking layer 738 is covered with the insulator 734. A space between the light-emitting element 61 and the insulator 734 is filled with a sealing layer 732.

A component 778 is provided between the insulator 730 and the EL layer 786. Moreover, the component 778 is provided between the insulator 730 and the insulator 734.

Figure 28:
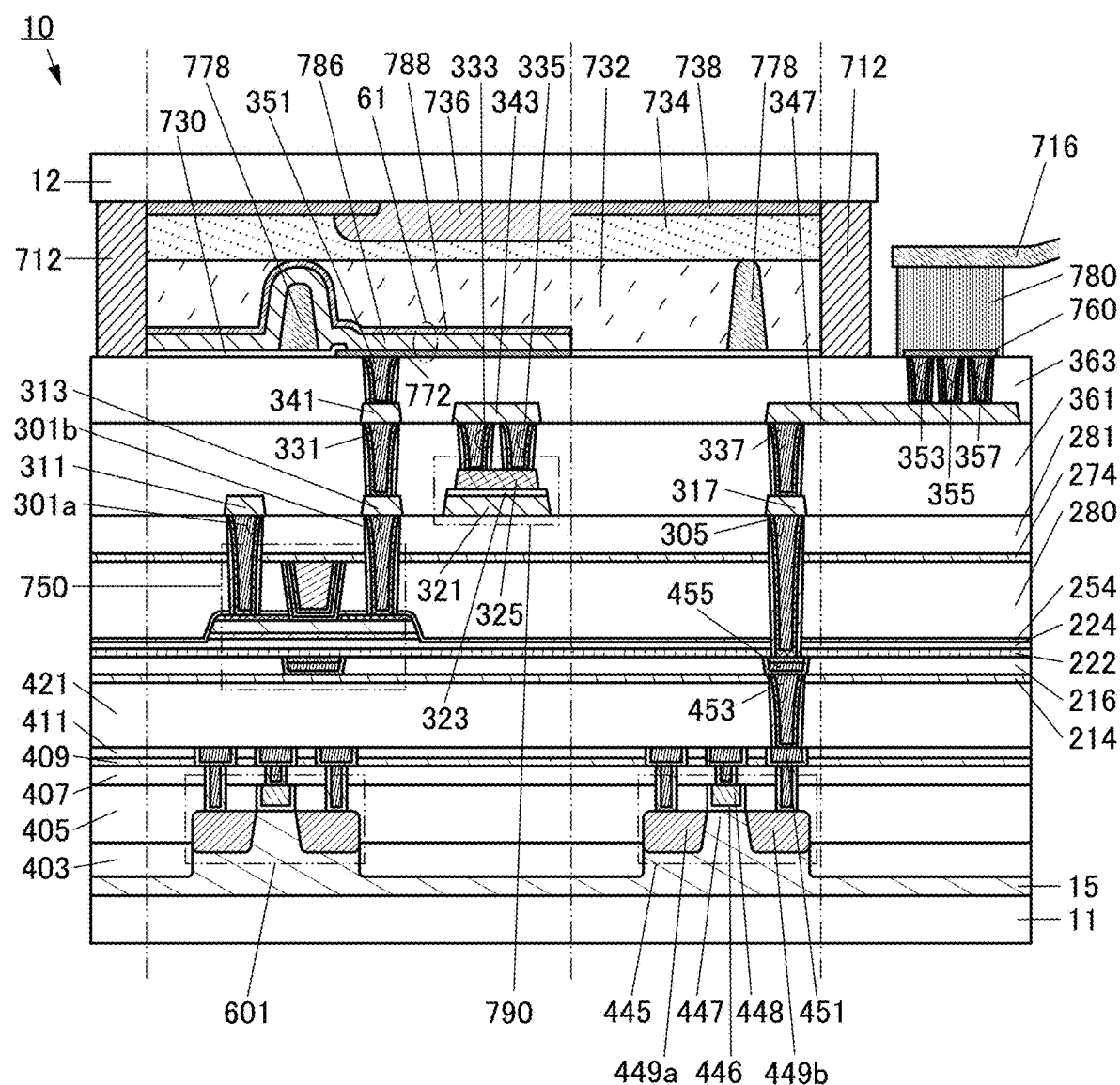
FIG. 28 is a diagram illustrating a structure example of a display apparatus.

FIG. 28 illustrates a variation example of the display apparatus 10 illustrated in FIG. 27. The display apparatus 10 illustrated in FIG. 28 is different from the display apparatus 10 illustrated in FIG. 27 in that a coloring layer 736 is provided. Note that the coloring layer 736 is provided to have a region overlapping with the light-emitting element 61. Providing the coloring layer 736 can improve the color purity of light extracted from the light-emitting element 61.

Thus, the display apparatus 10 can display high-quality images. Furthermore, all the light-emitting elements 61, for example, in the display apparatus 10 can be light-emitting elements that emit white light; hence, the EL layers 786 are not necessarily formed separately for each color, leading to higher resolution of the display apparatus 10.

The light-emitting element 61 can have a micro-optical resonator (microcavity) structure. Thus, light of predetermined colors (e.g., RGB) can be extracted without a coloring layer, and the display apparatus 10 can perform color display. The structure without a coloring layer can prevent light absorption by the coloring layer. As a result, the display apparatus 10 can display high-luminance images, and power consumption of the display apparatus 10 can be reduced. Note that a structure without a coloring layer can be employed even when the EL layer 786 is formed into an island shape for each pixel or formed into a stripe shape for each pixel column, i.e., the EL layers 786 are formed by separate coloring. Note that the luminance of the display apparatus 10 can be, for example, higher than or equal to 500 $cd/m^2$, preferably higher than or equal to 1000 $cd/m^2$ and lower than or equal to 10000 $cd/m^2$, further preferably higher than or equal to 2000 $cd/m^2$ and lower than or equal to 5000 $cd/m^2$.

At least part of the structure examples, the drawings corresponding thereto, and the like described in this embodiment as an example can be combined with the other structure examples, the other drawings, and the like as appropriate.

Embodiment 4

In this embodiment, a cross-sectional structure example of the display apparatus 10 that is different from that in Embodiment 2 will be described.

Figure 29A:
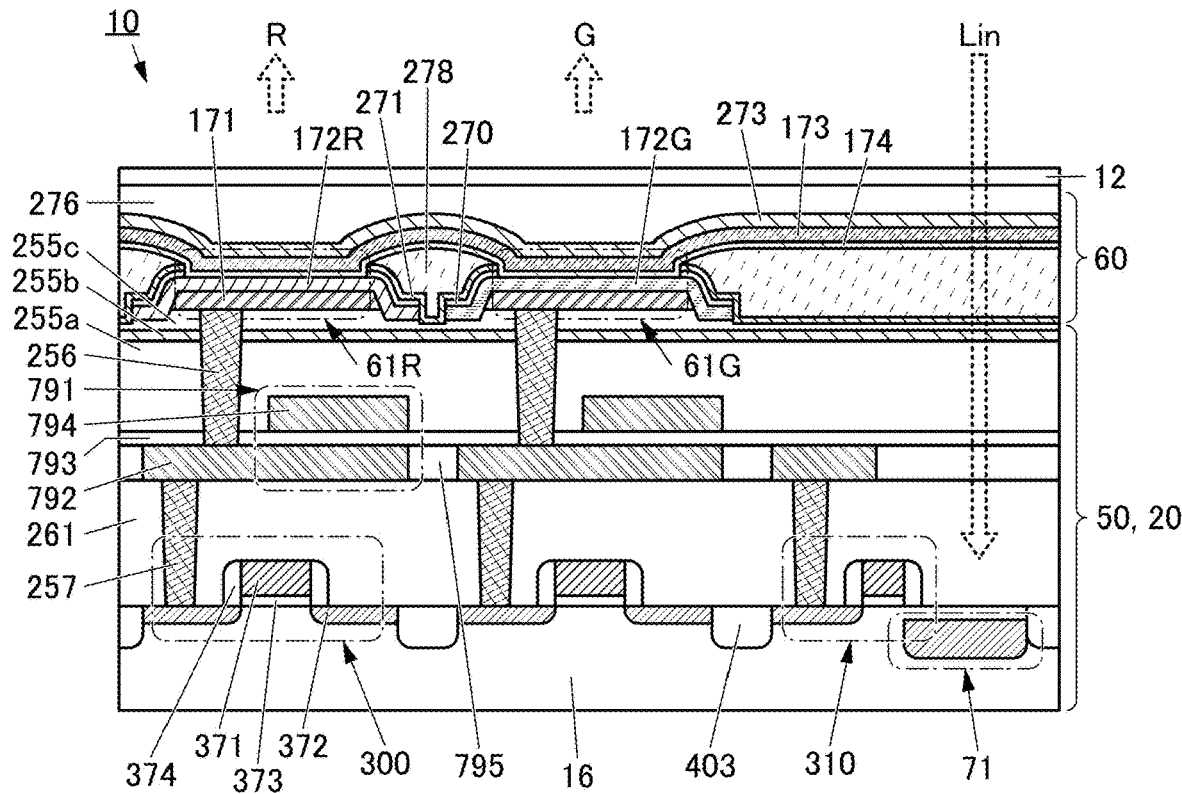
FIG. 29A and FIG. 29B are diagrams illustrating structure examples of a display apparatus.

FIG. 29A illustrates a cross-sectional structure example of the display apparatus 10. The display apparatus 10 illustrated in FIG. 29A includes a substrate 16, the light-emitting element 61R, the light-emitting element 61G, the light-receiving element 71, a transistor 300, and a transistor 310.

The light-emitting element 61R has a function of exhibiting red light (R). The light-emitting element 61G has a function of exhibiting green light. The transistor 300 and the transistor 310 include a channel formation region in the substrate 16. As the substrate 16, a semiconductor substrate such as a single crystal silicon substrate can be used, for example. The transistor 310 includes part of the substrate 16, a conductor 371, a low-resistance region 372, an insulator 373, and an insulator 374. The conductor 371 functions as a gate electrode. The insulator 373 is positioned between the substrate 16 and the conductor 371 and functions as a gate insulator. The low-resistance region 372 is a region where the substrate 16 is doped with an impurity, and functions as a source or a drain. The insulator 374 is provided to cover the side surface of the conductor 371 and functions as an insulator.

The transistor 300, for example, corresponds to the transistor 52B described in the above embodiment. The transistor 310, for example, corresponds to the transistor 132 described in the above embodiment.

The element isolation layer 403 is provided between two adjacent transistors 300 to be embedded in the substrate 16.

An insulator 261 is provided to cover the transistor 310, and a capacitor 791 is provided over the insulator 261.

The capacitor 791 includes a conductor 792, a conductor 794, and an insulator 793 positioned therebetween. The conductor 792 functions as one electrode of the capacitor 791, the conductor 794 functions as the other electrode of the capacitor 791, and the insulator 793 functions as a dielectric of the capacitor 791.

The conductor 792 is provided over the insulator 261 and is embedded in a conductor 795. The conductor 792 is electrically connected to one of a source and a drain of the transistor 300 through a plug 257 embedded in the insulator 261. The insulator 793 is provided to cover the conductor 792. The conductor 792 has a region overlapping with the conductor 794 with the insulator 793 provided therebetween.

An insulator 255a is provided to cover the capacitor 791, an insulator 255b is provided over the insulator 255a, and an insulator 255c is provided over the insulator 255b. The light-emitting element 61R and the light-emitting element 61G are provided over the insulator 255c. An insulator is provided in a region between adjacent light-emitting devices and a region between a light-emitting device and a light-receiving device adjacent to each other. In FIG. 29A and the like, the protective layer 271 and the insulator 278 over the protective layer 271 are provided in the region.

The insulator 270 is provided over each of the EL layer 172R included in the light-emitting element 61R and the EL layer 172G included in the light-emitting element 61G. The common layer 174 is provided over the EL layer 172R, the EL layer 172G, and the insulator 278, and the conductor 173 is provided over the common layer 174. The protective layer 273 is provided over the conductor 173.

The conductor 171 is electrically connected to one of a source and a drain of the transistor 310 through a plug 256 embedded in the insulator 793, the insulator 255a, the insulator 255b, and the insulator 255c, the conductor 792 embedded in the conductor 795, and the plug 257 embedded in the insulator 261. The level of the top surface of the insulator 255c is equal to or substantially equal to the level of the top surface of the plug 256. A variety of conductive materials can be used for the plugs.

The insulator 276 is provided over the light-emitting element 61R, the light-emitting element 61G, and the light-receiving element 71. The components from the conductor 171 to the insulator 276 corresponds to the layer 60. The substrate 12 is provided over the insulator 276. The insulator 276 functions as an adhesive layer. A stacked-layer structure from the substrate 16 to the insulator 255c corresponds to the layer 50 of the display apparatus 10A and the display apparatus 10B.

In the structure example illustrated in FIG. 29A, a light-emitting element is formed in the layer 60, and a light-receiving element is formed in the layer 50 or the layer 20.

The light-receiving element 71 has a function of detecting the light Lin entering from the outside of the display apparatus through the insulator 276, the insulator 255a, the insulator 261, and the like.

Figure 29B:
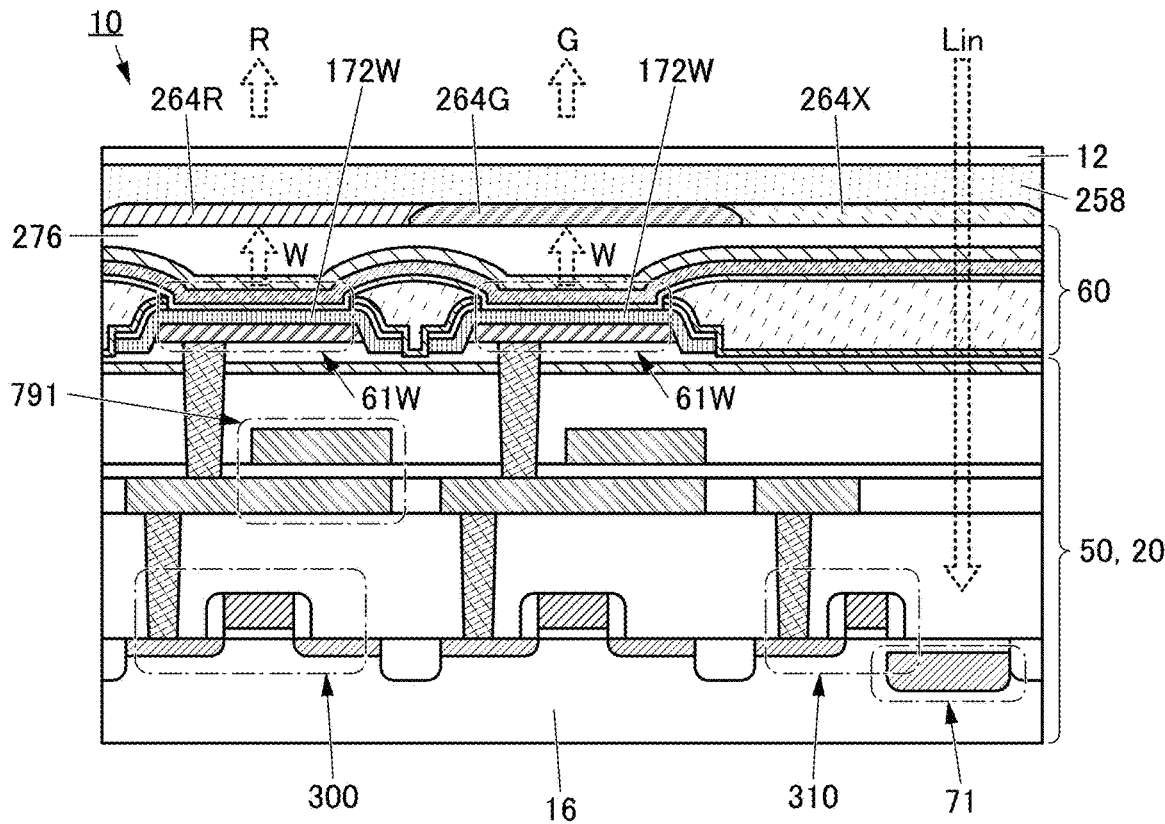

FIG. 29B illustrates a cross-sectional structure example that is different from the cross-sectional structure example of the display apparatus 10 illustrated in FIG. 29A. FIG. 29B is a variation example of FIG. 29A. The display apparatus 10 illustrated in FIG. 29B is provided with the light-emitting elements 61W instead of the light-emitting element 61R and the light-emitting element 61G and includes coloring layers in a region overlapping with the light-emitting elements 61W over the insulator 276. FIG. 29B illustrates a cross-sectional structure example of the display apparatus 10 including the coloring layer 264R overlapping with one light-emitting element 61W and the coloring layer 264G overlapping with another light-emitting element 61W.

The light-emitting element 61W has a function of exhibiting white light. The coloring layer 264R has a function of transmitting red light, and the coloring layer 264G has a function of transmitting green light. White light (W) emitted from the light-emitting element 61W is emitted as red light to the outside of the display apparatus through the coloring layer 264R. Furthermore, white light (W) emitted from the light-emitting element 61W is emitted as green light to the outside of the display apparatus through the coloring layer 264G. Although not illustrated in FIG. 29B, a coloring layer that transmits light in a wavelength range other than red light and green light, such as blue light, may be used.

A coloring layer 264X may be provided in a region overlapping with the light-receiving element 71 over the insulator 276. As the coloring layer 264X, a coloring layer that transmits light in a given wavelength range can be provided. By providing the coloring layer 264X, the light-receiving element 71 can detect only the coloring layer 264X and light passing therethrough.

The display apparatus 10 illustrated in FIG. 29B includes an insulator 258 over the coloring layer 264R, the coloring layer 264G, and the coloring layer 264X, and includes the substrate 12 over the insulator 258. The insulator 258 functions as an adhesive layer.

Figure 30A:
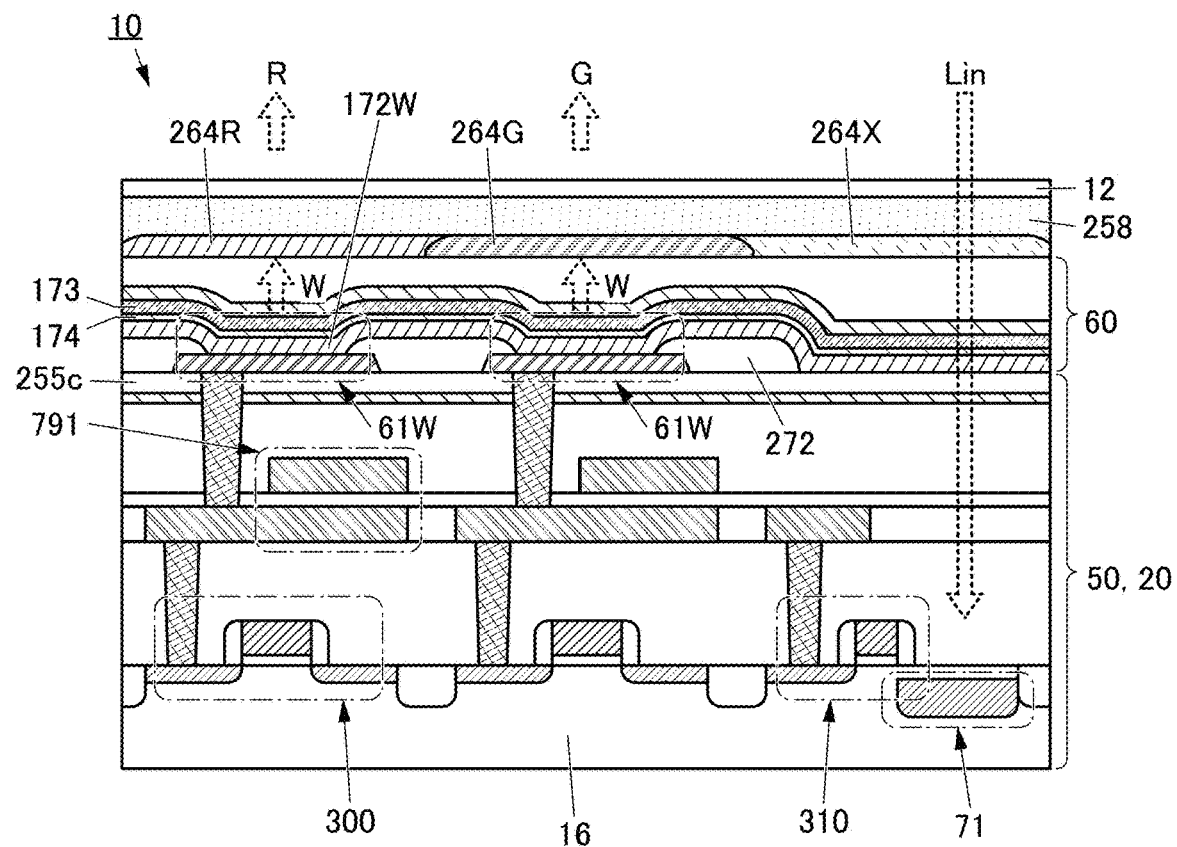
FIG. 30A and FIG. 30B are diagrams illustrating structure examples of a display apparatus.

FIG. 30A illustrates a variation example of the display apparatus 10 illustrated in FIG. 29B. The display apparatus 10 illustrated in FIG. 30A has a structure in which the EL layer 172W is employed to be shared by adjacent light-emitting elements 61W. Furthermore, the EL layer 172W remains also in a region overlapping with the light-receiving element 71. When the EL layer 172W has a thickness that allows transmission of the light Lin, the light Lin can be detected even when the EL layer 172W remains in the region overlapping with the light-receiving element 71.

Figure 30B:
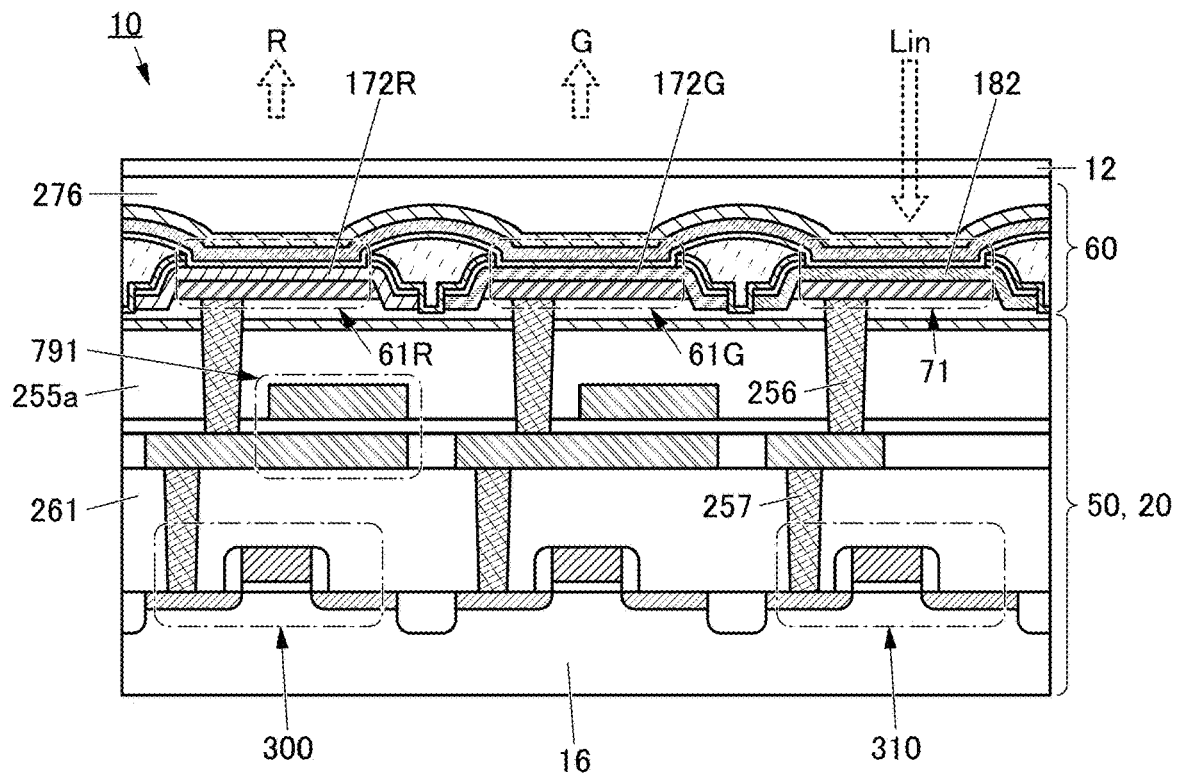

FIG. 30B illustrates a variation example of the display apparatus 10 illustrated in FIG. 29A. As described in the above embodiment, the light-receiving element 71 can be obtained by replacing the EL layer 172 of the light-emitting element 61 with the active layer 182 functioning as a photoelectric conversion layer.

In the display apparatus 10 illustrated in FIG. 30B, the light-emitting element 61 and the light-receiving element 71 are provided in the layer 60. The light-receiving element 71 provided in the layer 60 is electrically connected to the one of the source and the drain of the transistor 310 through the plug 256 and the plug 257.

Figure 31A:
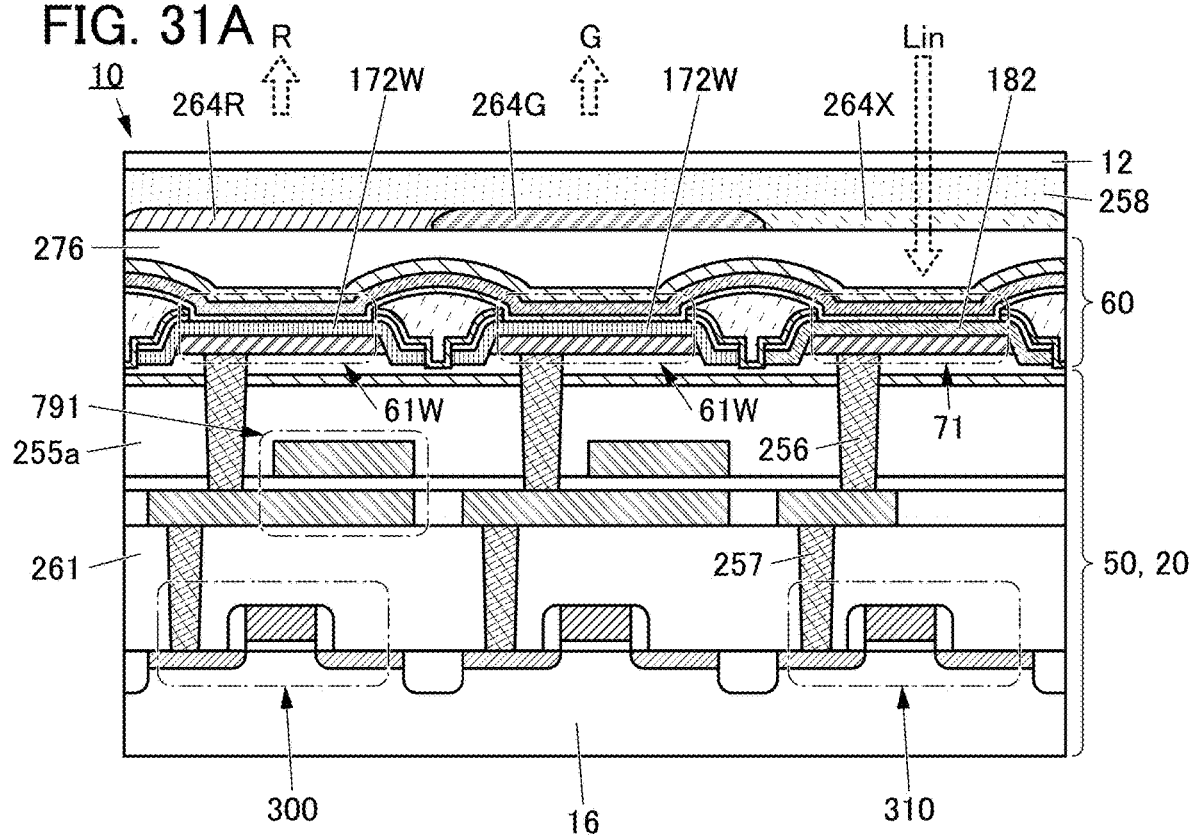
FIG. 31A and FIG. 31B are diagrams illustrating structure examples of a display apparatus.

As illustrated in FIG. 31A, the coloring layer 264R and the coloring layer 264G may be provided to overlap with the light-emitting element 61W, and the coloring layer 264X may be provided to overlap with the light-receiving element 71.

Figure 31B:
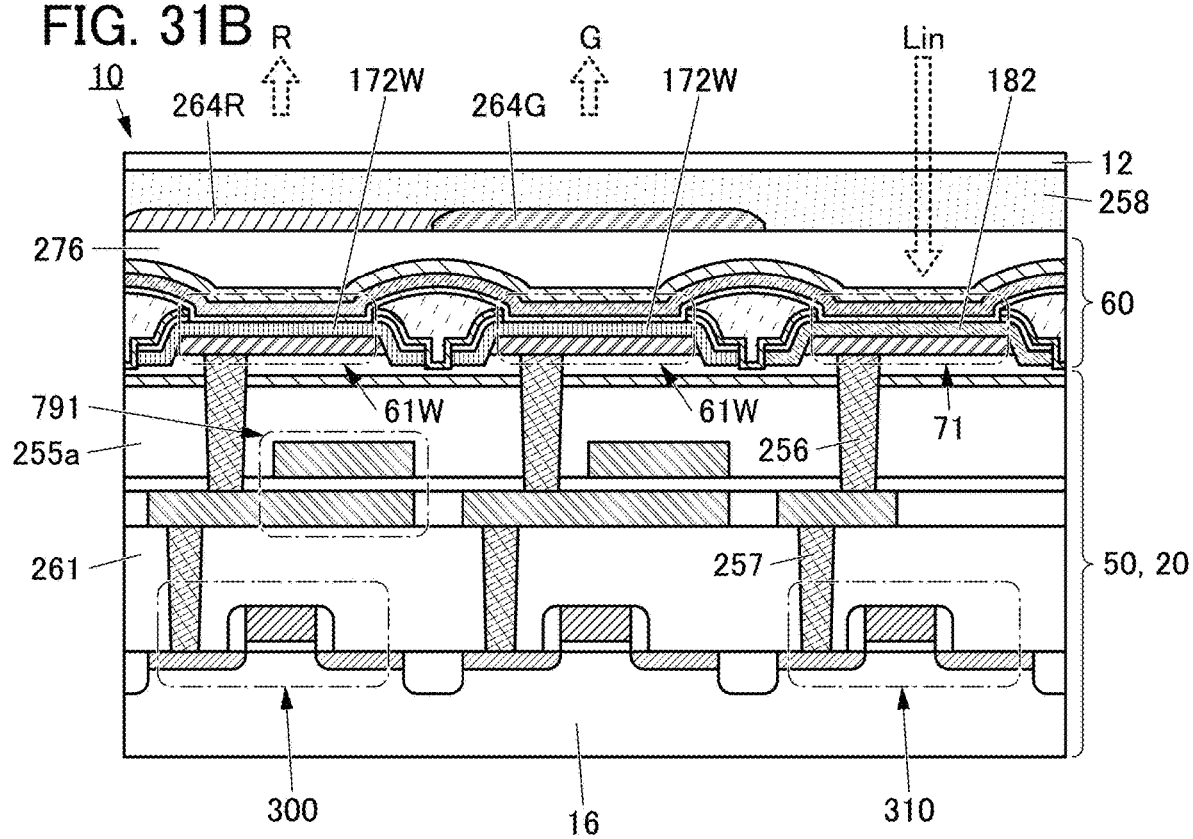

Alternatively, as illustrated in FIG. 31B, a structure in which the coloring layer 264R and the coloring layer 264G are provided to overlap with the light-emitting element 61W and a coloring layer is not provided over the light-receiving element 71 may be employed.

Figure 32:
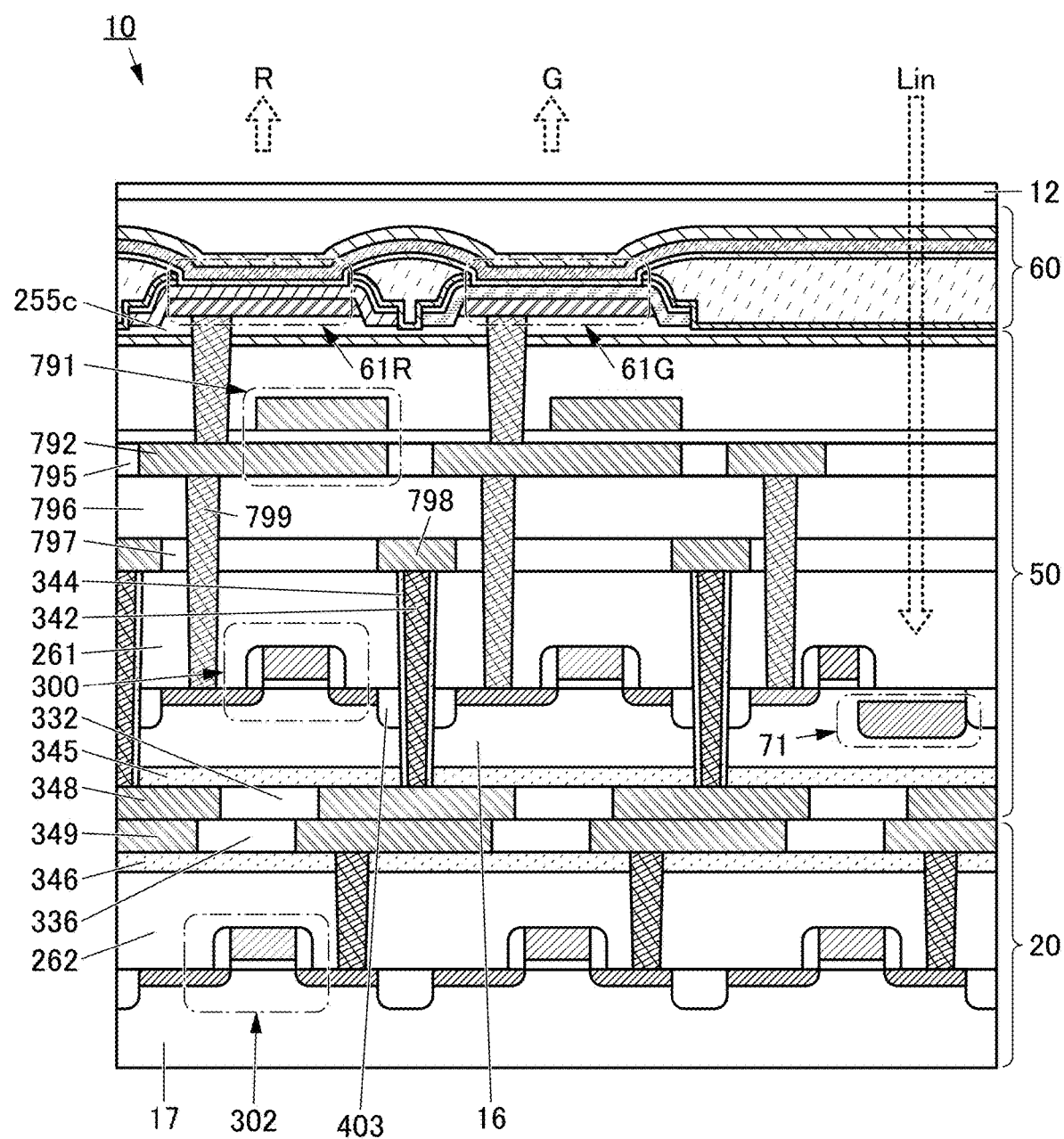
FIG. 32 is a diagram illustrating a structure example of a display apparatus.

FIG. 32 illustrates a variation example of the display apparatus 10 illustrated in FIG. 29A. The display apparatus 10 illustrated in FIG. 32 has a structure in which the transistor 300 and a transistor 302 are stacked. In the transistor 300, a channel is formed in the substrate 16. In the transistor 302, a channel is formed in a substrate 17. Semiconductor substrates are used as both the substrate 16 and the substrate 17.

In the display apparatus 10 illustrated in FIG. 32, the substrate 16 provided with the transistor 300, the capacitor 791, and light-receiving element 71 is bonded to the substrate 17 provided with the transistor 302.

Here, an insulator 345 is preferably provided on the bottom surface of the substrate 16. An insulator 346 is preferably provided over the insulator 262 provided over the substrate 17. The insulator 345 and the insulator 346 are insulators functioning as protective layers and can inhibit diffusion of impurities into the substrate 16 and the substrate 17.

An insulator 796 and an insulator 797 may be provided between the insulator 261 and the conductor 792. A conductor 798 may be provided over the insulator 261. The conductor 798 is preferably provided to be embedded in the insulator 797.

The substrate 16 is provided with a plug 342 that penetrates the substrate 16 and the insulator 345. An insulator 344 is preferably provided to cover the side surface of the plug 342. The insulator 344 functions as a protective layer and can inhibit diffusion of impurities into the substrate 16. In the case where the substrate 16 is a silicon substrate, the plug 342 is also referred to as a through silicon via (TSV).

A conductor 348 is provided under the insulator 345 on the rear surface of the substrate 16 (the surface opposite to the substrate 12). The conductor 348 is preferably provided to be embedded in an insulator 332. The bottom surfaces of the conductor 348 and the insulator 332 are preferably planarized. Here, the conductor 348 is electrically connected to the conductor 798 through the plug 342.

Meanwhile, over the substrate 17, a conductor 349 is provided over the insulator 346. The conductor 349 is preferably provided to be embedded in the insulator 336. The top surfaces of the conductor 349 and the insulator 336 are preferably planarized.

The conductor 348 and the conductor 349 are bonded to each other, whereby the substrate 17 and the substrate 16 are electrically connected to each other. Here, improving the planarity of a plane formed by the conductor 348 and the insulator 332 and a plane formed by the conductor 349 and the insulator 336 allows the conductor 348 and the conductor 349 to be bonded to each other favorably.

For the conductor 348 and the conductor 349, the same conductive material is preferably used. For example, a metal film containing an element selected from Al, Cr, Cu, Ta, Ti, Mo, and W, a metal nitride film containing the above element as a component (a titanium nitride film, a molybdenum nitride film, or a tungsten nitride film), or the like can be used. Copper is particularly preferably used for the conductor 348 and the conductor 349. In that case, it is possible to employ a Cu-to-Cu (copper-to-copper) direct bonding technique (a technique for achieving electrical continuity by connecting Cu (copper) pads).

In the display apparatus 10 illustrated in FIG. 32, a stacked-layer structure from the conductor 348 and the insulator 332 to the insulator 255c corresponds to the layer 50 of the display apparatus 10A and the display apparatus 10B. Furthermore, a stacked-layer structure from the substrate 17 to the conductor 349 and the insulator 336 corresponds to the layer 20 of the display apparatus 10A and the display apparatus 10B.

Figure 33:
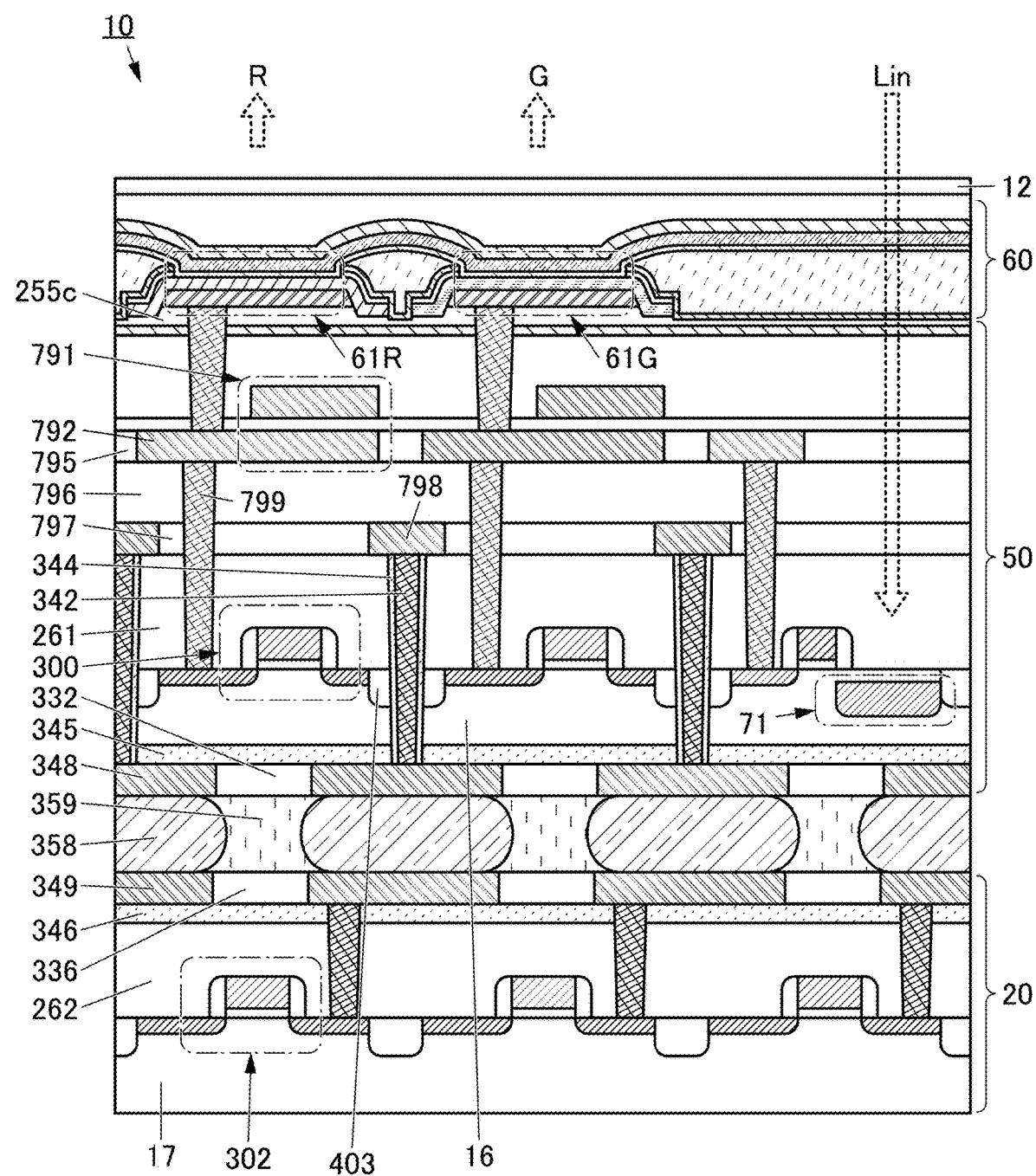
FIG. 33 is a diagram illustrating a structure example of a display apparatus.

As in the display apparatus 10 illustrated in FIG. 33, a bump 358 may be provided between the conductor 348 and the conductor 349, and the conductor 348 and the conductor 349 may be electrically connected to each other through the bump 358. The bump 358 can be formed using a conductive material containing gold (Au), nickel (Ni), indium (In), tin (Sn), or the like, for example. For another example, solder may be used for the bump 358. A bonding layer 359 may be provided between the insulator 332 and the insulator 336. In the case where the bump 358 is provided, the insulator 332 and the insulator 336 are not necessarily provided.

Figure 34:
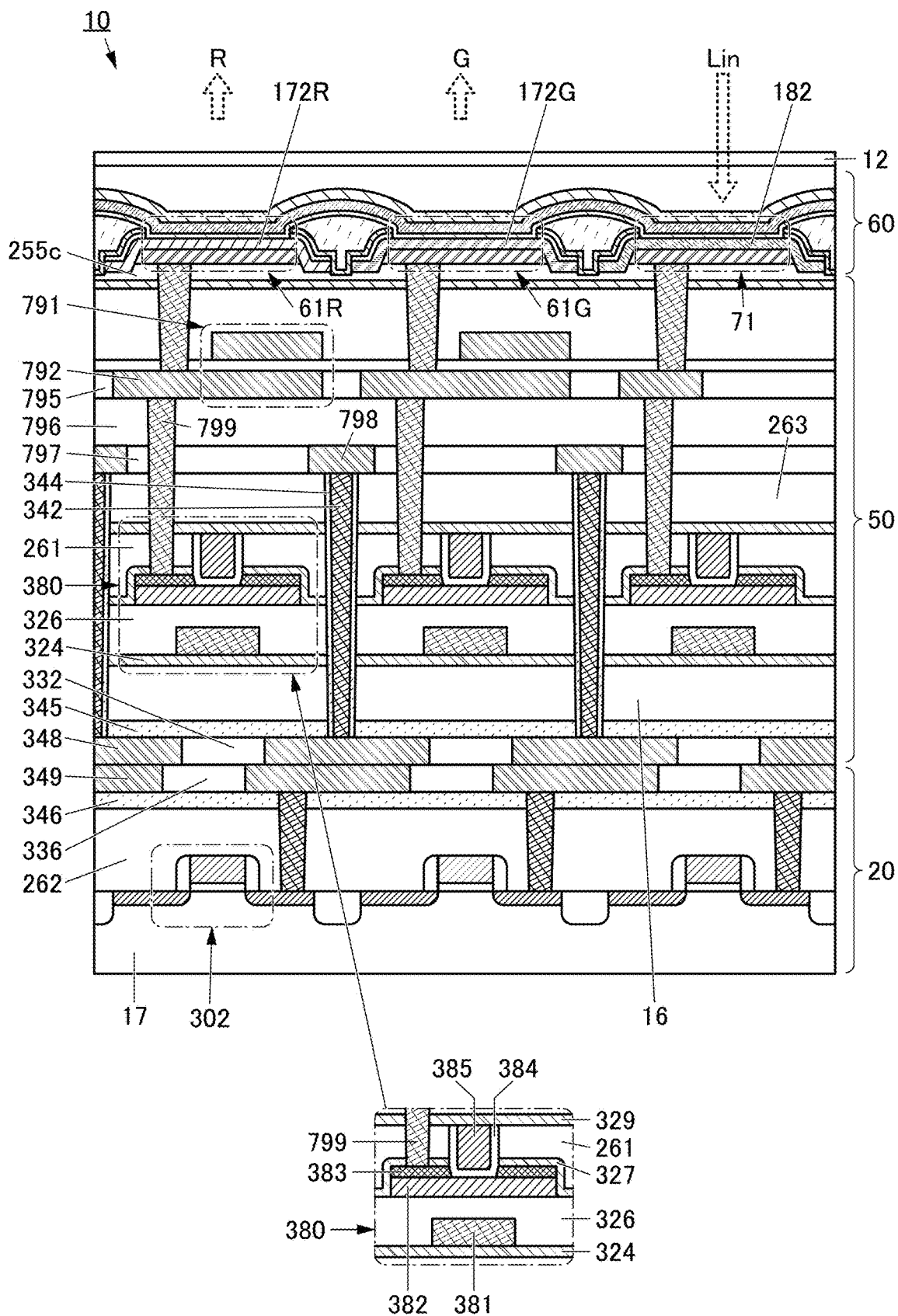
FIG. 34 is a diagram illustrating a structure example of a display apparatus.

FIG. 34 illustrates a variation example of the display apparatus 10 illustrated in FIG. 31. The display apparatus 10 illustrated in FIG. 34 includes a transistor 380 over the substrate 16. Accordingly, the display apparatus 10 illustrated in FIG. 34 has a structure in which the transistor 380 and the transistor 302 are stacked. The transistor 380 is a transistor having a back gate. A semiconductor substrate may be used as the substrate 16, or a substrate of another material may be used.

In FIG. 34, the light-receiving element 71 illustrated in FIG. 30B is used as the light-receiving element 71. Specifically, an organic semiconductor is used for an active layer functioning as a photoelectric conversion layer.

The transistor 380 includes a semiconductor 382, an insulator 384, a conductor 385, a pair of conductors 383, an insulator 326, and a conductor 381. An oxide semiconductor may be used as the semiconductor 382, for example.

In the display apparatus 10 illustrated in FIG. 34, an insulator 324 is provided over the substrate 16. The insulator 324 functions as a barrier layer that prevents diffusion of impurities such as water or hydrogen from the substrate 16 side into the transistor 380 and release of oxygen from the semiconductor 382 to the insulator 324 side. As the insulator 324, for example, a film through which hydrogen or oxygen is less likely to diffuse than in a silicon oxide film, such as an aluminum oxide film, a hafnium oxide film, or a silicon nitride film, can be used.

The conductor 381 is provided over the insulator 324, and the insulator 326 is provided to cover the conductor 381. An oxide insulating film such as a silicon oxide film is preferably used as at least part of the insulator 326 that is in contact with the semiconductor 382. The top surface of the insulator 326 is preferably planarized.

The semiconductor 382 is provided over the insulator 326. The pair of conductors 383 are provided over and in contact with the semiconductor 382 and function as a source electrode and a drain electrode.

An insulator 327 is provided to cover the top and side surfaces of the pair of conductors 383, the side surface of the semiconductor 382, and the like, and the insulator 261 is provided over the insulator 327. The insulator 327 functions as a barrier layer that prevents diffusion of impurities such as water or hydrogen from the insulator 261 and the like into the semiconductor 382 and release of oxygen from the semiconductor 382. As the insulator 327, an insulating film similar to the insulator 324 can be used.

An opening reaching the semiconductor 382 is provided in the insulator 327 and the insulator 261. The insulator 384 in contact with the side surfaces of the insulator 261, the insulator 327, and the conductors 383 and the top surface of the semiconductor 382, and the conductor 385 in contact with the insulator 384 are embedded in the opening.

The conductor 385 functions as a first gate electrode and the insulator 384 functions as a first gate insulator. The conductor 381 functions as a second gate electrode of the transistor 380 and part of the insulator 326 functions as a second gate insulator.

In the case where one of the first gate electrode and the second gate electrode is referred to as a "gate" or a "gate electrode", the other of the first gate electrode and the second gate electrode is referred to as a "back gate" or a "back gate electrode" in some cases.

The top surface of the conductor 385, the top surface of the insulator 384, and the top surface of the insulator 261 are subjected to planarization treatment so that their levels are equal to or substantially equal to each other, and an insulator 329 and an insulator 263 are provided to cover these surfaces.

The insulator 261 and the insulator 263 each function as an interlayer insulator. The insulator 329 functions as a barrier layer that prevents diffusion of impurities such as water or hydrogen from the insulator 263 side into the transistor 380. As the insulator 329, an insulating film similar to the insulator 327 and the insulator 324 can be used.

A plug 799 electrically connected to one of the pair of conductors 383 is provided to be embedded in an opening provided in the insulator 796, the insulator 797, the insulator 263, the insulator 329, the insulator 261, and the insulator 327.

Here, the plug 799 is preferably formed using a conductive material through which hydrogen and oxygen are less to likely to diffuse into a portion in contact with the side surfaces of the opening in the insulator 796, the insulator 797, the insulator 263, the insulator 329, the insulator 261, and the insulator 327 and a portion in contact with part of the conductor 383 in the bottom portion of the opening.

In the display apparatus 10 illustrated in FIG. 34, the plug 342 is provided to penetrate the insulator 263, the insulator 329, the insulator 261, the insulator 327, the insulator 326, the insulator 324, the substrate 16, and the insulator 345. As described above, the insulator 344 is preferably provided to cover the side surface of the plug 342.

Figure 35:
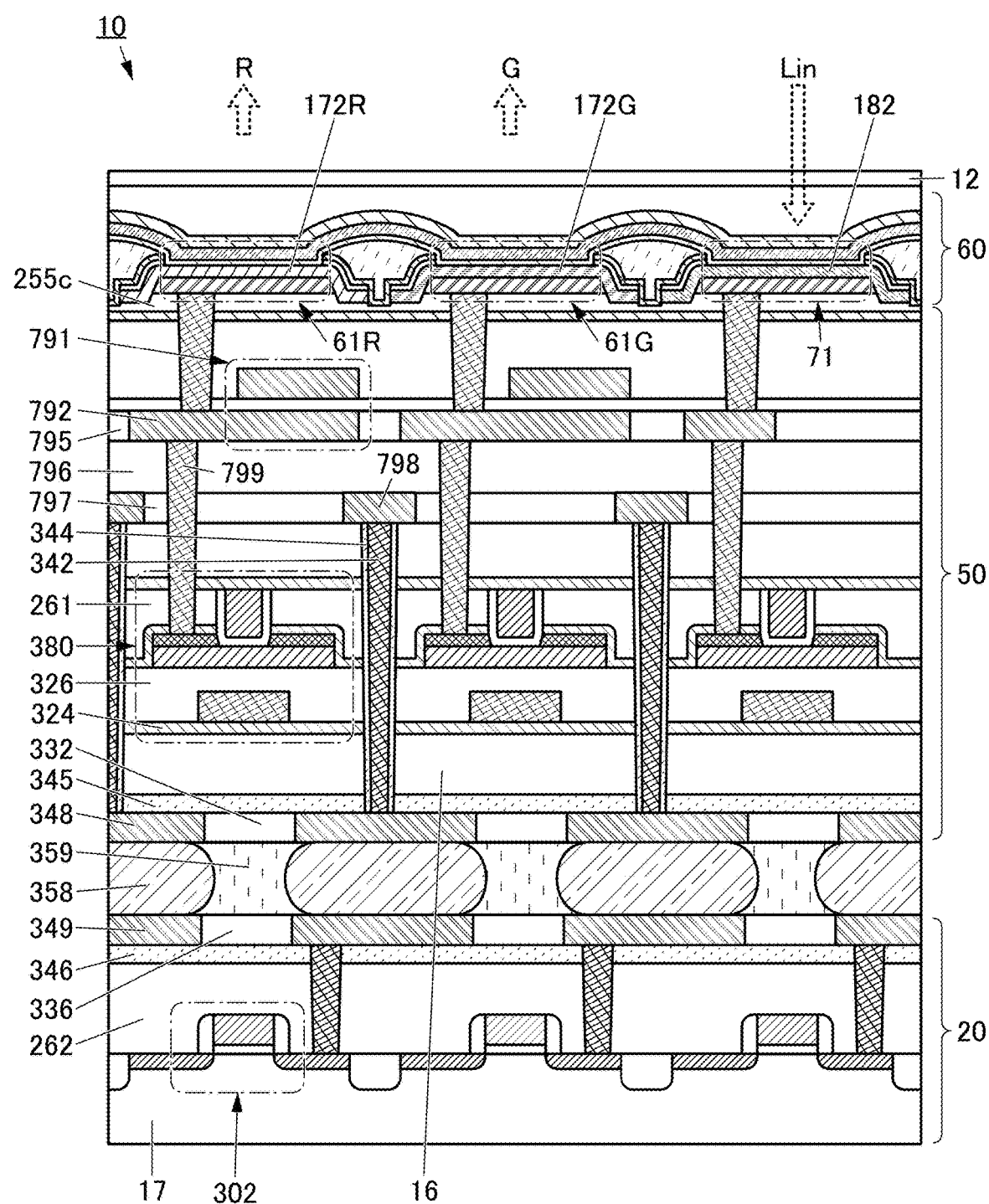
FIG. 35 is a diagram illustrating a structure example of a display apparatus.

As in the display apparatus 10 illustrated in FIG. 35, the bump 358 may be provided between the conductor 348 and the conductor 349, and the conductor 348 and the conductor 349 may be electrically connected to each other through the bump 358. The bonding layer 359 may be provided between the insulator 332 and the insulator 336. The display apparatus 10 illustrated in FIG. 35 is a variation example of the display apparatus 10 illustrated in FIG. 34 but also a variation example of the display apparatus 10 illustrated in FIG. 32.

As illustrated in FIG. 30A, the coloring layer 264X may be provided to overlap with the light-receiving element 71.

At least part of the structure examples, the drawings corresponding thereto, and the like described in this embodiment as an example can be combined with the other structure examples, the other drawings, and the like as appropriate.

Embodiment 5

<Structure Example of OS Transistor>

Figure 36A:
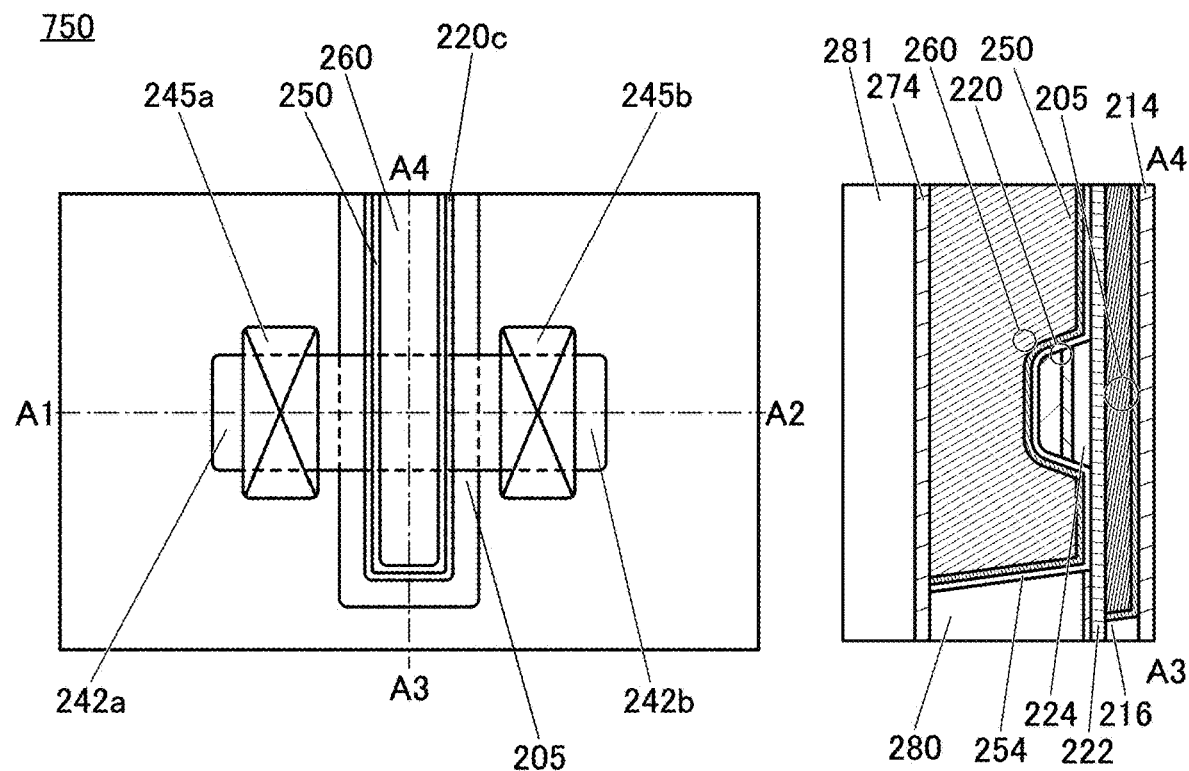
FIG. 36A to FIG. 36C are diagrams illustrating structure examples of a transistor.
Figure 36C:
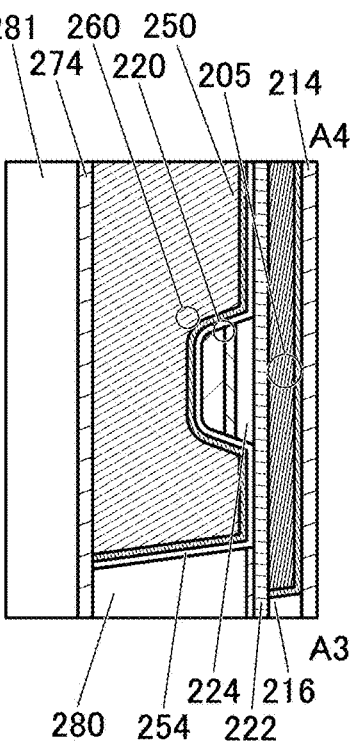
Figure 36B:
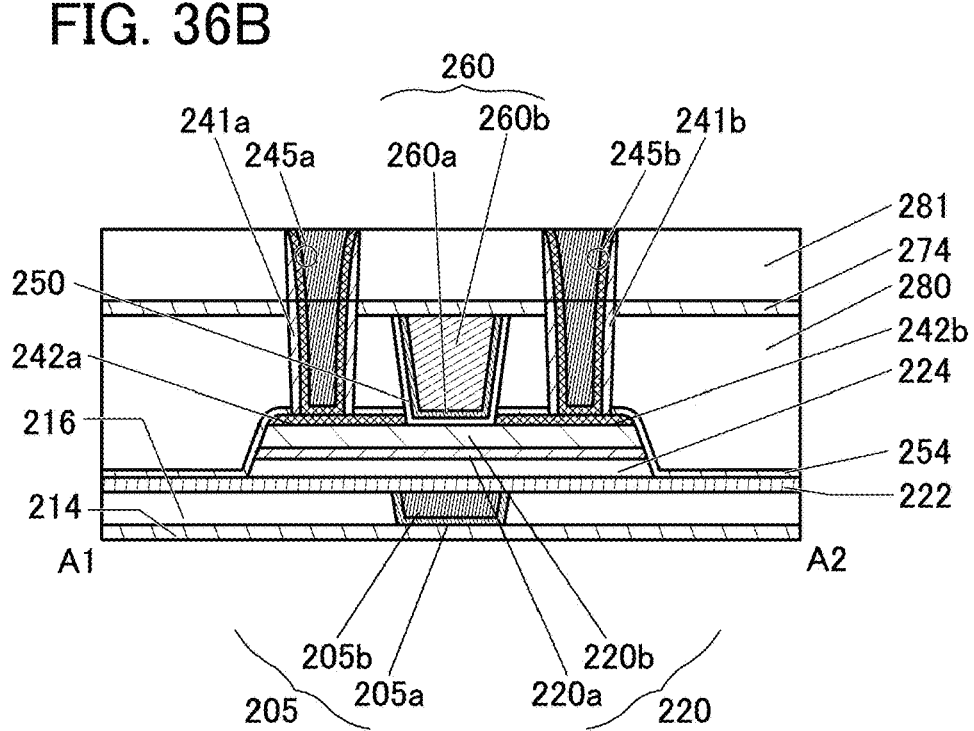

In this embodiment, a structure example of an OS transistor that can be used in the display apparatus of one embodiment of the present invention will be described. FIG. 36A, FIG. 36B, and FIG. 36C are a top view and cross-sectional views of the transistor 750 that can be used in the display apparatus of one embodiment of the present invention, and the periphery of the transistor 750. The transistor 750 can also be used as the transistor 380 or the like.

FIG. 36A is the top view of the transistor 750. FIG. 36B and FIG. 36C are the cross-sectional views of the transistor 750. FIG. 36B is a cross-sectional view taken along the dashed-dotted line A1-A2 in FIG. 36A, which corresponds to a cross-sectional view of the transistor 750 in the channel length direction. FIG. 36C is a cross-sectional view taken along the dashed-dotted line A3-A4 in FIG. 36A, which corresponds to a cross-sectional view of the transistor 750 in the channel width direction. Note that for simplification of the drawing, some components are not illustrated in the top view in FIG. 36A.

As illustrated in FIG. 36, the transistor 750 includes a metal oxide 220a placed over a substrate (not illustrated); a metal oxide 220b placed over the metal oxide 220a; a conductor 242a and a conductor 242b that are placed apart from each other over the metal oxide 220b; an insulator 280 that is placed over the conductor 242a and the conductor 242b and has an opening between the conductor 242a and the conductor 242b; a conductor 260 placed in the opening; and an insulator 250 placed between the conductor 260 and the metal oxide 220b, the conductor 242a, the conductor 242b, and the insulator 280. Here, as illustrated in FIG. 36B and FIG. 36C, preferably, the top surface of the conductor 260 is substantially level with the top surfaces of the insulator 250 and the insulator 280. Hereinafter, the metal oxide 220a and the metal oxide 220b are collectively referred to as a metal oxide 220, in some cases. The conductor 242a and the conductor 242b may be collectively referred to as a conductor 242.

In the transistor 750 illustrated in FIG. 36, side surfaces of the conductor 242a and the conductor 242b on the conductor 260 side are substantially perpendicular. Note that the transistor 750 illustrated in FIG. 36 is not limited thereto, and the angle formed between the side surfaces and the bottom surfaces of the conductor 242a and the conductor 242b may be greater than or equal to 10° and less than or equal to 80°, preferably greater than or equal to 30° and less than or equal to 60°. The side surfaces of the conductor 242a and the conductor 242b that face each other may have a plurality of surfaces.

As illustrated in FIG. 36, the insulator 254 is preferably provided between the insulator 280 and the insulator 222, the insulator 224, the metal oxide 220a, the metal oxide 220b, the conductor 242a, the conductor 242b, and the insulator 250. Here, as illustrated in FIG. 36B and FIG. 36C, the insulator 254 is preferably in contact with the side surface of the insulator 250, the top surface and the side surface of the conductor 242a, the top surface and the side surface of the conductor 242b, side surfaces of the metal oxide 220a, the metal oxide 220b, and the insulator 222, and the top surface of the insulator 222.

In the transistor 750, three layers of the metal oxide 220a, the metal oxide 220b, and a metal oxide 220c are stacked in and around the region where the channel is formed (hereinafter also referred to as a channel formation region); however, the present invention is not limited thereto. For example, a two-layer structure of the metal oxide 220b and the metal oxide 220c or a stacked-layer structure of four or more layers may be employed. Alternatively, each of the metal oxide 220a, the metal oxide 220b, and the metal oxide 220c may have a stacked-layer structure of two or more layers.

Here, the conductor 260 functions as a gate electrode of the transistor and the conductor 242a and the conductor 242b function as a source electrode and a drain electrode. As described above, the conductor 260 is formed to be embedded in the opening of the insulator 280 and the region sandwiched between the conductor 242a and the conductor 242b. Here, the positions of the conductor 260, the conductor 242a, and the conductor 242b with respect to the opening of the insulator 280 are selected in a self-aligned manner. That is, in the transistor 750, the gate electrode can be placed between the source electrode and the drain electrode in a self-aligned manner. Thus, the conductor 260 can be formed without an alignment margin, resulting in a reduction in the area occupied by the transistor 750. Accordingly, the display apparatus can have a high resolution. In addition, the bezel of the display apparatus can be narrowed.

As illustrated in FIG. 36, the conductor 260 preferably includes a conductor 260a provided on the inner side of the insulator 250 and a conductor 260b provided to be embedded on the inner side of the conductor 260a. Although the conductor 260 has a stacked-layer structure of two layers in the transistor 750, the present invention is not limited thereto. For example, the conductor 260 may have a single-layer structure or a stacked-layer structure of three or more layers.

The transistor 750 preferably includes the insulator 214 placed over the substrate (not illustrated); the insulator 216 placed over the insulator 214; a conductor 205 placed to be embedded in the insulator 216; the insulator 222 placed over the insulator 216 and the conductor 205; and the insulator 224 placed over the insulator 222. The metal oxide 220a is preferably placed over the insulator 224.

The insulator 274 and the insulator 281 functioning as interlayer films are preferably placed over the transistor 750. Here, the insulator 274 is preferably placed in contact with the top surfaces of the conductor 260, the insulator 250, and the insulator 280.

The insulator 222, the insulator 254, and the insulator 274 preferably have a function of inhibiting diffusion of hydrogen (e.g., at least one of a hydrogen atom and a hydrogen molecule). For example, the insulator 222, the insulator 254, and the insulator 274 preferably have lower hydrogen permeability than the insulator 224, the insulator 250, and the insulator 280. Moreover, the insulator 222 and the insulator 254 preferably have a function of inhibiting diffusion of oxygen (e.g., at least one of an oxygen atom and an oxygen molecule). For example, the insulator 222 and the insulator 254 preferably have lower oxygen permeability than the insulator 224, the insulator 250, and the insulator 280.

A conductor 245 (a conductor 245a and a conductor 245b) that is electrically connected to the transistor 750 and functions as a plug is preferably provided. Note that an insulator 241 (an insulator 241a and an insulator 241b) is provided in contact with the side surface of the conductor 245 functioning as a plug. In other words, the insulator 241 is provided in contact with the inner wall of an opening in the insulator 254, the insulator 280, the insulator 274, and the insulator 281. A structure may be employed in which a first conductor of the conductor 245 is provided in contact with the side surface of the insulator 241 and a second conductor of the conductor 245 is provided on the inner side of the first conductor. Here, the top surface of the conductor 245 and the top surface of the insulator 281 can be substantially level with each other. Although the first conductor of the conductor 245 and the second conductor of the conductor 245 are stacked in the transistor 750, the present invention is not limited thereto. For example, the conductor 245 may have a single-layer structure or a stacked-layer structure of three or more layers. In the case where a component has a stacked-layer structure, layers may be distinguished by ordinal numbers corresponding to the formation order.

In the transistor 750, a metal oxide functioning as an oxide semiconductor (hereinafter also referred to as an oxide semiconductor) is preferably used as the metal oxide 220 including the channel formation region (the metal oxide 220a and the metal oxide 220b). For example, it is preferable to use a metal oxide having a band gap of 2 eV or more, preferably 2.5 eV or more as the metal oxide to be the channel formation region of the metal oxide 220.

The metal oxide preferably contains at least indium (In) or zinc (Zn). In particular, the metal oxide preferably contains indium (In) and zinc (Zn). In addition to them, the element M is preferably contained. As the element M, one or more of aluminum (Al), gallium (Ga), yttrium (Y), tin (Sn), boron (B), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), magnesium (Mg), and cobalt (Co) can be used. In particular, the element M is preferably one or more of aluminum (Al), gallium (Ga), yttrium (Y), and tin (Sn). Furthermore, the element M preferably contains one or both of Ga and Sn.

The metal oxide 220b may have a smaller thickness in a region not overlapping with the conductor 242 than in a region overlapping with the conductor 242. The thin region is formed when part of the top surface of the metal oxide 220b is removed at the time of forming the conductor 242a and the conductor 242b. When a conductive film to be the conductor 242 is formed, a low-resistance region is sometimes formed on the top surface of the metal oxide 220b in the vicinity of the interface with the conductive film. Removing the low-resistance region positioned between the conductor 242a and the conductor 242b on the top surface of the metal oxide 220b in this manner can prevent formation of the channel in the region.

According to one embodiment of the present invention, a display apparatus that includes small-size transistors and has a high resolution can be provided. A display apparatus that includes a transistor with a high on-state current and has high luminance can be provided. A display apparatus that includes a transistor operating at high speed and thus operates at high speed can be provided. A display apparatus that includes a transistor having stable electrical characteristics and is highly reliable can be provided. A display apparatus that includes a transistor with a low off-state current and has low power consumption can be provided.

The structure of the transistor 750 that can be used in the display apparatus of one embodiment of the present invention is described in detail.

The conductor 205 is placed to include a region overlapping with the metal oxide 220 and the conductor 260. Furthermore, the conductor 205 is preferably provided to be embedded in the insulator 216.

The conductor 205 includes a conductor 205a and a conductor 205b. The conductor 205a is provided in contact with the bottom surface and the side wall of the opening provided in the insulator 216. The conductor 205b is provided to be embedded in a depressed portion formed in the conductor 205a. Here, the top surface of the conductor 205b is substantially level with the top surface of the conductor 205a and the top surface of the insulator 216.

The conductor 205a is preferably formed using a conductive material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, the conductor 205a is preferably formed using a conductive material having a function of inhibiting diffusion of oxygen (e.g., at least one of an oxygen atom, an oxygen molecule, and the like).

When the conductor 205a is formed using a conductive material having a function of inhibiting diffusion of hydrogen, impurities such as hydrogen contained in the conductor 205b can be inhibited from diffusing into the metal oxide 220 through the insulator 224 and the like. When the conductor 205a is formed using a conductive material having a function of inhibiting diffusion of oxygen, the conductivity of the conductor 205b can be inhibited from being lowered because of oxidation. As the conductive material having a function of inhibiting diffusion of oxygen, for example, titanium, titanium nitride, tantalum, tantalum nitride, ruthenium, or ruthenium oxide is preferably used. Thus, the conductor 205a may be a single layer or a stacked layer of the above conductive materials. For example, titanium nitride may be used for the conductor 205a.

A conductive material containing tungsten, copper, or aluminum as its main component is preferably used for the conductor 205b. For example, tungsten may be used for the conductor 205b.

Here, the conductor 260 sometimes functions as a first gate (also referred to as a top gate) electrode. The conductor 205 sometimes functions as a second gate (also referred to as a bottom gate) electrode. In that case, by changing a potential applied to the conductor 205 independently of a potential applied to the conductor 260, $V_{th}$ of the transistor 750 can be controlled. In particular, by applying a negative potential to the conductor 205, $V_{th}$ of the transistor 750 can be higher and the off-state current can be reduced. Thus, a drain current at the time when a potential applied to the conductor 260 is 0 V can be lower in the case where a negative potential is applied to the conductor 205 than in the case where the negative potential is not applied to the conductor 205.

The conductor 205 is preferably provided to be larger than the channel formation region in the metal oxide 220. In particular, it is preferable that the conductor 205 extend beyond an end portion of the metal oxide 220 that intersects with the channel width direction, as illustrated in FIG. 36C. In other words, the conductor 205 and the conductor 260 preferably overlap with each other with the insulator positioned therebetween, in a region on the outer side of the side surface of the metal oxide 220 in the channel width direction.

With the above structure, the channel formation region in the metal oxide 220 can be electrically surrounded by an electric field of the conductor 260 having a function of the first gate electrode and an electric field of the conductor 205 having a function of the second gate electrode.

As illustrated in FIG. 36C, the conductor 205 extends to function as a wiring as well. However, without limitation to this structure, a structure in which a conductor functioning as a wiring is provided below the conductor 205 may be employed.

The insulator 214 preferably functions as a barrier insulating film that inhibits entry of an impurity such as water or hydrogen to the transistor 750 from the substrate side. Accordingly, it is preferable to use, for the insulator 214, an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom (an insulating material through which the above impurities are less likely to pass). Alternatively, it is preferable to use an insulating material having a function of inhibiting diffusion of oxygen (e.g., at least one of an oxygen atom, an oxygen molecule, and the like) (an insulating material through which the oxygen is less likely to pass).

For example, aluminum oxide or silicon nitride is preferably used for the insulator 214. Accordingly, it is possible to inhibit diffusion of an impurity such as water or hydrogen to the transistor 750 side from the substrate side through the insulator 214. Alternatively, it is possible to inhibit diffusion of oxygen contained in the insulator 224 and the like to the substrate side of the insulator 214.

The permittivity of each of the insulator 216, the insulator 280, and the insulator 281 functioning as an interlayer film is preferably lower than that of the insulator 214. When a material with a low permittivity is used for an interlayer film, the parasitic capacitance generated between wirings can be reduced. For example, for the insulator 216, the insulator 280, and the insulator 281, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like may be used as appropriate.

The insulator 222 and the insulator 224 each have a function of a gate insulator.

Here, the insulator 224 in contact with the metal oxide 220 preferably releases oxygen by heating. In this specification, oxygen that is released by heating is referred to as excess oxygen in some cases. For example, silicon oxide, silicon oxynitride, or the like can be used as appropriate for the insulator 224. When an insulator containing oxygen is provided in contact with the metal oxide 220, oxygen vacancies in the metal oxide 220 can be reduced, leading to improved reliability of the transistor 750.

Specifically, an oxide material that releases part of oxygen by heating is preferably used for the insulator 224. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably in the range of 100° C. to 700° C. or 100° C. to 400° C.

Like the insulator 214 or the like, the insulator 222 preferably functions as a barrier insulating film that inhibits entry of an impurity such as water or hydrogen into the transistor 750 from the substrate side. For example, the insulator 222 preferably has lower hydrogen permeability than the insulator 224. When the insulator 224, the metal oxide 220, the insulator 250, and the like are surrounded by the insulator 222, the insulator 254, and the insulator 274, entry of an impurity such as water or hydrogen into the transistor 750 from the outside can be inhibited.

Furthermore, it is preferable that the insulator 222 have a function of inhibiting diffusion of oxygen (e.g., at least one of an oxygen atom, an oxygen molecule, and the like) (it is preferable that the above oxygen be less likely to pass through the insulator 222). For example, the insulator 222 preferably has lower oxygen permeability than the insulator 224. The insulator 222 preferably has a function of inhibiting diffusion of oxygen and impurities in which case oxygen contained in the metal oxide 220 can be inhibited from diffusing to the substrate side. Moreover, the conductor 205 can be inhibited from reacting with oxygen contained in the insulator 224 or the metal oxide 220.

As the insulator 222, an insulator containing an oxide of one or both of aluminum and hafnium, which is an insulating material, is preferably used. As the insulator containing an oxide of one or both of aluminum and hafnium, aluminum oxide, hafnium oxide, an oxide containing aluminum and hafnium (hafnium aluminate), or the like is preferably used. In the case where the insulator 222 is formed using such a material, the insulator 222 functions as a layer inhibiting release of oxygen from the metal oxide 220 and entry of impurities such as hydrogen into the metal oxide 220 from the periphery of the transistor 750.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the above insulator. For example, a three-layer structure in which silicon nitride, silicon oxide, and aluminum oxide are stacked in this order can be used for the insulator 222.

The insulator 222 may be a single layer or a stacked layer formed using an insulator containing what is called a high-k material, such as aluminum oxide, hafnium oxide, tantalum oxide, zirconium oxide, lead zirconate titanate (PZT), strontium titanate (SrTiO$_3$), or (Ba,Sr)TiO$_3$ (BST). As miniaturization and high integration of transistors progress, a problem such as a leakage current may arise because of a thinner gate insulator. When a high-k material is used for the insulator functioning as a gate insulator, a gate potential at the time of operation of the transistor can be reduced while the physical thickness is maintained.

Note that the insulator 222 and the insulator 224 may each have a stacked-layer structure of two or more layers. In that case, without limitation to a stacked-layer structure formed of the same material, a stacked-layer structure formed of different materials may be employed. For example, an insulator similar to the insulator 224 may be provided below the insulator 222. The metal oxide 220 includes the metal oxide 220a and the metal oxide 220b over the metal oxide 220a. When the metal oxide 220 includes the metal oxide 220a under the metal oxide 220b, it is possible to inhibit diffusion of impurities into the metal oxide 220b from the components formed below the metal oxide 220a.

Note that the metal oxide 220 preferably has a stacked-layer structure of a plurality of oxide layers that differ in the atomic ratio of metal atoms. For example, in the case where the metal oxide 220 contains at least indium (In) and the element M, the proportion of the number of atoms of the element M contained in the metal oxide 220a to the number of atoms of all elements that constitute the metal oxide 220a is preferably higher than the proportion of the number of atoms of the element M contained in the metal oxide 220b to the number of atoms of all elements that constitute the metal oxide 220b. In addition, the atomic ratio of the element M to In in the metal oxide 220a is preferably higher than the atomic ratio of the element M to In in the metal oxide 220b.

The energy of the conduction band minimum of the metal oxide 220a is preferably higher than the energy of the conduction band minimum of the metal oxide 220b. In other words, the electron affinity of the metal oxide 220a is preferably smaller than the electron affinity of the metal oxide 220b.

Here, the energy level of the conduction band minimum changes gradually at a junction portion between the metal oxide 220a and the metal oxide 220b. In other words, the energy level of the conduction band minimum at the junction portion between the metal oxide 220a and the metal oxide 220b continuously changes or is continuously connected. This can be achieved by decrease in the density of defect states in a mixed layer formed at the interface between the metal oxide 220a and the metal oxide 220b.

Specifically, when the metal oxide 220a and the metal oxide 220b contain the same element (as a main component) in addition to oxygen, a mixed layer with a low density of defect states can be formed. For example, in the case where the metal oxide 220b is In—Ga—Zn oxide, In—Ga—Zn oxide, Ga—Zn oxide, gallium oxide, or the like may be used as the metal oxide 220a.

specifically, as the metal oxide 220a, a metal oxide having a composition of In:Ga:Zn=1:3:4 [atomic ratio] or a composition in the vicinity thereof, or 1:1:0.5 [atomic ratio] or a composition in the vicinity thereof may be used. As the metal oxide 220b, a metal oxide having a composition of In:Ga:Zn=4:2:3 [atomic ratio] or a composition in the vicinity thereof, or 3:1:2 [atomic ratio] or a composition in the vicinity thereof may be used.

At this time, the metal oxide 220b serves as a main carrier path. When the metal oxide 220a has the above structure, the density of defect states at the interface between the metal oxide 220a and the metal oxide 220b can be made low. This reduces the influence of interface scattering on carrier conduction, and the transistor 750 can have a high on-state current and high frequency characteristics.

The conductor 242 (the conductor 242a and the conductor 242b) functioning as the source electrode and the drain electrode is provided over the metal oxide 220b. For the conductor 242, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements as its component; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even when absorbing oxygen.

When the conductor 242 is provided in contact with the metal oxide 220, the oxygen concentration of the metal oxide 220 in the vicinity of the conductor 242 sometimes decreases. In addition, a metal compound layer that contains the metal contained in the conductor 242 and the component of the metal oxide 220 is sometimes formed in the metal oxide 220 in the vicinity of the conductor 242. In such a case, the carrier density of the region in the metal oxide 220 in the vicinity of the conductor 242 increases, and the region becomes a low-resistance region.

Here, the region between the conductor 242a and the conductor 242b is formed to overlap with the opening of the insulator 280. Accordingly, the conductor 260 can be formed in a self-aligned manner between the conductor 242a and the conductor 242b.

The insulator 250 functions as a gate insulator. The insulator 250 is preferably placed in contact with the top surface of the metal oxide 220b. For the insulator 250, any of silicon oxide, silicon oxynitride, silicon nitride oxide, silicon nitride, silicon oxide to which fluorine is added, silicon oxide to which carbon is added, silicon oxide to which carbon and nitrogen are added, and porous silicon oxide can be used. In particular, silicon oxide and silicon oxynitride are preferable because of their thermal stability.

As in the insulator 224, the concentration of an impurity such as water or hydrogen is preferably reduced in the insulator 250. The thickness of the insulator 250 is preferably greater than or equal to 1 nm and less than or equal to 20 nm.

A metal oxide may be provided between the insulator 250 and the conductor 260. The metal oxide preferably inhibits oxygen diffusion from the insulator 250 into the conductor 260. Accordingly, oxidation of the conductor 260 due to oxygen in the insulator 250 can be inhibited.

The metal oxide has a function of part of the gate insulator in some cases. Therefore, when silicon oxide, silicon oxynitride, or the like is used for the insulator 250, a metal oxide that is a high-k material with a high relative permittivity is preferably used as the metal oxide. When the gate insulator has a stacked-layer structure of the insulator 250 and the metal oxide, the stacked-layer structure can be thermally stable and have a high relative permittivity. Accordingly, a gate potential applied during operation of the transistor can be lowered while the physical thickness of the gate insulator is maintained. In addition, the equivalent oxide thickness (EOT) of the insulator functioning as the gate insulator can be reduced.

Specifically, a metal oxide containing one or more kinds selected from hafnium, aluminum, gallium, yttrium, zirconium, tungsten, titanium, tantalum, nickel, germanium, magnesium, and the like can be used. It is preferable to use an insulator containing an oxide of one or both of aluminum and hafnium, such as aluminum oxide, hafnium oxide, or an oxide containing aluminum and hafnium (hafnium aluminate), in particular.

Although FIG. 36 illustrates the conductor 260 having a two-layer structure, the conductor 260 may have a single-layer structure or a stacked-layer structure of three or more layers.

The conductor 260a is preferably formed using the aforementioned conductor having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, the conductor 260a is preferably formed using a conductive material having a function of inhibiting diffusion of oxygen (e.g., at least one of an oxygen atom, an oxygen molecule, and the like).

When the conductor 260a has a function of inhibiting diffusion of oxygen, the conductivity of the conductor 260b can be inhibited from being lowered because of oxidation due to oxygen contained in the insulator 250. As a conductive material having a function of inhibiting oxygen diffusion, for example, tantalum, tantalum nitride, ruthenium, ruthenium oxide, or the like is preferably used.

A conductive material containing tungsten, copper, or aluminum as its main component is preferably used for the conductor 260b. The conductor 260 also functions as a wiring and thus is preferably formed using a conductor having high conductivity. For example, a conductive material containing tungsten, copper, or aluminum as its main component can be used. The conductor 260b may have a stacked-layer structure, for example, a stacked-layer structure of any of the above conductive materials and titanium or titanium nitride.

As illustrated in FIG. 36A and FIG. 36C, the side surface of the metal oxide 220 is provided to so as to be covered with the conductor 260 in a region where the metal oxide 220b does not overlap with the conductor 242, that is, the channel formation region of the metal oxide 220. Accordingly, the electric field of the conductor 260 functioning as the first gate electrode is likely to act on the side surface of the metal oxide 220. Hence, the transistor 750 can have a higher on-state current and higher frequency characteristics.

Like the insulator 214 or the like, the insulator 254 preferably functions as a barrier insulating film that inhibits entry of an impurity such as water or hydrogen into the transistor 750 from the insulator 280 side. The insulator 254 preferably has lower hydrogen permeability than the insulator 224, for example. Furthermore, as illustrated in FIG. 36B and FIG. 36C, the insulator 254 is preferably in contact with the side surface of the insulator 250, the top surface and the side surface of the conductor 242a, the top surface and the side surface of the conductor 242b, and the side surfaces of the metal oxide 220a and the insulator 224. Such a structure can inhibit entry of hydrogen contained in the insulator 280 into the metal oxide 220 through the top surfaces or the side surfaces of the conductor 242a, the conductor 242b, the metal oxide 220a, the metal oxide 220b, and the insulator 224.

Furthermore, it is preferable that the insulator 254 have a function of inhibiting diffusion of oxygen (e.g., at least one of an oxygen atom, an oxygen molecule, and the like) (it is preferable that the above oxygen be less likely to pass through the insulator 254). For example, the insulator 254 preferably has lower oxygen permeability than the insulator 280 or the insulator 224.

The insulator 254 is preferably deposited by a sputtering method. When the insulator 254 is deposited by a sputtering method in an oxygen-containing atmosphere, oxygen can be added to the vicinity of a region of the insulator 224 which is in contact with the insulator 254. Thus, oxygen can be supplied from the region into the metal oxide 220 through the insulator 224. Here, with the insulator 254 having a function of inhibiting upward oxygen diffusion, oxygen can be prevented from diffusing from the metal oxide 220 into the insulator 280. Moreover, with the insulator 222 having a function of inhibiting downward oxygen diffusion, oxygen can be prevented from diffusing from the metal oxide 220 to the substrate side. In the above manner, oxygen is supplied to the channel formation region of the metal oxide 220. Accordingly, oxygen vacancies in the metal oxide 220 can be reduced, so that the transistor can be inhibited from becoming normally on.

As the insulator 254, an insulator containing an oxide of one or both of aluminum and hafnium is formed, for example. As the insulator containing an oxide of one or both of aluminum and hafnium, aluminum oxide, hafnium oxide, an oxide containing aluminum and hafnium (hafnium aluminate), or the like is preferably used.

The insulator 280 is provided over the insulator 224, the metal oxide 220, and the conductor 242 with the insulator 254 therebetween. The insulator 280 preferably contains, for example, silicon oxide, silicon oxynitride, silicon nitride oxide, silicon oxide to which fluorine is added, silicon oxide to which carbon is added, silicon oxide to which carbon and nitrogen are added, or porous silicon oxide. Silicon oxide and silicon oxynitride are particularly preferable because of their thermal stability. In particular, materials such as silicon oxide, silicon oxynitride, and porous silicon oxide are preferably used, in which case a region containing oxygen to be released by heating can be easily formed.

The concentration of an impurity such as water or hydrogen in the insulator 280 is preferably reduced. In addition, the top surface of the insulator 280 may be planarized.

Like the insulator 214 or the like, the insulator 274 preferably functions as a barrier insulating film that inhibits entry of an impurity such as water or hydrogen into the insulator 280 from above. As the insulator 274, for example, the insulator that can be used as the insulator 214, the insulator 254, or the like can be used.

The insulator 281 functioning as an interlayer film is preferably provided over the insulator 274. As in the insulator 224 or the like, the concentration of an impurity such as water or hydrogen is preferably reduced in the insulator 281.

The conductor 245a and the conductor 245b are placed in an opening formed in the insulator 281, the insulator 274, the insulator 280, and the insulator 254. The conductor 245a and the conductor 245b are provided to face each other with the conductor 260 therebetween. Note that the top surfaces of the conductor 245a and the conductor 245b may be on the same plane as the top surface of the insulator 281.

The insulator 241a is provided in contact with the inner wall of the opening in the insulator 281, the insulator 274, the insulator 280, and the insulator 254, and a first conductor of the conductor 245a is formed in contact with the side surface of the insulator 241a. The conductor 242a is positioned on at least part of the bottom portion of the opening, and the conductor 245a is in contact with the conductor 242a. Similarly, the insulator 241b is provided in contact with the inner wall of the opening in the insulator 281, the insulator 274, the insulator 280, and the insulator 254, and a first conductor of the conductor 245b is formed in contact with the side surface of the insulator 241b. The conductor 242b is positioned on at least part of the bottom portion of the opening, and the conductor 245b is in contact with the conductor 242b.

The conductor 245a and the conductor 245b are preferably formed using a conductive material containing tungsten, copper, or aluminum as its main component. The conductor 245a and the conductor 245b may each have a stacked-layer structure.

In the case where the conductor 245 has a stacked-layer structure, the aforementioned conductor having a function of inhibiting diffusion of an impurity such as water or hydrogen is preferably used as the conductor in contact with the conductor 242, the insulator 254, the insulator 280, the insulator 274, and the insulator 281. For example, tantalum, tantalum nitride, titanium, titanium nitride, ruthenium, ruthenium oxide, or the like is preferably used. The conductive material having a function of inhibiting diffusion of an impurity such as water or hydrogen can be used as a single layer or stacked layers. The use of the conductive material can inhibit oxygen added to the insulator 280 from being absorbed by the conductor 245a and the conductor 245b. Moreover, an impurity such as water or hydrogen can be inhibited from entering the metal oxide 220 through the conductor 245a and the conductor 245b from a layer above the insulator 281.

As the insulator 241a and the insulator 241b, the insulator that can be used as the insulator 254 or the like can be used, for example. Since the insulator 241a and the insulator 241b are provided in contact with the insulator 254, an impurity such as water or hydrogen in the insulator 280 or the like can be inhibited from entering the metal oxide 220 through the conductor 245a and the conductor 245b. Furthermore, oxygen contained in the insulator 280 can be inhibited from being absorbed by the conductor 245a and the conductor 245b.

Although not illustrated, a conductor functioning as a wiring may be provided in contact with the top surface of the conductor 245a and the top surface of the conductor 245b. For the conductor functioning as a wiring, a conductive material containing tungsten, copper, or aluminum as its main component is preferably used. Furthermore, the conductor may have a stacked-layer structure and may be a stack of any of the above conductive materials and titanium or titanium nitride. The conductor may be formed to be embedded in an opening provided in an insulator.

<Materials for Transistor>

Materials that can be used for the transistor will be described.

[Substrate]

As a substrate over which the transistor is formed, for example, an insulator substrate, a semiconductor substrate, or a conductor substrate may be used. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate of silicon, germanium, or the like and a compound semiconductor substrate of silicon carbide, silicon germanium, gallium arsenide, indium phosphide, zinc oxide, or gallium oxide. Other examples include any of the above semiconductor substrates including an insulator region, e.g., an SOI (Silicon On Insulator) substrate. Examples of the conductor substrate include a graphite substrate, a metal substrate, an alloy substrate, and a conductive resin substrate. Other examples include a substrate including a metal nitride and a substrate including a metal oxide. Other examples include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the elements provided over the substrates include a capacitor element, a resistor, a switching element, a light-emitting element, and a memory element.

[Insulator]

Examples of an insulator include an oxide, a nitride, an oxynitride, a nitride oxide, a metal oxide, a metal oxynitride, and a metal nitride oxide, each of which has an insulating property.

As miniaturization and high integration of transistors progress, for example, a problem such as a leakage current may arise because of a thinner gate insulator. When a high-k material is used for the insulator functioning as a gate insulator, the voltage at the time of operation of the transistor can be reduced while the physical thickness is maintained. By contrast, when a material with a low relative permittivity is used for the insulator functioning as an interlayer film, parasitic capacitance generated between wirings can be reduced. Thus, a material is preferably selected depending on the function of an insulator.

Examples of the insulator having a high relative permittivity include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator having a low relative permittivity include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor including an oxide semiconductor is surrounded by insulators having a function of inhibiting the passage of oxygen and impurities such as hydrogen (e.g., the insulator 214, the insulator 222, the insulator 254, and the insulator 274), the electrical characteristics of the transistor can be stable. An insulator having a function of inhibiting the passage of oxygen and impurities such as hydrogen can be formed to have a single-layer structure or a stacked-layer structure including an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. Specifically, as the insulator having a function of inhibiting the passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide or a metal nitride such as aluminum nitride, aluminum titanium nitride, titanium nitride, silicon nitride oxide, or silicon nitride can be used.

An insulator functioning as a gate insulator preferably includes a region containing oxygen to be released by heating. For example, a structure where silicon oxide or silicon oxynitride that includes a region containing oxygen to be released by heating is provided in contact with the metal oxide 220 can compensate for oxygen vacancies in the metal oxide 220.

[Conductor]

For a conductor, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements as its component; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even when absorbing oxygen. A semiconductor having high electrical conductivity, typified by polycrystalline silicon containing an impurity element such as phosphorus, or silicide such as nickel silicide may be used.

A plurality of conductors formed using any of the above materials may be stacked. For example, a stacked-layer structure combining a material containing the above metal element and a conductive material containing oxygen may be employed. Alternatively, a stacked-layer structure combining a material containing the above metal element and a conductive material containing nitrogen may be employed. Alternatively, a stacked-layer structure combining a material containing the above metal element, a conductive material containing oxygen, and a conductive material containing nitrogen may be employed.

In the case where a metal oxide is used for the channel formation region of the transistor, the conductor functioning as the gate electrode preferably employs a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductor functioning as the gate electrode, a conductive material containing oxygen and a metal element contained in a metal oxide where the channel is formed. A conductive material containing any of the above metal elements and nitrogen may also be used. For example, a conductive material containing nitrogen such as titanium nitride or tantalum nitride may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Indium gallium zinc oxide containing nitrogen may be used. With the use of such a material, hydrogen contained in the metal oxide where the channel is formed can be captured in some cases. Alternatively, hydrogen entering from an external insulator or the like can be captured in some cases.

<Transistor Including Oxide Semiconductor>

The case where the oxide semiconductor is used for a transistor will be described.

The metal oxide used in the OS transistor preferably contains at least indium or zinc, and further preferably contains indium and zinc. The metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example. In particular, M is preferably one or more kinds selected from gallium, aluminum, yttrium, and tin, and M is further preferably gallium.

The metal oxide can be formed by a sputtering method, a chemical vapor deposition (CVD) method such as a metal organic chemical vapor deposition (MOCVD) method, an atomic layer deposition (ALD) method, or the like.

Hereinafter, an oxide containing indium (In), gallium (Ga), and zinc (Zn) is described as an example of the metal oxide. Note that an oxide containing indium (In), gallium (Ga), and zinc (Zn) may be referred to as In—Ga—Zn oxide.

When the oxide semiconductor is used for a transistor, the transistor can have high field-effect mobility. In addition, the transistor can have high reliability.

An oxide semiconductor having a low carrier concentration is preferably used for the transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Charge trapped by the trap states in an oxide semiconductor takes a long time to disappear and might behave like fixed charge. A transistor whose channel formation region is formed in an oxide semiconductor having a high density of trap states has unstable electrical characteristics in some cases.

Accordingly, in order to obtain stable electrical characteristics of the transistor, reducing the impurity concentration in the oxide semiconductor is effective. In order to reduce the impurity concentration in the oxide semiconductor, the impurity concentration in a film that is adjacent to the oxide semiconductor is preferably reduced. Examples of impurities include hydrogen, nitrogen, an alkali metal, an alkaline earth metal, iron, nickel, and silicon. Note that an impurity in an oxide semiconductor refers to, for example, elements other than the main components of the oxide semiconductor. For example, an element with a concentration lower than 0.1 atomic % can be regarded as an impurity.

<Impurity>

The influence of impurities in the oxide semiconductor is described.

When silicon or carbon, which is one of Group 14 elements, is contained in the oxide semiconductor, defect states are formed in the oxide semiconductor. Thus, the concentration of silicon or carbon (the concentration obtained by secondary ion mass spectrometry (SIMS)) in the oxide semiconductor is set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Thus, a transistor using an oxide semiconductor that contains an alkali metal or an alkaline earth metal is likely to have normally-on characteristics. Thus, the concentration of an alkali metal or an alkaline earth metal in the oxide semiconductor, which is obtained by SIMS, is set lower than or equal to $1\times10^{18}$ atoms/cm$^3$, preferably lower than or equal to $2\times10^{16}$ atoms/cm$^3$.

An oxide semiconductor containing nitrogen easily becomes n-type by generation of electrons serving as carriers and an increase in carrier concentration. As a result, a transistor including an oxide semiconductor that contains nitrogen as a semiconductor tends to have normally-on characteristics. When nitrogen is contained in the oxide semiconductor, a trap state is sometimes formed. This might make the electrical characteristics of the transistor unstable. Thus, the concentration of nitrogen in the oxide semiconductor, which is measured by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in an oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, some hydrogen may be bonded to oxygen bonded to a metal atom and generate an electron serving as a carrier. Thus, a transistor including an oxide semiconductor that contains hydrogen tends to have normally-on characteristics. For this reason, hydrogen in the oxide semiconductor is preferably reduced as much as possible. Specifically, in the oxide semiconductor, the hydrogen concentration in the oxide semiconductor, which is obtained by SIMS, is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for a channel formation region in a transistor, the transistor can have stable electrical characteristics.

At least part of the structure examples, the drawings corresponding thereto, and the like described in this embodiment as an example can be combined with the other structure examples, the other drawings, and the like as appropriate.

Embodiment 6

In this embodiment, an electronic device that can include the display apparatus described in the above embodiment will be described.

The electronic devices described below as examples each include the display apparatus described in the above embodiment in a display portion. Thus, the electronic devices can each achieve high definition. In addition, the electronic devices can each achieve both high definition and a large screen.

A display portion in an electronic device of one embodiment of the present invention can display a video with a definition of, for example, full high definition, 4K2K, 8K4K, 16K8K, or higher.

Examples of the electronic devices include a digital camera, a digital video camera, a digital photo frame, a cellular phone, a portable game machine, a portable information terminal, and an audio reproducing device, in addition to electronic devices with comparatively large screens, such as a television device, a notebook personal computer, a monitor device, digital signage, a pachinko machine, and a game machine.

An electronic device using one embodiment of the present invention can be incorporated along a flat surface or a curved surface of an inside wall or an outside wall of a house, a building, or the like, an interior or an exterior of a car, or the like.

Figure 37A:
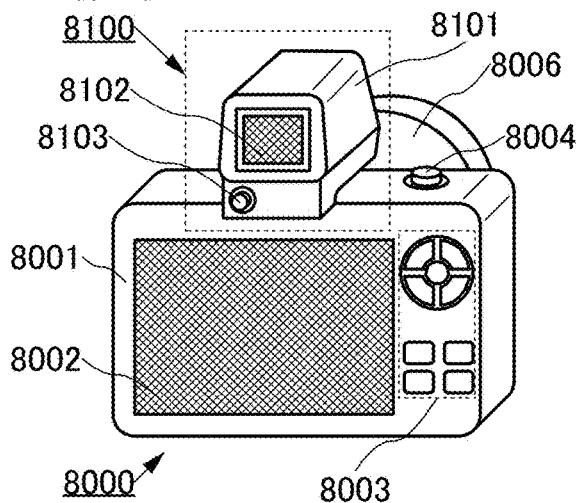
FIG. 37A to FIG. 37E are diagrams illustrating structure examples of electronic devices.

FIG. 37A is a diagram illustrating appearance of a camera 8000 to which a finder 8100 is attached.

The camera 8000 includes a housing 8001, a display portion 8002, operation buttons 8003, a shutter button 8004, and the like. A detachable lens 8006 is attached to the camera 8000.

Note that the lens 8006 and the housing may be integrated with each other in the camera 8000.

The camera 8000 can take images by the press of the shutter button 8004 or touch on the display portion 8002 serving as a touch panel.

The housing 8001 includes a mount including an electrode, so that, in addition to the finder 8100, a stroboscope or the like can be connected to the housing.

The finder 8100 includes a housing 8101, a display portion 8102, a button 8103, and the like.

The housing 8101 is attached to the camera 8000 with a mount engaging with a mount of the camera 8000. The finder 8100 can display a video or the like received from the camera 8000 on the display portion 8102.

The button 8103 has a function of a power button or the like.

The display portion 8002 of the camera 8000 and the display portion 8102 of the finder 8100 can use the display apparatus of one embodiment of the present invention. Note that a finder may be incorporated in the camera 8000.

Figure 37B:
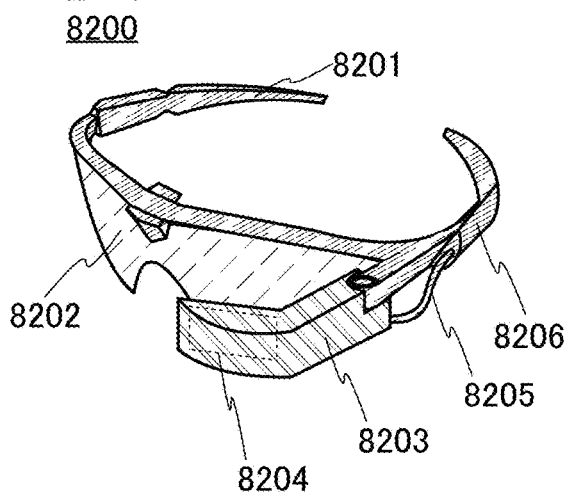

FIG. 37B is a diagram illustrating appearance of a head-mounted display 8200.

The head-mounted display 8200 includes a mounting portion 8201, a lens 8202, a main body 8203, a display portion 8204, a cable 8205, and the like. A battery 8206 is incorporated in the mounting portion 8201.

The cable 8205 supplies electric power from the battery 8206 to the main body 8203. The main body 8203 includes a wireless receiver or the like and can display received video data on the display portion 8204. The main body 8203 is provided with a camera, and data on the movement of the user's eyeball and eyelid can be used as an input means.

The mounting portion 8201 may include a plurality of electrodes capable of sensing current flowing in response to the movement of the user's eyeball in a position in contact with the user, to have a function of recognizing the user's line of sight. A function of monitoring the user's pulse with the use of current flowing through the electrodes may be achieved. The mounting portion 8201 may include various sensors such as a temperature sensor, a pressure sensor, and an acceleration sensor to have a function of displaying the user's biological information on the display portion 8204, a function of changing a video displayed on the display portion 8204 in accordance with the movement of the user's head, or the like.

The display portion 8204 can use the display apparatus of one embodiment of the present invention.

Figure 37C:
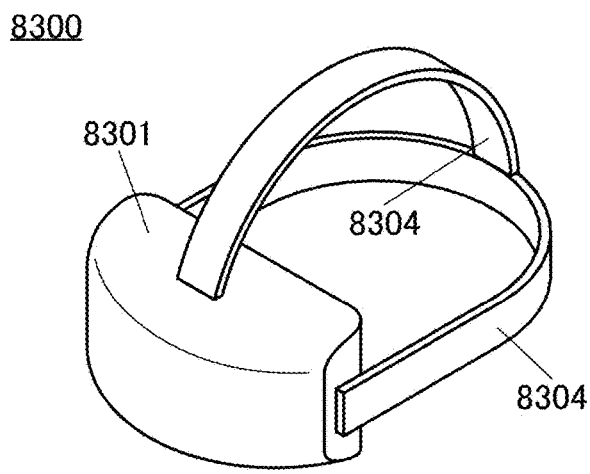
Figure 37D:
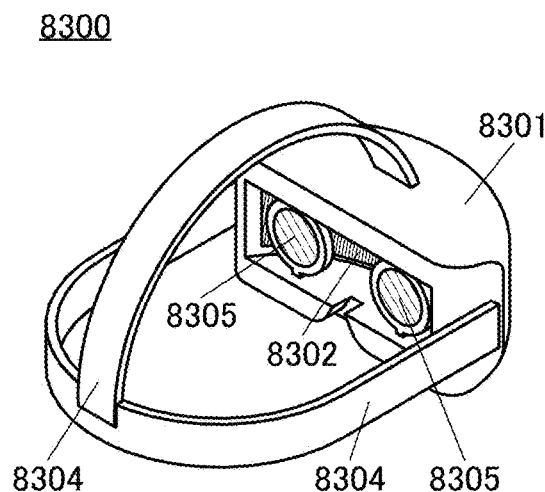
Figure 37E:
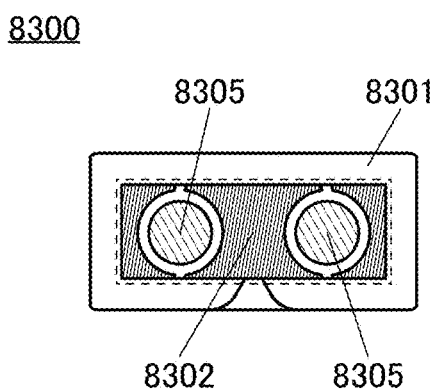

FIG. 37C, FIG. 37D, and FIG. 37E are diagrams illustrating appearance of a head-mounted display 8300. The head-mounted display 8300 includes a housing 8301, a display portion 8302, a band-shaped fixing unit 8304, and a pair of lenses 8305.

A user can see display on the display portion 8302 through the lenses 8305. Note that the display portion 8302 is preferably curved and placed, in which case the user can feel a high realistic sensation. When another image displayed in a different region of the display portion 8302 is viewed through the lenses 8305, three-dimensional display using parallax or the like can also be performed. Note that the structure is not limited to that in which one display portion 8302 is provided, and two display portions 8302 may be provided so that one display portion is provided for one eye of the user.

Note that the display apparatus of one embodiment of the present invention can be used in the display portion 8302. The display apparatus including the semiconductor device of one embodiment of the present invention has an extremely high resolution; thus, even when an image is magnified by the lenses 8305 as in FIG. 37E, the user does not perceive pixels, and a more realistic video can be displayed.

Electronic devices illustrated in FIG. 38A to FIG. 38G include a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays), a microphone 9008, and the like.

The electronic devices illustrated in FIG. 38A to FIG. 38G have a variety of functions. For example, the electronic devices can have a function of displaying a variety of information (a still image, a moving image, a text image, and the like) on the display portion, a touch panel function, a function of displaying a calendar, date, time, and the like, a function of controlling processing with use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of display portions. The electronic devices may each include a camera or the like and have a function of taking a still image or a moving image and storing the taken image in a recording medium (an external recording medium or a recording medium incorporated in the camera), a function of displaying the taken image on the display portion, or the like.

The details of the electronic devices illustrated in FIG. 38A to FIG. 38G are described below.

Figure 38A:
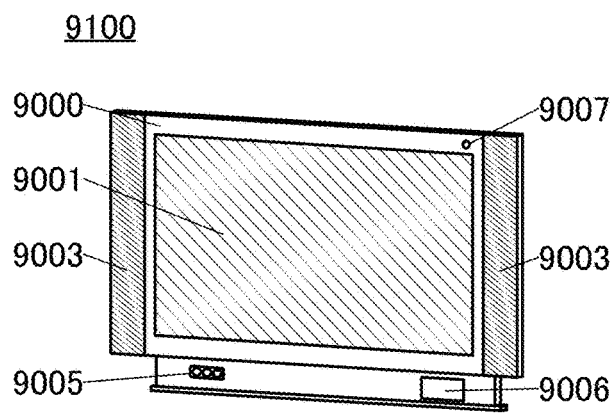
FIG. 38A to FIG. 38G are diagrams illustrating structure examples of electronic devices.

FIG. 38A is a perspective view illustrating a television device 9100. The television device 9100 can include the display portion 9001 having a large screen size of, for example, 50 inches or more, or 100 inches or more.

Figure 38D:
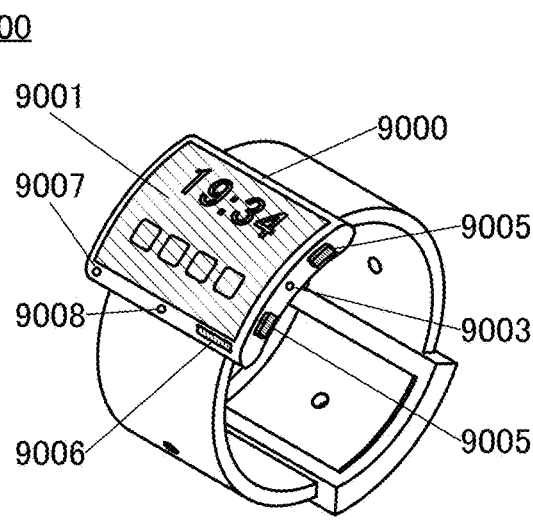
Figure 38B:
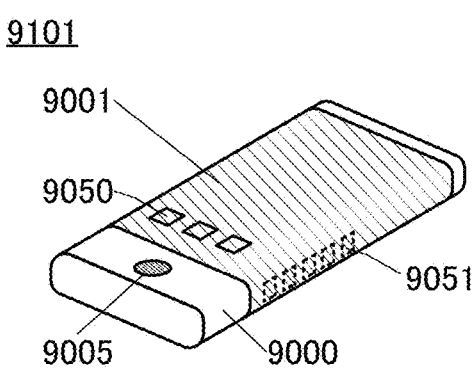

FIG. 38B is a perspective view illustrating a portable information terminal 9101. For example, the portable information terminal 9101 can be used as a smartphone. Note that the portable information terminal 9101 may be provided with the speaker 9003, the connection terminal 9006, the sensor 9007, or the like. The portable information terminal 9101 can display characters and image information on its plurality of surfaces. FIG. 38B illustrates an example in which three icons 9050 are displayed. Information 9051 indicated by dashed rectangles can be displayed on another surface of the display portion 9001. Examples of the information 9051 include notification of reception of an e-mail, SNS, or an incoming call, the title and sender of an e-mail, SNS, or the like, the date, the time, remaining battery, and the reception strength of an antenna. Alternatively, the icon 9050 or the like may be displayed in the position where the information 9051 is displayed.

Figure 38E:
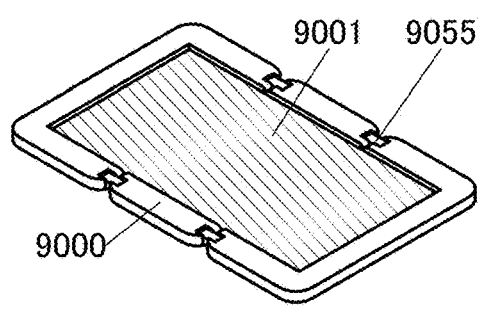
Figure 38C:
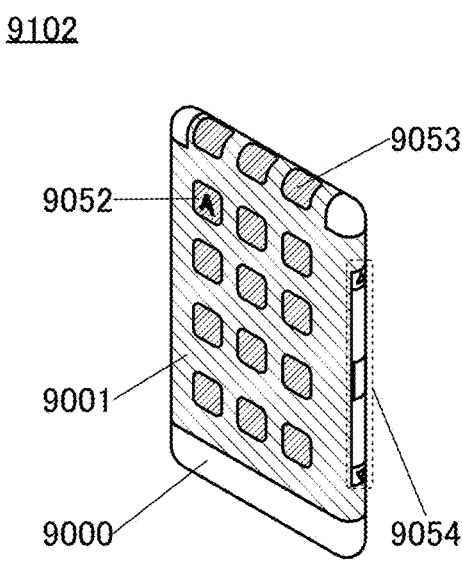

FIG. 38C is a perspective view illustrating a portable information terminal 9102. The portable information terminal 9102 has a function of displaying information on three or more surfaces of the display portion 9001. Here, an example in which information 9052, information 9053, and information 9054 are displayed on different surfaces is shown. For example, a user can check the information 9053 displayed in a position that can be observed from above the portable information terminal 9102, with the portable information terminal 9102 put in a breast pocket of his/her clothes. The user can see the display without taking out the portable information terminal 9102 from the pocket and decide whether to answer the call, for example.

FIG. 38D is a perspective view illustrating a watch-type portable information terminal 9200. The display surface of the display portion 9001 is curved and provided, and display can be performed along the curved display surface. Mutual communication between the portable information terminal 9200 and, for example, a headset capable of wireless communication enables hands-free calling. With the connection terminal 9006, the portable information terminal 9200 can perform mutual data transmission with another information terminal and charging. Note that the charging operation may be performed by wireless power feeding.

Figure 38F:
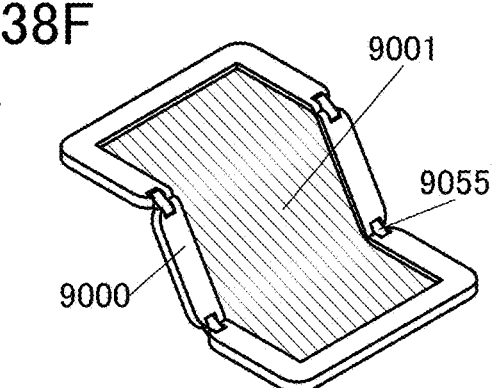
Figure 38G:
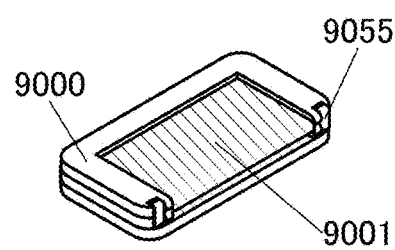

FIG. 38E, FIG. 38F, and FIG. 38G are perspective views illustrating a foldable portable information terminal 9201. FIG. 38E is a perspective view of an opened state of the portable information terminal 9201, FIG. 38G is a perspective view of a folded state thereof, and FIG. 38F is a perspective view of a state in the middle of change from one of FIG. 38E and FIG. 38G to the other. The portable information terminal 9201 is highly portable in the folded state and is highly browsable in the opened state because of a seamless large display region. The display portion 9001 of the portable information terminal 9201 is supported by three housings 9000 joined by hinges 9055. For example, the display portion 9001 can be folded with a radius of curvature greater than or equal to 1 mm and less than or equal to 150 mm.

Figure 39A:
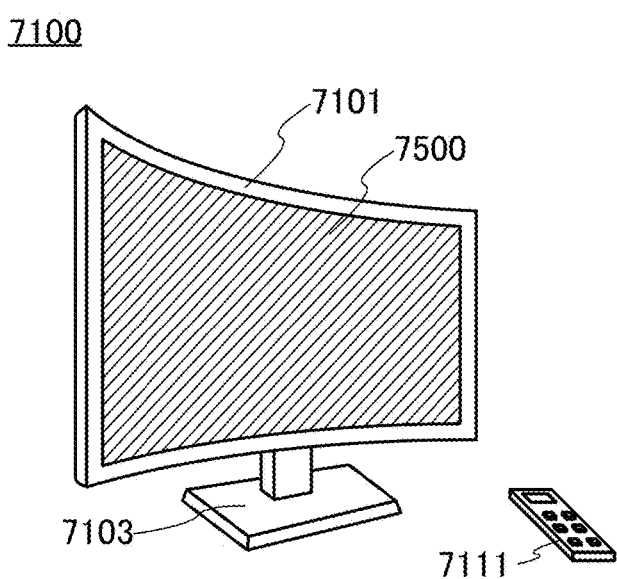
FIG. 39A to FIG. 39D are diagrams illustrating structure examples of electronic devices.

FIG. 39A illustrates an example of a television device. In a television device 7100, a display portion 7500 is incorporated in a housing 7101. Here, a structure in which the housing 7101 is supported by a stand 7103 is shown.

Operation of the television device 7100 illustrated in FIG. 39A can be performed not only with an operation switch provided in the housing 7101 but also with a separate remote controller 7111. Alternatively, a touch panel may be used for the display portion 7500, and the television device 7100 may be operated by touch on the touch panel. The remote controller 7111 may include a display portion in addition to operation buttons.

Note that the television device 7100 may include not only a television receiver but also a communication device for network connection.

Figure 39B:
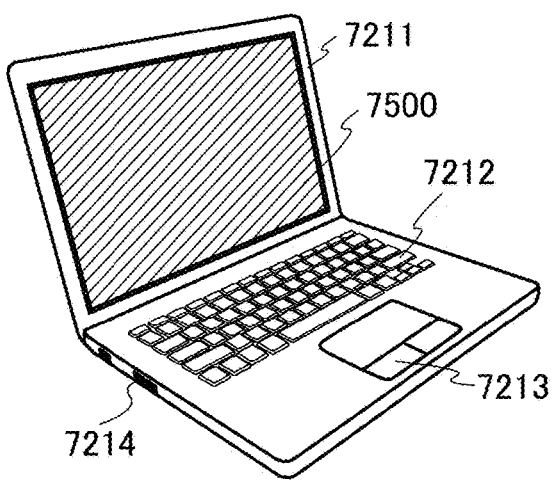

FIG. 39B illustrates a notebook personal computer 7200. The notebook personal computer 7200 includes a housing 7211, a keyboard 7212, a pointing device 7213, an external connection port 7214, and the like. The display portion 7500 is incorporated in the housing 7211.

Figure 39C:
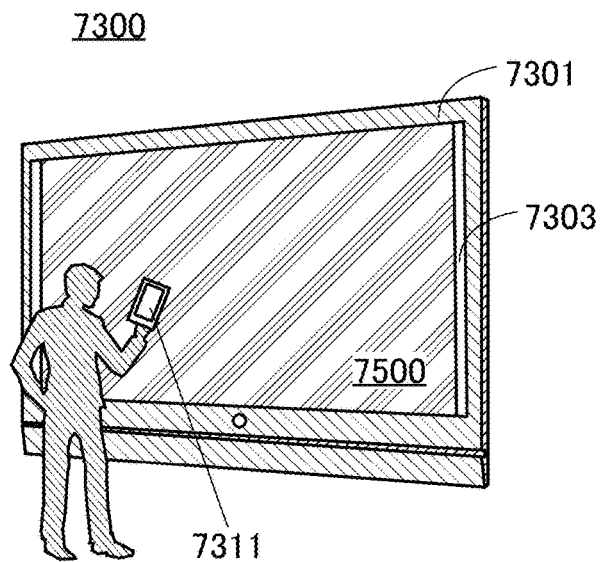

FIG. 39C illustrates examples of digital signage.

Digital signage 7300 illustrated in FIG. 39C includes a housing 7301, the display portion 7500, a speaker 7303, and the like. Furthermore, the digital signage can include an LED lamp, operation keys (including a power switch or an operation switch), a connection terminal, a variety of sensors, a microphone, and the like.

The larger display portion 7500 can increase the amount of information that can be provided at a time and attracts more attention, so that the effectiveness of the advertisement can be increased, for example.

A touch panel is preferably used for the display portion 7500 so that the user can operate the digital signage. Thus, the digital signage can be used not only for advertising and traffic information but also for providing information that the user needs, such as route information and guidance information on a commercial facility.

As illustrated in FIG. 39C, the digital signage 7300 is preferably capable of working with an information terminal 7311 such as a user's smartphone through wireless communication. For example, not only displaying information of an advertisement displayed on the display portion 7500 on a screen of the information terminal 7311 but also switching display on the display portion 7500 by operation of the information terminal 7311 is possible.

It is possible to make the digital signage 7300 execute a game with use of the information terminal 7311 as an operation means (controller). Thus, an unspecified number of users can join in and enjoy the game concurrently.

Figure 39D:
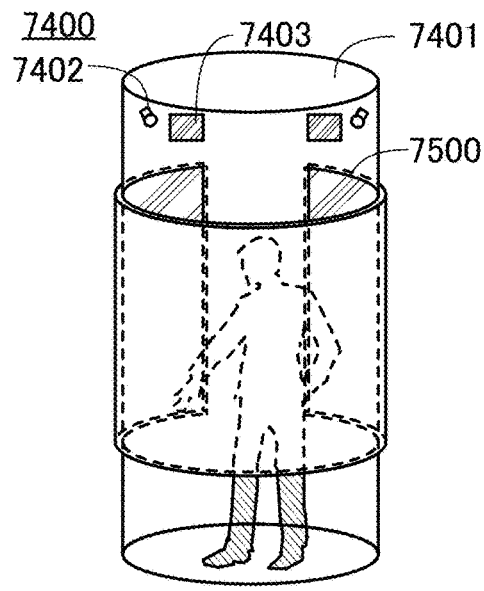

In addition, FIG. 39D is digital signage 7400 attached to an inner wall 7401 of a cylindrical space. The digital signage 7400 includes, in addition to the display portion 7500 provided along a curved surface of the inner wall 7401, a plurality of imaging devices 7402 and a plurality of audio devices 7403. Furthermore, the digital signage 7400 can perform the user's gaze measurement (eye tracking) or sense a gesture or the like by the plurality of imaging devices 7402, which allows the display portion 7500 and the audio device 7403 to operate in accordance with the user's gaze, the gesture, or the like. For example, when the user turns his or her gaze toward advertising information displayed on the display portion 7500, display on the display portion 7500 can be switched and sound of the audio device 7403 can be switched, for example. Thus, the user can enjoy display, sound, and the like with excellent realistic sensation.

The display apparatus of one embodiment of the present invention can be used for the display portion 7500 in FIG. 39A to FIG. 39D.

The electronic device in which the display apparatus of one embodiment of the present invention illustrated in FIG. 19A to FIG. 19E can be provided may be connected to an external server through a network. Alternatively, processing requiring high operation performance may be performed in a server connected via a network without performing processing requiring high operation performance in the electronic device. Such processing is also referred to as what is called thin client, in which only limited processing is executed by the terminal (here, the electronic device) on the user side (client side), and execution of an application and a high degree of processing such as management are performed on the server side, whereby the scale of processing of the terminal on the client side can be reduced. In this case, an arithmetic device with high operation performance does not need to be used in the electronic device, which facilitates reductions in cost, weight, and size. In the electronic device of one embodiment of the present invention, processing may be performed with a combination of the thin client and processing with high operation performance required on the electronic device side.

At least part of this embodiment can be implemented in combination with the other embodiments described in this specification as appropriate.

(Supplementary Notes on Description in this Specification and the Like)

The following are notes on the description of the foregoing embodiments and the structures in the embodiments.

One embodiment of the present invention can be constituted by appropriately combining the structure described in an embodiment with any of the structures described in the other embodiments. In addition, in the case where a plurality of structure examples are described in one embodiment, some of the structure examples can be combined as appropriate.

Note that content (or may be part of the content) described in one embodiment can be applied to, combined with, or replaced with another content (or may be part of the content) described in the embodiment and/or content (or may be part of the content) described in another embodiment or other embodiments.

Note that in each embodiment, content described in the embodiment is content described using a variety of diagrams or content described with text disclosed in the specification.

Note that by combining a diagram (or may be part thereof) described in one embodiment with another part of the diagram, a different diagram (or may be part thereof) described in the embodiment, and/or a diagram (or may be part thereof) described in another embodiment or other embodiments, much more diagrams can be formed.

In this specification and the like, components are classified on the basis of the functions, and shown as blocks independent of one another in block diagrams. However, in an actual circuit or the like, it is difficult to separate components on the basis of the functions, and there is such a case where one circuit is associated with a plurality of functions or a case where a plurality of circuits are associated with one function. Therefore, the blocks in the block diagrams are not limited by the components described in the specification, and the description can be changed appropriately depending on the situation.

Furthermore, in the drawings, the size, the layer thickness, or the region is shown with given magnitude for description convenience. Therefore, they are not limited to the illustrated scale. Note that the drawings are schematically shown for clarity, and embodiments of the present invention are not limited to shapes, values, or the like shown in the drawings. For example, variation in signal, voltage, or current due to noise, variation in signal, voltage, or current due to difference in timing, or the like can be included.

In this specification and the like, expressions "one of a source and a drain" (or a first electrode or a first terminal) and "the other of the source and the drain" (or a second electrode or a second terminal) are used in the description of the connection relationship of a transistor. This is because the source and the drain of the transistor change depending on the structure, operating conditions, or the like of the transistor. Note that the source or the drain of the transistor can also be referred to as a source (drain) terminal, a source (drain) electrode, or the like as appropriate depending on the situation.

In addition, in this specification and the like, the term "electrode" or "wiring" does not functionally limit these components. For example, an "electrode" is used as part of a "wiring" in some cases, and vice versa. Furthermore, for example, the term "electrode" or "wiring" also includes the case where a plurality of "electrodes" or "wirings" are formed in an integrated manner.

In this specification and the like, voltage and potential can be replaced with each other as appropriate. The term voltage refers to a potential difference from a reference potential, and when the reference potential is a ground potential, for example, voltage can be replaced with potential. The ground potential does not necessarily mean 0 V. Potentials are relative values, and a potential supplied to a wiring or the like is sometimes changed depending on the reference potential.

In this specification and the like, the terms "film" and "layer" can be interchanged with each other depending on the case or circumstances. For example, the term "conductive layer" can be changed into the term "conductive film" in some cases. Also, for example, the term "insulating film" can be changed into the term "insulating layer" in some cases.

In this specification and the like, a switch is in a conduction state (on state) or in a non-conduction state (off state) to determine whether current flows therethrough or not. Alternatively, a switch has a function of selecting and changing a current path.

In this specification and the like, the channel length refers to, for example, the distance between a source and a drain in a region where a semiconductor (or a portion where current flows in a semiconductor when a transistor is on) and a gate overlap with each other or a region where a channel is formed in a top view of the transistor.

In this specification and the like, the channel width refers to, for example, the length of a portion where a source and a drain face each other in a region where a semiconductor (or a portion where current flows in a semiconductor when a transistor is on) and a gate electrode overlap with each other or a region where a channel is formed.

In this specification and the like, the expression "A and B are connected" means the case where A and B are electrically connected to each other as well as the case where A and B are directly connected to each other. Here, the expression "A and B are electrically connected" means the case where electric signals can be transmitted and received between A and B when an object having any electric action exists between A and B.

REFERENCE NUMERALS

10: display apparatus, 11: substrate, 12: substrate, 13A: sub-display portion, 13: display portion, 14: terminal portion, 15: semiconductor substrate, 16: substrate, 17: substrate, 19: sub-display portion, 20: layer, 21: transistor, 22: channel formation region, 30: driver circuit, 40: functional circuit, 50: layer, 51: pixel circuit, 55: pixel circuit group, 59: section, 60: layer, 61: light-emitting element, 69: luminance conversion circuit, 100: electronic device

The invention claimed is:

1. An electronic device comprising a display apparatus, a gaze detection portion, and an arithmetic portion,
　wherein the display apparatus comprises a display portion divided into a plurality of sub-display portions and a functional circuit comprising a luminance conversion circuit,
　wherein the gaze detection portion is configured to detect a user's gaze,
　wherein the arithmetic portion is configured to allocate the plurality of sub-display portions to a first section or a second section with the use of a detection result of the gaze detection portion,
　wherein the functional circuit is configured to perform display on the sub-display portion included in the first section with a first driving frequency and perform display on the sub-display portion included in the second section with a second driving frequency lower than the first driving frequency,
　wherein the sub-display portion included in the first section performs display based on first image data and black image data in one frame period,
　wherein the sub-display portion included in the second section performs display based on second image data in one frame period,
　wherein the luminance conversion circuit is configured to convert input image data into image data with reduced luminance to be displayed in the sub-display portion,
　wherein the second image data is image data converted by the luminance conversion circuit,
　wherein the plurality of sub-display portions each comprise a plurality of pixel circuits and a plurality of light-emitting elements,
　wherein the display apparatus comprises a plurality of gate driver circuits and a plurality of source driver circuits,
　wherein one of the plurality of gate driver circuits and one of the plurality of source driver circuits are electrically connected to one of the plurality of sub-display portions,
　wherein the plurality of gate driver circuits and the plurality of source driver circuits are each provided in a first layer,
　wherein the plurality of pixel circuits are provided in a second layer over the first layer, and
　wherein the plurality of light-emitting elements are provided in a third layer over the second layer.

2. The electronic device according to claim 1,
　wherein the first section comprises a region overlapping with a user's gaze point.

3. The electronic device according to claim 1,
　wherein the plurality of gate driver circuits and the plurality of source driver circuits each comprise a transistor comprising a first semiconductor,
　wherein the plurality of pixel circuits each comprise a transistor comprising a second semiconductor,
　wherein the first semiconductor comprises silicon, and
　wherein the second semiconductor comprises an oxide semiconductor.

4. An electronic device comprising a display apparatus, a gaze detection portion, and an arithmetic portion,
　wherein the display apparatus comprises a display portion divided into a plurality of sub-display portions and a functional circuit comprising a luminance conversion circuit,
　wherein the gaze detection portion is configured to detect a user's gaze,
　wherein the arithmetic portion is configured to allocate the plurality of sub-display portions to a first section or a second section with the use of a detection result of the gaze detection portion,
　wherein the functional circuit is configured to perform display on the sub-display portion included in the first section with a first driving frequency and perform display on the sub-display portion included in the second section with a second driving frequency lower than the first driving frequency,
　wherein the sub-display portion included in the first section performs display based on first image data and black image data in one frame period,
　wherein the sub-display portion included in the second section performs display based on second image data in one frame period,
　wherein the luminance conversion circuit is configured to convert input image data into image data with reduced luminance to be displayed in the sub-display portion,
　wherein the second image data is image data converted by the luminance conversion circuit,
　wherein the functional circuit comprises a frame memory, and
　wherein the frame memory is configured to store image data in each of the plurality of sub-display portions and output the image data to the luminance conversion circuit.

5. An electronic device comprising a display apparatus, a gaze detection portion, and an arithmetic portion,
　wherein the display apparatus comprises a display portion divided into a plurality of sub-display portions and a functional circuit comprising a luminance conversion circuit,
　wherein the gaze detection portion is configured to detect a user's gaze,
　wherein the arithmetic portion is configured to allocate the plurality of sub-display portions to a first section or a second section with the use of a detection result of the gaze detection portion,
　wherein the functional circuit is configured to perform display on the sub-display portion included in the first section with a first driving frequency and perform display on the sub-display portion included in the second section with a second driving frequency lower than the first driving frequency,
　wherein the sub-display portion included in the first section performs display based on first image data and black image data in one frame period,
　wherein the sub-display portion included in the second section performs display based on second image data in one frame period,
　wherein the luminance conversion circuit is configured to convert input image data into image data with reduced luminance to be displayed in the sub-display portion,
　wherein the second image data is image data converted by the luminance conversion circuit,
　wherein the functional circuit comprises a frame memory, and wherein the frame memory is configured to store image data processed by the luminance conversion circuit.

* * * * *